US009855889B1

(12) United States Patent
Mullis et al.

(10) Patent No.: US 9,855,889 B1
(45) Date of Patent: Jan. 2, 2018

(54) BRAKE LIGHT SYSTEM FOR VEHICLES

(71) Applicant: B&M LLC, Des Moines, IA (US)

(72) Inventors: Benjamin Mullis, Des Moines, IA (US); Naren Bhojwani, Des Moines, IA (US); Joshua Renner, Phoenix, AZ (US); Damon Schmidt, Minburn, IA (US); Adam Kohl, Slinger, WI (US); Curtis Thompson, Pleasant Hill, IA (US); Nageswara Naveen Kadimcherla, Tempe, AZ (US); Aleksander Poniatowski, Crystal Lake, IL (US); Eric Campbell, Robins, IA (US); Shu-an Lin, New Taipei (TW)

(73) Assignee: B&M, L.L.C., Des Moines, IA (US)

( * ) Notice: Subject to any disclaimer, the term of this patent is extended or adjusted under 35 U.S.C. 154(b) by 0 days.

(21) Appl. No.: 14/802,742

(22) Filed: Jul. 17, 2015

Related U.S. Application Data

(60) Provisional application No. 62/025,562, filed on Jul. 17, 2014.

(51) Int. Cl.
*B60Q 1/44* (2006.01)
*B60Q 1/26* (2006.01)

(52) U.S. Cl.
CPC ............ *B60Q 1/44* (2013.01); *B60Q 1/2607* (2013.01)

(58) Field of Classification Search
CPC . B60W 2050/0064; B60W 2050/0089; B60W 40/09; G07C 5/008; G09B 19/14; G09B 19/167; G09B 9/052; B60Q 1/445
(Continued)

(56) References Cited

U.S. PATENT DOCUMENTS 5,150,098 A * 9/1992 Rakow ............... B60Q 1/444
340/464
5,504,472 A * 4/1996 Wilson ............... B60Q 1/444
188/DIG. 1
(Continued)

FOREIGN PATENT DOCUMENTS

DE 4444728 A1 9/1995
EP 436368 A2 7/1991
(Continued)

OTHER PUBLICATIONS

Daimler AG, "Adaptive Brake Light for Mercedes-Benz", (2014), 2 pages, last accessed on Sep. 16, 2014.
(Continued)

*Primary Examiner* — Daniel Previl
(74) *Attorney, Agent, or Firm* — McKee, Voorhees & Sease, PLC

(57) ABSTRACT

Systems, apparatus, and methods for operating brake lights on moving vehicles. A sensor transduces level or state of current braking of the vehicle. The transduced level or state of braking is converted into an instruction to produce a display of luminance at the brake lights which is proportional to the level or state of current braking to allow viewers to react accordingly. In one example, brake fluid pressure in the braking system is measured to transduce level or state of braking. Preset thresholds of brake fluid pressure are correlated to plural braking levels or states. Luminance at the brake light is expanded or contracted in real time with the changing of braking levels or states.

17 Claims, 47 Drawing Sheets

(58) Field of Classification Search
USPC ....... 340/479, 464, 468, 467, 488, 475, 478, 340/507, 603, 611, 614, 618, 626, 691.6, 340/692, 815.45
See application file for complete search history.

(56) References Cited

U.S. PATENT DOCUMENTS

| | | | |
|---|---|---|---|
| 5,886,628 A | | 3/1999 | Alhassoon |
| 6,043,096 A | * | 3/2000 | Evtodienko .......... G01N 31/222 422/413 |
| 6,100,799 A | | 8/2000 | Fenk |
| 6,150,933 A | * | 11/2000 | Matsumoto ............ B60Q 1/444 340/467 |
| 6,424,256 B1 | * | 7/2002 | Ryder .................... B60Q 1/445 340/464 |
| 6,960,008 B2 | * | 11/2005 | Voelker ................. B60Q 1/444 250/222.1 |
| 7,357,539 B2 | | 4/2008 | Voelker |
| 7,573,378 B2 | | 8/2009 | Matsumoto et al. |
| 8,547,219 B2 | * | 10/2013 | Kisiel .................... B60Q 1/444 340/468 |
| 2010/0085180 A1 | | 4/2010 | Mathis |
| 2010/0102946 A1 | * | 4/2010 | Polak .................... B60Q 1/525 340/467 |
| 2011/0304455 A1 | | 12/2011 | Kisiel |
| 2014/0309856 A1 | * | 10/2014 | Willson-Quayle ..... B60Q 1/444 701/36 |
| 2015/0025737 A1 | * | 1/2015 | Hermsen ............... B60T 17/221 701/33.9 |

FOREIGN PATENT DOCUMENTS

| | | |
|---|---|---|
| WO | 2011061617 A1 | 5/2011 |
| WO | 2013112111 A1 | 8/2013 |

OTHER PUBLICATIONS

BMW South Africa, "BMW X6: Adaptive Brake Lights", 2 pages, last accessed on Sep. 16, 2014.

KAHTEC International, "Blinking Smart Stop", (2008), 3 pages, last accessed Jul. 7, 2016.

* cited by examiner

POSITIVE FEEDBACK GAIN EQN.:

$$\frac{V_{OUT}}{V_{IN}} = 1 + \frac{R_2}{R_1} = 1 + \frac{1K\Omega}{1\Omega}$$

LED ARRAYS:

20mA (59) = 1.13 A $$\frac{5V - 3.2V}{R} = 20\,mA \rightarrow R = 90\,\Omega = 100\,\Omega$$

15 LUMENS (59) = 885 LUMENS

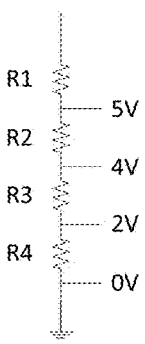

$$\frac{8V}{R_1} = \frac{1V}{R_2} = \frac{2V}{R_3} = \frac{2V}{R_4}$$

THIS RESISTOR ARRAGNEMENT WILL DIFFER FOR EACH MAKE AND MODEL -> MOSTLY DUE FOR BRAKE PRESSURE NEEDED TO STOP THE CAR. ONLY THE 4 RESISTORS AND GAIN OF SENSOR WILL NEED TO BE ADJUSTED.

TABLE 2: THEORETICAL CALCULATIONS 1

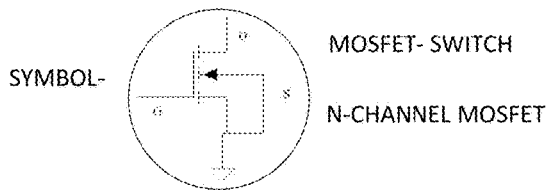

SYMBOL- / MOSFET- SWITCH / N-CHANNEL MOSFET

CIRCUIT   IF $V_{GS} < V_{TH}$          IF $V_{GS} >= V_{TH}$

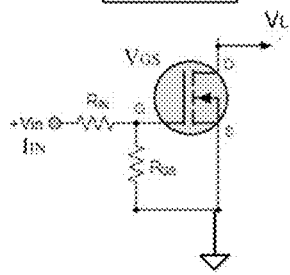
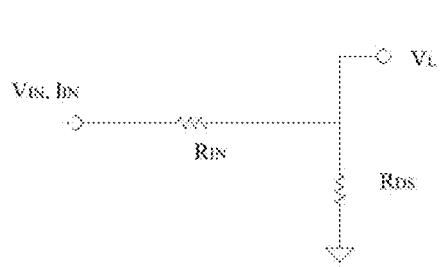

$V_{IN}$ -VOLTAGE FROM COMPARATOR
$V_{GS}$ –CUT-OFF VOLTAGE
$V_l$ –VOLATEGE FROM LIGHT ARRAY
$V_{TH}$ –THRESHOLD VOLTAGE
$I_{IN}$ –CURRRENT FROM COMPARATOR
$R_{IN}$ –INPUT RESISTANCE
$R_{GS}$ = DRAIN RESISTOR, PREVENTS MOSFET FROM ACTING AS A CAPACITOR

GIVEN $V_{IN} = 6.5V$
$I_{IN} = 1mA$ .....FROM COMPARATOR DATA SHEET
$3V <= V_{TH} <= 9V$
FOR ACTIVATION $V_{GS} >= V_{TH}$
SO MINIMUM $V_{GS}$ is 3V
$(V_{IN} - V_{GS}) / R_{IN} = I_{IN}$
$(6.5 - 3)/R_{IN} = 1mA$
$R_{IN} = 3500\,\Omega$

*FIG. 4B*

Figure 9-6. Overall view of one particular regulated (load-sensing) proportioning valve, and its operating linkage. (GMC)

Figure 9-4. A dual proportioning valve setup. Note that with this valve, a separate line is sent to each individual rear brake assembly. (Bendix)

Figure 9-18. A plunger type stoplight switch assembly. 1—Brake pedal mounting bracket. 2—Switch retainer. 3—Stoplight switch. 4—Stoplight switch mounting bracket. 5—Switch actuator lever. 6—Brake pedal. 7—Plunger. 8—Normal brake pedal travel. (General Motors)

BRAKE LIGHT SYSTEM FOR VEHICLES

CROSS-REFERENCE TO RELATED APPLICATIONS

This application claims the benefit of U.S. Ser. No. 62/025,562, filed Jul. 17, 2014, which is incorporated by reference herein in its entirety.

BACKGROUND OF THE INVENTION

A. Field of the Invention

The present invention relates to brake lights on moving vehicles, including automobiles and trailers, and, in particular, to a system to visually convey the amount of braking of the vehicle occurring to viewers of the vehicle.

B. Problems in the Art

Automobile accidents are a significant concern. As ownership and use of automotive vehicles increases around the world, so does the risk of collisions and the attendant risk of physical and economic injury.

Rear-end collisions account for a substantial number of automobile accidents. The primary method of deterring rear end collisions is use of brake lights. Viewers of the brake lights are immediately informed by a visual indicator that the operator has applied the brakes of the vehicle. Observers can then take appropriate action based on that visual indicator.

The importance of brake lights has been acknowledged by government regulations. See, e.g., State of Ohio laws, Revised Code §4513.071 on vehicle stop lights, which requires at least one tail light on all vehicles that transverse public roads, including a visual indicator when brakes are applied. These regulations have evolved over the years. For example, two tail lights, each with a brake light, are required for most vehicles manufactured after 1966. Since running lights and turn signals are also mandated by many regulations, brake lights, rear running, and rear turn signal lights are generally integrated or combined on left and right opposite sides of the rear of the vehicle.

The concern about adequate brake lights was recognized on or about 1986, when certain regulations added the requirement of a third brake light. The third brake light typically is placed in a more centered and higher location on the vehicle. It is activated with the activation of the left and right brake lights. Yet rear end collisions remain a big problem.

Some attempts have been made to address the issue. Several automobile manufacturers have proposed what they call adaptive brake light systems. Some implement this idea by flashing at least the center or third brake light if brakes are applied quickly and hard. The intent is to give the following vehicles a visual indication that a higher-than-normal braking has occurred. The flashing attempts to warn of this to allow those following to adjust. While this approach tries to convey information to the following drivers through brake light output that is different than simply on-off of brake lights, the inventors have identified room for improvement.

Flashing of lights can be confusing to viewers. Emergency and police vehicles use flashing lights to convey different information. Also, most cars and trucks have emergency lights which flash when activated. Many times they are actuated to indicate the vehicle is stopped or traveling at a slow rate. Thus, because driver decisions must be made sometimes in a fraction of a second, any confusion over the intended meaning of flashing lights may delay an appropriate response from following drivers.

Additionally, adding flashing for hard or emergency braking gives only two possibilities of visual indication of levels or states braking.

SUMMARY OF THE INVENTION

It is therefore a principle object, feature, aspect, or advantage of the present invention to provide a vehicle brake light system which improves over or solves problems and deficiencies in the state of the art.

Further objects, features, aspects, or advantages of the present invention relate to a braking system which:
  a. effectively and efficiently visually alerts viewers of the current state or level of braking of a vehicle, and whether braking level or state is increasing or decreasing;
  b. deters and decreases vehicle accidents, particularly rear end collisions;
  c. gives visual indication of a plurality of states of vehicle braking in essentially real time;
  d. allows following vehicles and viewers to interpret better how to react to a vehicle;
  e. can be applied universally; and
  f. in some embodiments has increased aesthetics.

According to a first aspect of the invention, a vehicle braking system comprises a sensor of braking state or level from a plurality of possible braking states or levels. The sensed state or level of braking is electrically communicated to a signal processing circuit which evaluates the sensed state or level of braking and automatically actuates a visual state or level of brake light operation corresponding to the sensed state or level of braking. The visual state or level of brake light operation presents, in the display of at least one brake light, a visual expansion of luminance in terms of size, direction, intensity, or a combination in proportion to increasing sensed braking states or levels. Visual contraction of such luminance occurs on decreasing sense braking states or levels. The viewer is therefore immediately informed of the status or level of braking and can make decisions of how to react.

In another aspect of the invention, the sensor allows either direct or indirect sensing of the magnitude of pressure being applied to the braking system. Direct sensing is via measuring the magnitude of pressure of brake fluid in the vehicle's brake system. Indirect sensing is via measuring physical displacement of the brake pedal of the vehicles braking system. In either case, the sensor provides an electrically transduced signal correlated to at least plural states or levels of braking of the vehicle. The signal is communicated to a signal conditioning circuit or processor which instructs and generates a correlated operation of the brake lights to increase the luminance in correlation to sensed pressure.

In another aspect of the invention, the direct sensing of the vehicle's braking system operatively connects a fluid pressure sensor to the brake fluid circuit of the vehicle's braking system. Since pressure of the braking fluid indicates how hard the brakes are being applied, the signal from the fluid pressure sensor is a direct measure that can be relatively consistent and accurate over time. The sensor is measuring an existing parameter of the braking system. Brake fluid pressure also can provide a more accurate reading of brake state or level over the entire range of braking operation.

In another aspect of the invention, the expansion of brake light operation comprises a brake light with plural light sources, the plural light sources dividing into sub-sets, each sub-set being independently controllable. In one mode of operation, one sub-set is illuminated upon sensing of light braking of the vehicle. A second sub-set can be illuminated in addition with the first subset for moderate braking. Optionally, third or more sub-sets can be included in a brake light and sequentially added to the illumination of the first and second subsets to indicate further and more severe levels of braking. In this way a visually expanding indication of increasing brake level or state is communicated to a following viewer of the vehicle by sequentially increasing the number of light sources illuminated. The number of light sources in each set and the visual size of its luminance to a viewer can be the same or not between sets. In one aspect of the invention, the number of light sources in each succeeding sub-set illuminated increase over the preceding subset to further convey increasing severity of braking. Also, when braking pressure is reduced, sub-sets of light sources are sequentially turned off in correlation to sensed pressure level. This also allows a viewer to also see when, and how much, braking is reduced.

In another aspect of the invention, the expansion of brake light operation comprises a brake light with plural light sources, the plural light sources divided into sub-sets and each subset independently controllable. In one mode of operation, a first sub-set is illuminated upon sensing of light braking. A second subset is additionally illuminated if braking moves to a more severe state. Optionally third or more subsets can be added to indicate sequentially still further more severe braking states or levels. The subsets are physically arranged in the taillight such that each subsequently illuminated subset expands the illumination horizontally, vertically, diagonally, or a combination of the foregoing. This directional expansion of illumination promotes immediate notice and understanding to viewers on the severity of braking occurring in the vehicle. In one example, at least several of the subsets are adjacent, nested inverted L-shapes. Thus activation of each such subset expands illumination in that tail light in two different directions sideways from an origin in the tail light. In another example, at least several of the subsets are on opposite sides of an origin and expand illumination in two directions away and to opposite sides of the origin. In addition, the illumination contracts in a reverse manner when braking is reduced.

BRIEF DESCRIPTION OF THE DRAWINGS

FIG. 4B is functional schematics and associated mathematical characterization of operation of parts of the circuits of FIGS. 3A and 3B.

DETAILED DESCRIPTION OF EXEMPLARY EMBODIMENTS OF THE INVENTION

A. Overview

Figure 1A:
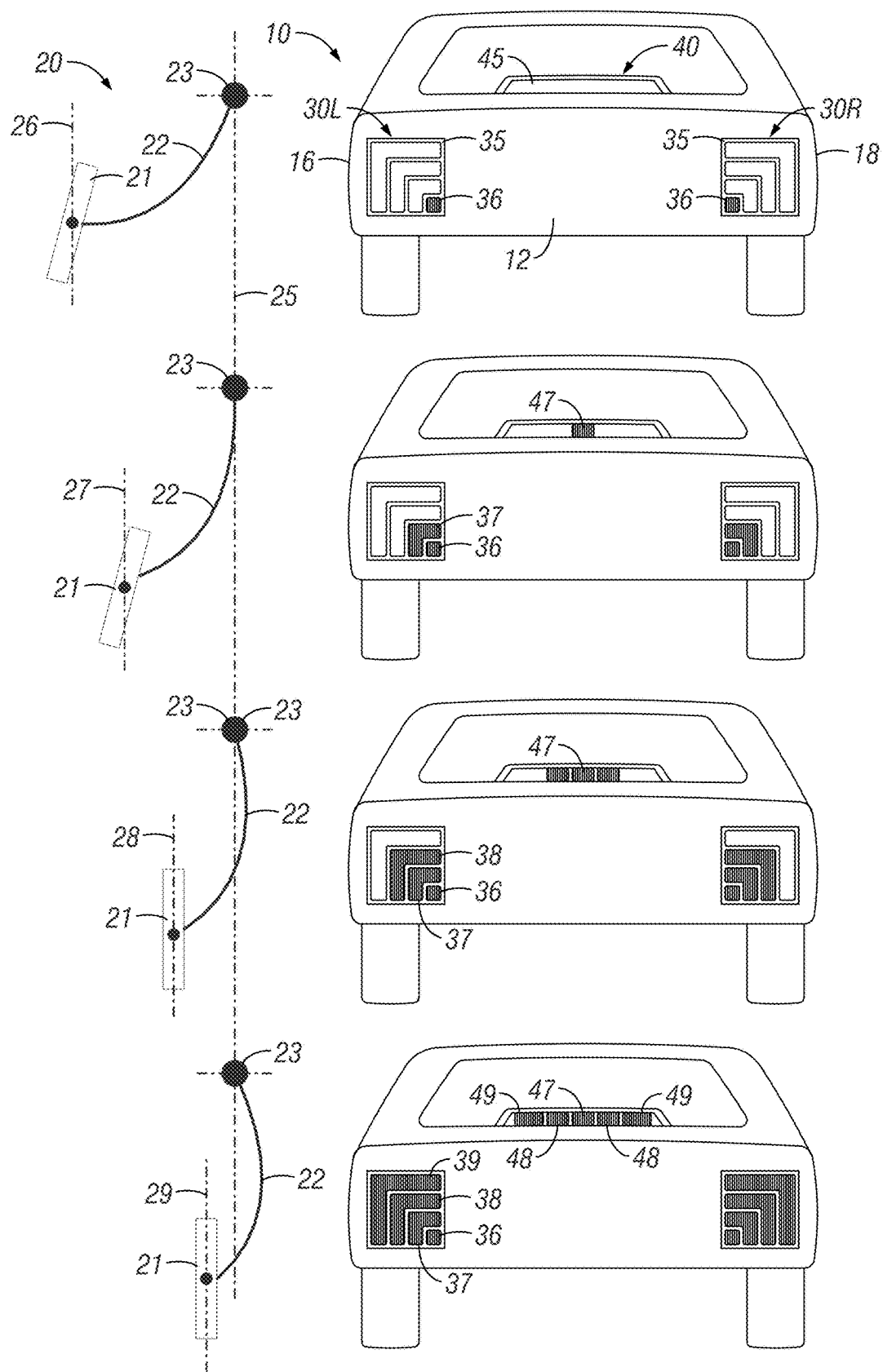
FIG. 1A are diagrammatic views illustrating expanding luminance of brake lights correlated to increasing braking application according to one exemplary embodiment of the invention.

For a better understanding of the invention and its aspects, exemplary embodiments of forms the invention and its aspects can take will now be described in detail. It is to be understood that these examples are for purposes of illustration and neither inclusive nor exclusive of all forms the invention can take.

These embodiments are described in the context of brake lights for automotive vehicles such as cars and trucks. It is to be understood, however, that the invention might be applied in analogous ways to other vehicles including but not limited to trailers, boats, airplanes, trains, farm and construction equipment, animal-drawn wagons, or other moving objects.

There may be situations where visualization of braking would be helpful if the moving object is viewed from the side or front. The invention or some of its aspects might be applied in analogous ways there also.

The examples are described in the context of left and right brake lights, and sometimes in conjunction with a third and center brake light. But it is applicable in analogous ways to a single brake light, a pair, three, or even more.

Also, the specific luminance patterns in the embodiments discussed below have advantages, but the invention and its aspects are not limited to them.

B. General Concept

With particular reference to FIGS. 1A-1D, a depiction of a generalized implementation of aspects of the invention is illustrated.

As is typical, an automobile 10 includes a rear area 12 and rear window 14 inside opposite left and right sides 16 and 18 respectively.

As is also typical, inside are human-machine interface components such as steering wheel, acceleration pedal, and light and air/heat controls, to name a few. Also included is a brake pedal 20 (diagrammatically indicated in FIG. 1A), typically having a pad 21, lever arm 22, and a pivot point or connection 23 (see also FIGS. 5A-5F). Brake pad 21 can be manually pushed by a driver from a normally outward position (no braking) over a range to a maximum (full braking) position. Mechanical (and sometimes electronic or electromechanical) linkage communicates brake position to a hydraulic braking system (FIGS. 5A-F) which, in turn, applies proportional mechanical braking force to one or more of the automobile's wheels.

FIG. 1A diagrammatically illustrates the possible range of brake pad 21 motion to the left side. The top-most is normal, non-braking position where the driver either has not pressed pad 21 at all or is just touching pad 21 but not moving in inward enough to invoke any braking. For purposes of illustration, vertical line 25 illustrates, as a general reference, alignment of the pivot points 23 for each state or level of braking instructed by the driver through operation of brake pedal 20. In normal position, brake pad 21 is farthest away from line 25 (see line 26). In comparison, the bottom-most illustration has pad 21 all the way to its farthest inward position, also indicated by line 29 being closer to line 25 (full or maximum braking). The two intervening positions are light braking (second from top where line 27 is closer to line 26 than line 25 and between lines 26 and 28) and moderate braking (third from top, where line 28 is closer to line 25 than line 26 and between lines 27 and 29).

In a first aspect of the invention, FIG. 1A shows left and right rear brake lights 40L and 40R and a center brake light 50 on the rear 12 and rear window 14 of automobile 10 in typical positions. As illustrated, level or state of braking based on brake pedal position results in different visual displays on brake lights 30L and 30R. Optionally, as further illustrated but not required, center brake light 40 can do the same. As can be seen, in this example, as braking increases, a correlated visual indication is conveyed to the viewer by increasingly expanding luminance. Thus, the viewer would know immediately (at the speed of light minus some small lag between brake pedal movement, sensing, and activation of light source or sources—but virtually real-time), not only automobile 10 is being braked, but a level or state of braking tied to whether, in this example, three braking states or level—light, moderate, or heavy (compare positions 27, 28, and 29). Note that the visually perceivable luminance expands in several ways.

First, the direction expands away from a lower inner corner of each brake light 30L and 30R (towards the respective left side 16 and right side 18 of automobile 10). If the option is applied to center brake light 40, as shown in FIG. 1A, the luminance expands from a center starting point and in opposite directions towards opposite automobile sides 16 and 18.

Secondly, the size (the perceived area) of the luminance increases. It is additive over each successive level or state of braking. With brake lights 30L and 30R, each successive added luminance not only increases total area by addition with the luminance activated by the prior state or level, but each added luminance adds a larger perceived area than the last. In this example it is accomplished in lights 30L and 30R by right angle or inverted L-shapes that basically nest within one another, but have roughly the same width along their respective longitudinal axes.

In the optional center brake light example of FIG. 1A, increasing luminance added at each level or state of braking is basically the same area. But cumulatively, each added luminance increases the overall area of luminance, as shown in FIG. 1A.

Thus, in this example, when changing from no braking (pedal position 26) to light braking (pedal position 27), a first L-shape luminance output area appears (see reference number 37) at each brake light 30L and 30R. If brake pedal 20 is depressed sufficiently further, a second L-shape 38 is also activated. First L-shape 37 stays on and second L-shape 38 is added. This increases overall luminance area and expands in direction. If brake pedal is further depressed, third L-shape 38 is activated (the other two, namely 36 and 37 stay on), so that all three, 36, 37, and 38 are on and produce still further directional expansion and size of luminance. In the case of center brake light 40, center luminance 47 comes on with first L-shape 37 of brake lights 30L and 30R; then two opposite side sections 48 with left and right brake light sections 38; and then two additional opposite side sections 49 with left and right brake light sections 49.

Thus, the following vehicle driver is informed what level or state of braking exists in automobile 10 and, in particular, is informed what state or level from plural states or levels (here three) by steady-state indication of light braking, additive steady state of moderate (the illuminance of light braking is left on and the added luminance of moderate braking is turned on and added); and additive steady state of heavy braking (illuminance of light, moderate, and heavy are all on at same time). In this example, again, the additive luminance is expansion in size and direction.

It is to be further understood, that these illuminations (producing commensurate luminance that is perceivable by viewers), follow almost instantaneously the current brake pedal position of automobile 10. Therefore, if the driver of automobile 10 taps pedal 20 lightly and quickly, and releases, just first luminances 37L, 37R, and 47 would appear. If the driver goes right to moderate braking such that pedal moves, for example, to position 28 in FIG. 1A in ⅓ of a second, first L-shapes 37 would light up first but second L-shapes 38 would quickly follow and on the order of ⅓ second, with only minimal lag. Thus, first L-shapes 37 would illuminate first, but second sections 38 would quickly follow. The response time of the human eye is generally fast enough to perceive those separate events. Thus, the viewer would see a quick expansion of luminance diagonally directionally (and oppositely relative each brake light 30L and 30R) almost instantaneously with the driver of vehicle 10 putting on the moderate braking state or level. The viewer is thus immediately informed of this and can adjust accordingly, if needed.

If the driver of automobile 10 then lifts off brake pedal 20, as it returns to normal (unbraked) position 26, it would first move in that direction from position 28. This would cause L-sections 38 to turn off. As pedal (automatically by return force inherent in typical braking systems) then moves to and past pedal position 27, L-sections 37 would turn off. Typically this automatic return (once driver has lifted foot off the brake pedal) is quick, perhaps on a similar time frame of a fraction of a second. The viewer in a following vehicle would thus see a quick (perhaps in a second or less) retraction of size and direction of luminance. This communicates to the following driver that all braking has ceased in automobile 10.

However, if pedal 20 is moved to moderate braking position 28, and left there, L-sections 28 would remain on until pedal 20 is moved out of that braking level or state. Thus, if pedal 20 is totally released, quite quickly all L-shapes 38 and 37 would extinguish. But if pedal is not totally released but allowed to move back to at or near position 27, first L-shapes 27 would stay on until pedal 20 is fully released, or moved oppositely into levels 28 or 29.

As can be appreciated, in this example left and right brake lights 30L and 30R operate concurrently and the same, except that luminance expansion and contraction is mirror-image. Therefore, for brevity, only one brake light 30 will be focused upon.

Additionally, center brake 40 works in a similar fashion to brake lights 30L and 30R, except that expansion and contraction of luminance over various brake pedal positions is adding similar sized luminance to opposite sides of a single center luminance 47. As can be appreciated, adding luminance 48 essentially triples the area of luminance 47, so that luminance expansion is greater than linear and also is in two opposite directions. In this example, further added luminance 49 would be the same as added luminance 48, but by addition, overall size of luminance is expanded and the viewer sees directional expansion in opposite directions.

In contrast, added luminance 38 and 39 each are bigger in area relative to luminance 37 and each other. Add expansion in not only in total area but in a direction oblique from horizontal or vertical (e.g. diagonal). In a sense it might be considered expansion both horizontally and vertically, but a viewer would get a perception of expansion and retraction diagonally.

As can be further appreciated, if the driver of automobile 10 jams on or as quickly as physically possible moves brake pad 21 from normal position 26 all the way to maximum position 29, such as in emergency or panic braking, pad 21 would physically move through positions 27 and 28 before it reaches maximum position 29. Therefore, L-shapes 37 and 38 would illuminate sequentially before L-shapes 39, but this might happen within a fraction of a second. Depending on the physical speed of manual pedal movement and the perception limit of the human eye, a viewer would either see sequential illumination of L-shapes 37, 38, and 39 or may perceive more of an immediate illumination of all three shapes 37, 38, and 39. In either event, the viewer would, on the order of real-time with pedal movement, be informed automobile 10 is in maximum braking mode, level, or state. Assistance in recognizing that braking state is assisted by an almost immediate transition from no or small running-light type luminance, to a brighter almost explosion of luminance, expanding in size and at least one direction. Compare this to mere tapping of brake pedal 20, which would give a quick flash of small L-shapes 37. And, as described above, all L-shapes 37, 38, and 39 would stay illuminated so long as brake pedal 20 is fully depressed. This would help the following drivers understand better the state of automobile 10. If pedal 20 is released to at or about position 28, L-shapes 39 would be de-activated. If pedal 20 is released to at or about 27, L-shapes 38 would also be de-activated. If pedal 20 is released to at or about position 26, all L-shapes including L-shapes 37 would be deactivated. De-activation would also be in almost real time with pedal position 20.

In this embodiment, a relatively small (but perceptible at required distances such as, e.g., 500 feet, by a following vehicle under some highway regulations) luminance 36 is constantly on (at least when automobile headlamps are turned on, but could be at all times as basically rear running lights) even when brake pedal 20 is not depressed. Here, these areas 36 are relatively small compared to any of the L-shapes 37, 38, or 39, and are in the lower inboard corner of each brake light 30L and 30R. These shapes 36 are shown square or rectangular and serve as basically rear running lights when no braking is applied. When braking is applied, the luminance expands directionally and in size diagonally away towards the outboard sides of automobile 10. These are not required. Note that in this example the center brake light 40 does not have such a running light. As illustrated in FIG. 1A, in this embodiment, when running lights 36 are on, a viewer would see that luminance (here red as shown by hatching indicating the color red). This would typically be through a lens 35 that encloses one or more light sources behind it. Thus, as illustrated in FIG. 1A, when no braking is applied in automobile 10, a blank lens 35 (no luminance) would appear at center brake light 40. Luminance by activation of any of the brake lights 30L, 30R, or 40 is illustrated by hatching indicating the color red.

As will be appreciated by those skilled in this art, the color might be different than red. The color of each section or shape might vary from at least one other, and/or the color might be variable by use of variable color light sources or lens. However, in this example, all luminance is red as is typical for brake lights.

As will be further appreciated, FIG. 1A is intended to illustrate that a general aspect of the invention is displaying a visually discernable change in luminance presented to viewers proportional to level or state of braking of a vehicle. Such differences in luminance can be generated in different ways.

For example, some embodiments (discussed below) use plural individual light sources (e.g. LEDs) in pre-determined patterns that produce illumination or light output in the desired shapes. LEDs could be placed in generally or even approximately a bunched or rectangular array to produce a generally square or rectangular luminance for shapes 36 of FIG. 1A. LEDs could be placed linearly or in spaced apart bunches along vertical and horizontal legs of each L-shape 37, 38, and 39 to produce generally L-shaped luminance. Linear arrays of LEDs could be placed in each area 47, 48, and 49 of center brake light 40 to create generally linear luminance.

As will be appreciated by those skilled in the art, such luminance can be produced essentially from the light sources themselves. For example, LEDs can emit at wavelengths which are perceived as the color red by the human eye. By appropriate selection of LED type, intensity, output color, and light output distribution, as well as placement in brake lights 30L, 30R, and 40, the light output of such plural sources themselves would be averaged by the human eye and perceived as the desired shapes. The perceived luminance in those shapes, even though produced by plural individual light sources, is like how the human eyes perceives and identifies shapes (some very complex) on a pixelated display made of many individual pixels. On the other hand, optical components such as filters, lens, reflectors, diffusers, and the like, or combinations of one or more, can be used to create the desired luminance in shape, direction, intensity, uniformity, and other lighting characteristics. For example, other types of light sources (incandescent, halogen, xenon, other solid state, etc.) might be used. Also, instead of plural light sources for each shape, it may be possible, at least for some shapes, to use single light sources and tune light output as desired by using type of light sources (they can differ between shapes), how they are powered (which can vary the intensity of light produced), and optical components (like lens, color or other filters, reflectors, etc.). For example, it may be possible to use a single light source for each shape 36, 37, 38, and 39, and by controlling/manipulating its output, produce a desired luminance at each shape. It may even be possible to share a light source between shapes (e.g. by shutter, light value, movable reflector, etc.).

Therefore, as can be appreciated, the foregoing shows, in generalized examples, aspects of the invention can be implemented in a variety of forms which transduce current braking level (directly or indirectly) from human-machine interface operation (manual operation of brake pedal) to perceivable luminance which expands and contracts (horizontally, vertically, diagonally, in combination, or otherwise) proportionally to amount of current braking of the vehicle over a range of braking levels or states. As will be appreciated, the specific shapes of luminance can vary. The shapes in FIG. 1A are one example. As can be further appreciated by those skilled in the art, the nesting of the L-shapes presents an aesthetically pleasing appearance.

Figure 1B:
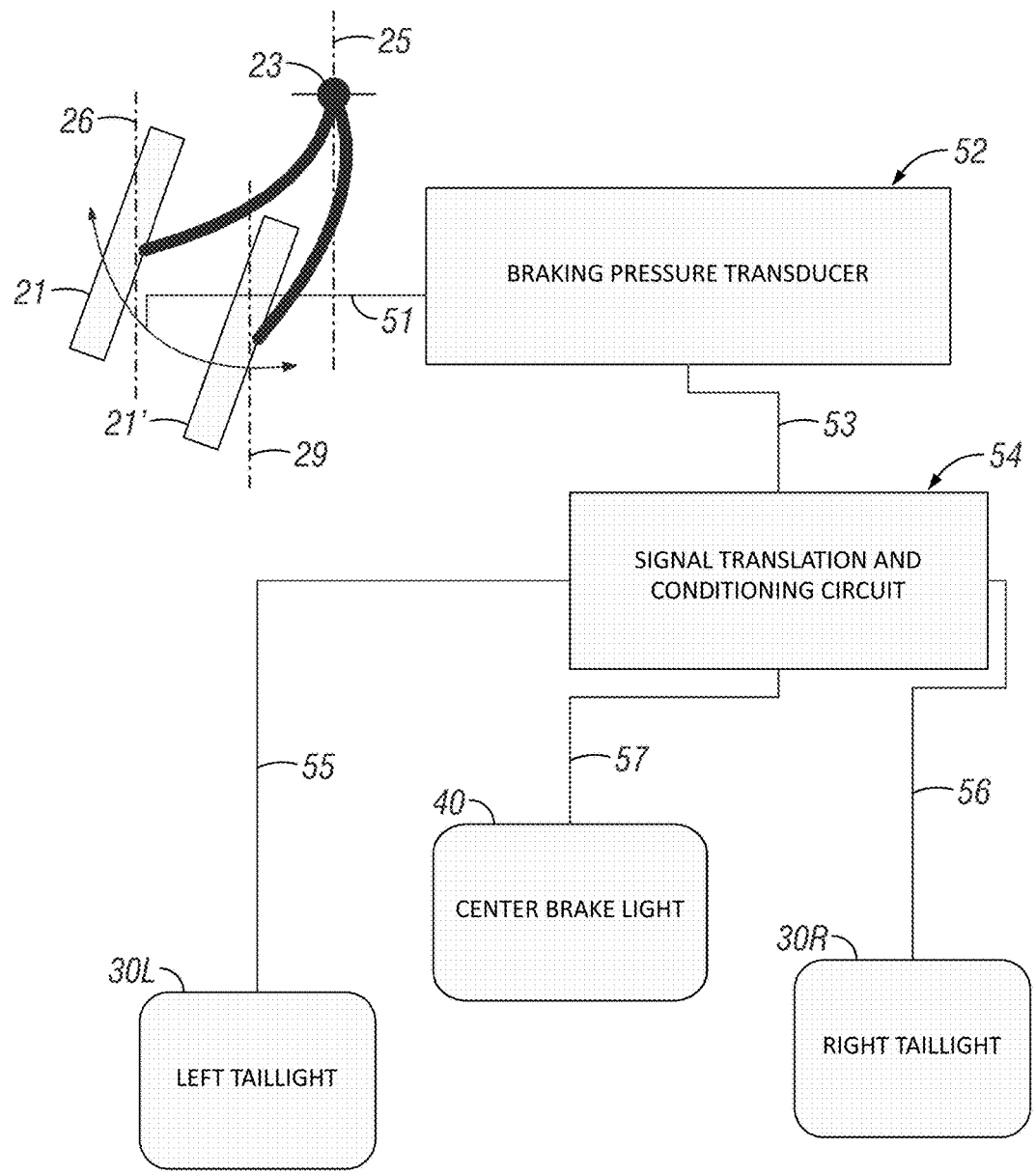
FIG. 1B is a diagram of a brake light system that can be used to effect the lighting output of FIG. 1A.

FIG. 1B illustrates generally the major components of a system 50 to effectuate the function of FIG. 1A. A braking pressure transducer 52 would sense, measure, transduce, or otherwise derive (via some operative connection 51) some characteristic, directly or indirectly, of braking level or state of automobile 10. Transducer 52 would convert that braking level or state into an electrical or other signal which could be communicated (via some link such as but not limited to hard wire connection 53) to a signal translation and conditioning circuit 54. Such a circuit could translate the signal into a form which could instruct (via some link such as but not limited to hard wire connection 55, 56, 57) the operation of light sources at any of brake lights 30L, 30R, or 40 to produce a desired luminance as described above. System 50 can be installed as original equipment to vehicles or retrofitted.

Figure 1C:
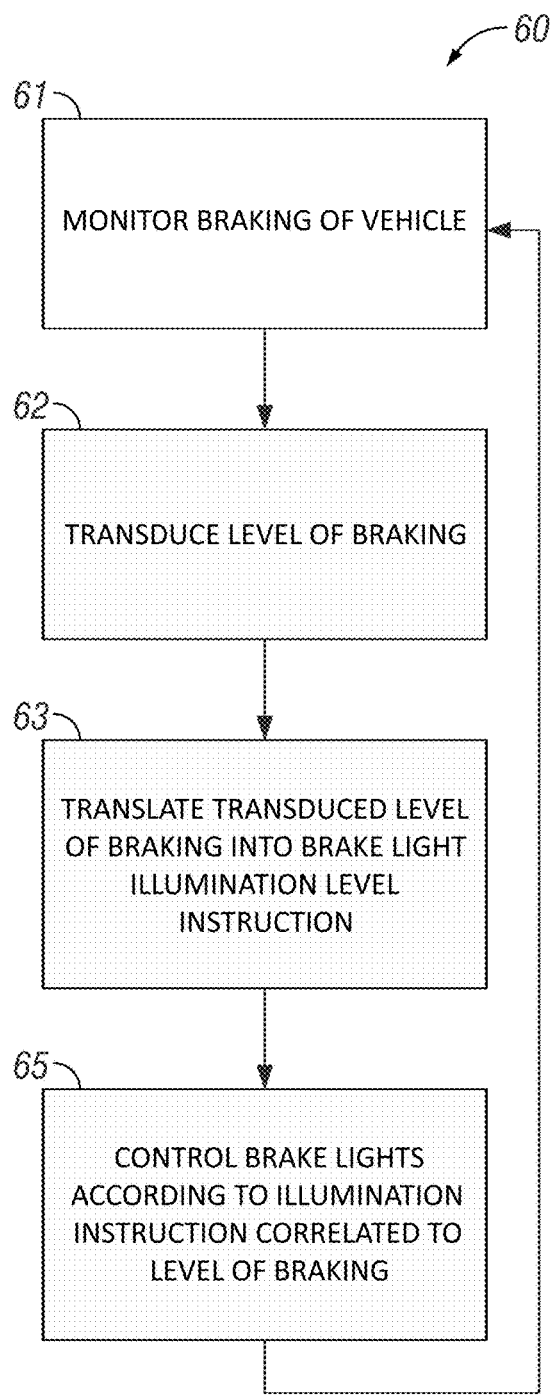
FIG. 1C is a flow chart of operation of the system of FIG. 1B.

FIG. 1C gives a generalized method 60 of brake lighting. Braking of a vehicle can be continuously monitored (step 61). One example is a transducer 52. A level or state of braking, from pre-determined discrete levels or states which can be differentiated by the monitoring, is derived (step 62). The transduced level or state is translated to brake light illumination instructions (step 63) corresponding to a braking level or state. The brake light illumination instructions are automatically acted upon to control the brake lights to create human-perceivable luminance correlated to the level or state of braking currently existing in the vehicle. A human viewer of the luminance would have immediate visual information that could be useful in regulating the viewer's choices and actions. If the viewer is in a following moving vehicle, the information can be processed quickly and may help avoid a collision or accident with the braking vehicle. It further may help the viewer brake or manipulate the viewer's vehicle in a way that deters vehicles following the viewer from rear-ending the viewer's vehicle.

Figure 1D:
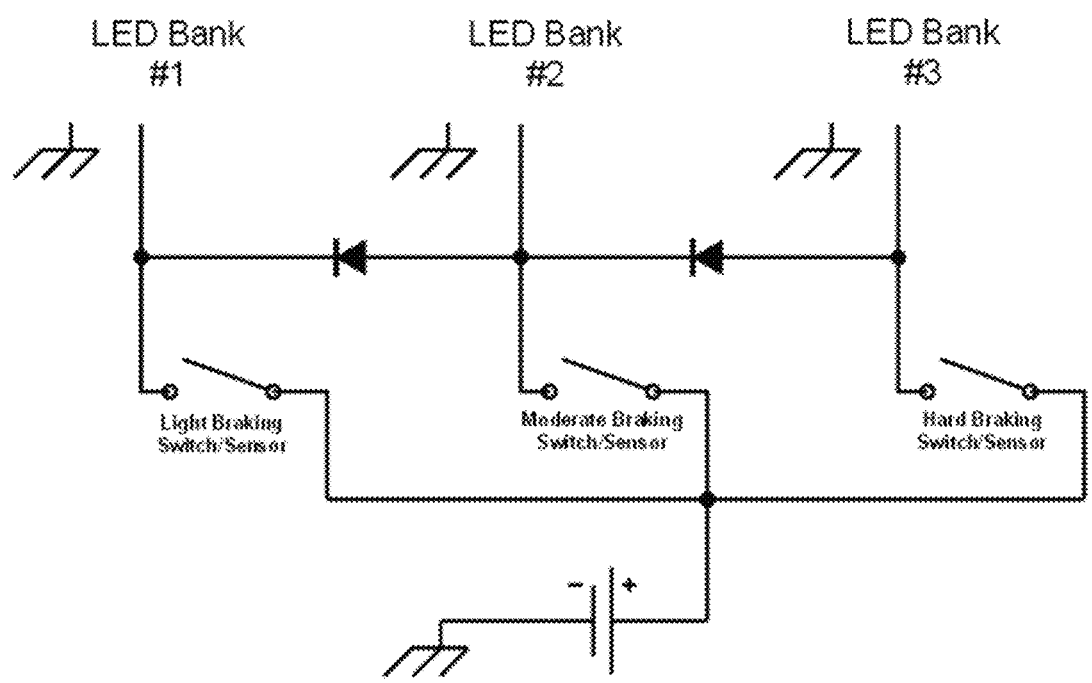
FIG. 1D is a highly generalized circuit schematic of the system of FIGS. 1A-D.

FIG. 1D presents one example of how the invention can be implemented through electrical circuitry. The sensing of different braking levels or states can conceptually be thought of in terms of switching on or activating one sub-set of light source(s) when a first level or state of braking pressure (e.g. light braking) is transduced. Power from an electrical power source (e.g. dedicated and independent or, alternatively a vehicle source such as automotive battery or electrical system) is essentially switched in to the first bank (e.g. LED bank #1). When a second level or state of braking pressure is sensed (e.g. moderate braking), a second light source(s) is activated (e.g. LED bank #2). Likewise for a third light source(s) (LED bank #3) if heavy braking pressure level or state is sensed. By use of appropriate electrical communication and conditioning (e.g. regulating appropriate current/voltage/power, suppressing noise and transients, and other steps), the braking system can be considered "smart" in the sense it can automatically communicate a plurality of braking levels or states in an effective and efficient way to viewers.

Several more specific examples of implementing one or more aspects of the invention follow.

C. Specific Example 1—Sense Brake Fluid Pressure and Present L-Shapes

With particular reference to FIGS. 2A-B to FIGS. 7A-D, a more specific example of implementation of at least some aspects of the invention can be seen.

This example (indicated sometimes generally at reference number 100) is configured to operate similarly to the generalized example in the following way. Brake lights are the same or similar to those depicted in FIG. 1A. They have square running lights and three nested inverted L-shapes of increasing sizes. Thus there are four light levels, namely running lights as the first, but then three possible braking levels or states (light, moderate, and heavy). When brake pressure is sensed (other than no brake pressure), system 100 activates light sources proportionally to sensed braking pressure level or state by sequential additive illumination (or sequential subtractive illumination) as described above regarding FIGS. 1A-D. Therefore, specifics about that functional outcome will not be repeated here.

To the extent any differences exist from the generalized example, or there are details specific to this system 100, they are set forth below.

First, brake pressure is directly measured by sensing current pressure of brake fluid in the automobile 10 braking system. See FIGS. 5A-F and 6A-D.

Second, luminance for each braking level or state is created by activation of sub-sets of plural LEDs in the nested L-shapes/running light configuration. See FIGS. 7A-D.

Third, the measured brake fluid pressure signal is conditioned in a specific way. See FIGS. 3A-B and 4A-B.

A brake light system 100 was created whose lights (LED sub-sets 102, 104, 106, and 108) illuminate according to the pressure applied on the brake pedal 120. Three basic functions of this system 100 were identified, as follows:

Pressure Sensor (110): Measures the pressure applied on the brake pedal
Op-Amp Circuit (140): Analyzes the measured pressure and sends out the required signal
Light Display (130): Light intensity These three functions were individually analyzed to interpret the interaction with one another. The pressure sensor 110 is a microelectromechanical systems (MEMS) device that converts the input physical quantity to an electrical output. This electrical output is taken as the primary input by the op-amp circuit 140. The registered electrical input is then compared with the pre-defined values and, accordingly, the circuit 140 will give an electrical output to the light display 130. The light display 130 will illuminate according to the input received from the op-amp circuit 140. One can see the interactions among these three functions in the function flow diagram, shown in FIG. 2B.

The units for output and input for each function have been defined, as shown in Table 1.

TABLE 1

| | Input Function | |
|---|---|---|
| Function/Block | Input | Output |
| Pressure Sensor | Type: Force or Pressure Units: N or PSI | Type: Electrical Voltage Unit: V |
| Op-Amp Circuit | Type: Electrical Voltage Unit: V | Type: Electrical Voltage Unit: V |
| Light Display | Type: Electrical Voltage Unit: V | Type: Brightness Unit: Lux (Lumens/area) |

There are various MEMS devices in the market that will convert pressure applied to the brake pedal to a voltage output. A fluid pressure sensor, potentiometer, piezoelectric, and square force sensitive resistor were all considered.

Most of the present designs for similar illumination systems have used potentiometer and piezoelectric devices.

Figure 6A:
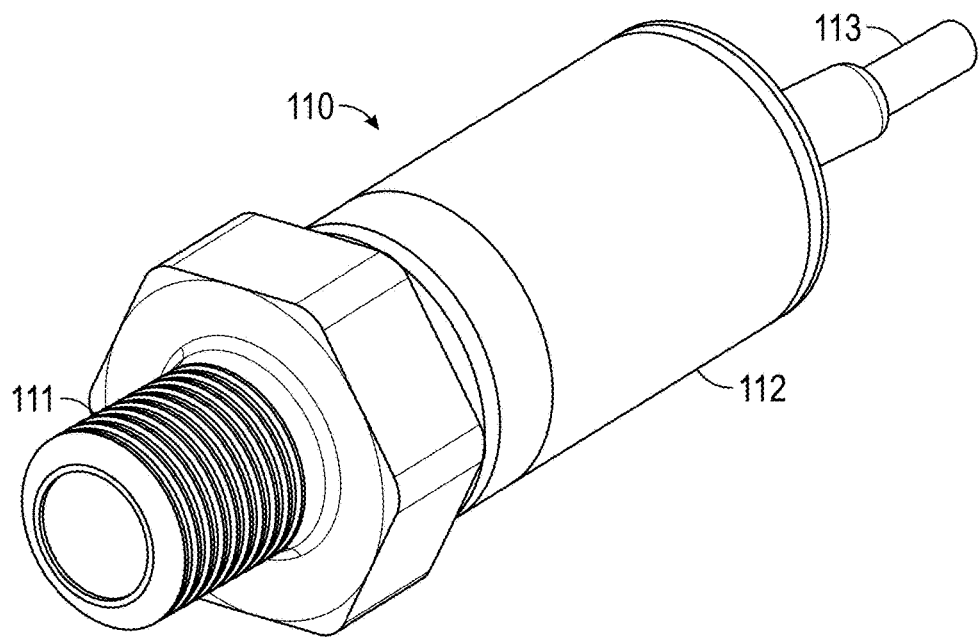
FIG. 6A is an enlarged view of a typical commercially-available fluid pressure sensor that can be used in the embodiment of FIG. 2A.
Figure 6B:
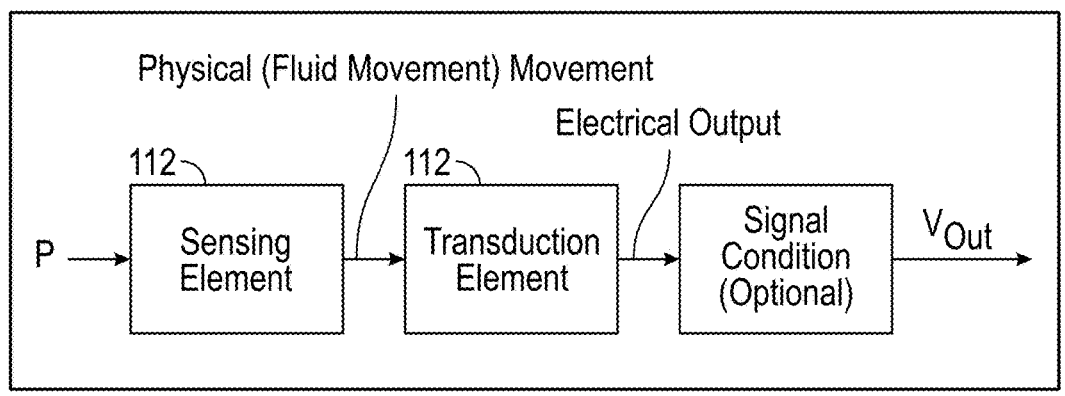
FIG. 6B is a schematic illustration of placement of the pressure sensor of FIG. 6A into the embodiment of FIG. 2A.

The square force sensitive resistor doesn't have a high range of input force, which is a primary requirement for the system, so the decision was made to implement an industrial grade fluid pressure sensor. One example is shown in FIG. 6A. Its basic form is a threaded tubular connection 111 as an input for fluid to be sensed, a body housing a fluid pressure transducer 112, and an output cable 113. Such transducers are well-known, commercially available, and convert sensed pressure of fluid in the input 111 to an electrical signal correlated to sensed fluid pressure. That signal can be communicated through cable 113 to circuit 140.

Another example of sensor 110 is Model PX309, commercially available from Omega Engineering, Inc. of Stamford, Conn. (USA). Details about the sensor are available at www.omega.com/pptst/PX309.html. It has an externally threaded male connection. It is robust and considered effective for a reasonable operating life under the conditions and environments experienced by a typical automobile (e.g. temperature range of −40° F. to 185° F., moisture exposure, vibration exposure, fluid pressure range, etc.). It can be easily connected to one of the available measuring points at or about a master brake cylinder of most typical automobiles by (a) removing an existing attached component in fluid communication with brake fluid in the master cylinder, substituting compatible leg 116 of a tubular T-connector 115, and then reattaching the original removed component to leg 117 of T-connector 115, and input end 111 of pressure sensor 110 to third leg 118 of T-connector 115. In this way, pressure is measured right at master cylinder 124 (see. e.g., FIG. 6C), the function of the removed original component is preserved, and brake fluid pressure experienced at master cylinder 124 of the automobile 10 braking system is directly measured over the entire range of pressures experienced there.

The basic function of the op-amp circuit 140 (see FIG. 3A) is to compare the voltage inputs, sent by the pressure sensor 110, with the pre-defined voltage levels, giving the corresponding voltage output. Suppose the pressure sensor 110 gives an output of $V_{in}$ and the light housing has four pre-defined values of $V_1$, $V_2$, $V_3$ and $V_4$. If $V_{in}$ is greater than $V_1$, the circuit 140 will give a voltage output of 1 volt. This will give an initial brightness or intensity to the light display 130. If $V_{in}$ is greater than $V_1$ and $V_2$, the system 100 will give an increased voltage output of 2 volts, which will increase the brightness of the light display 130. In all, as $V_{in}$ becomes greater than $V_1$, $V_2$, $V_3$ and $V_4$, the circuit 140 will give the maximum output of 5 volts resulting with a maximum brightness of the light display. For this function there was only one solution, a comparator.

Figure 2A:
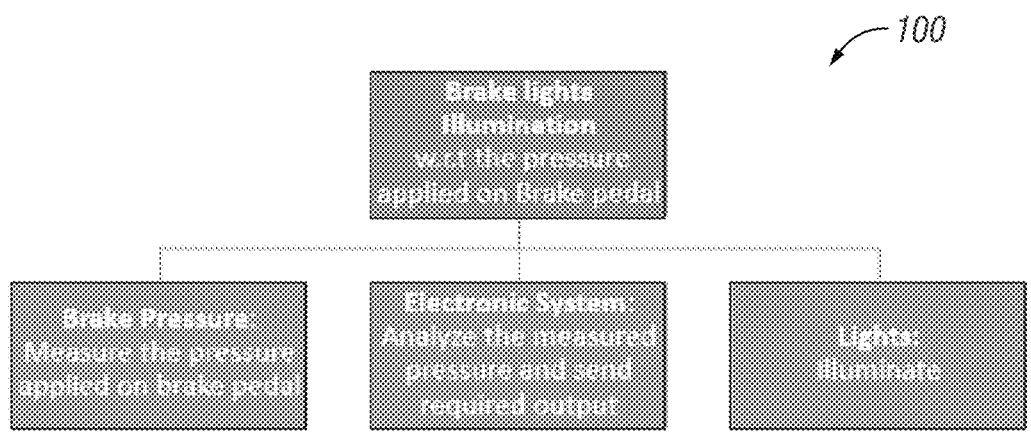
FIG. 2A is a block diagram of a specific example of a braking system of the type of FIG. 1B according to an exemplary embodiment of the present invention.
Figure 2B:
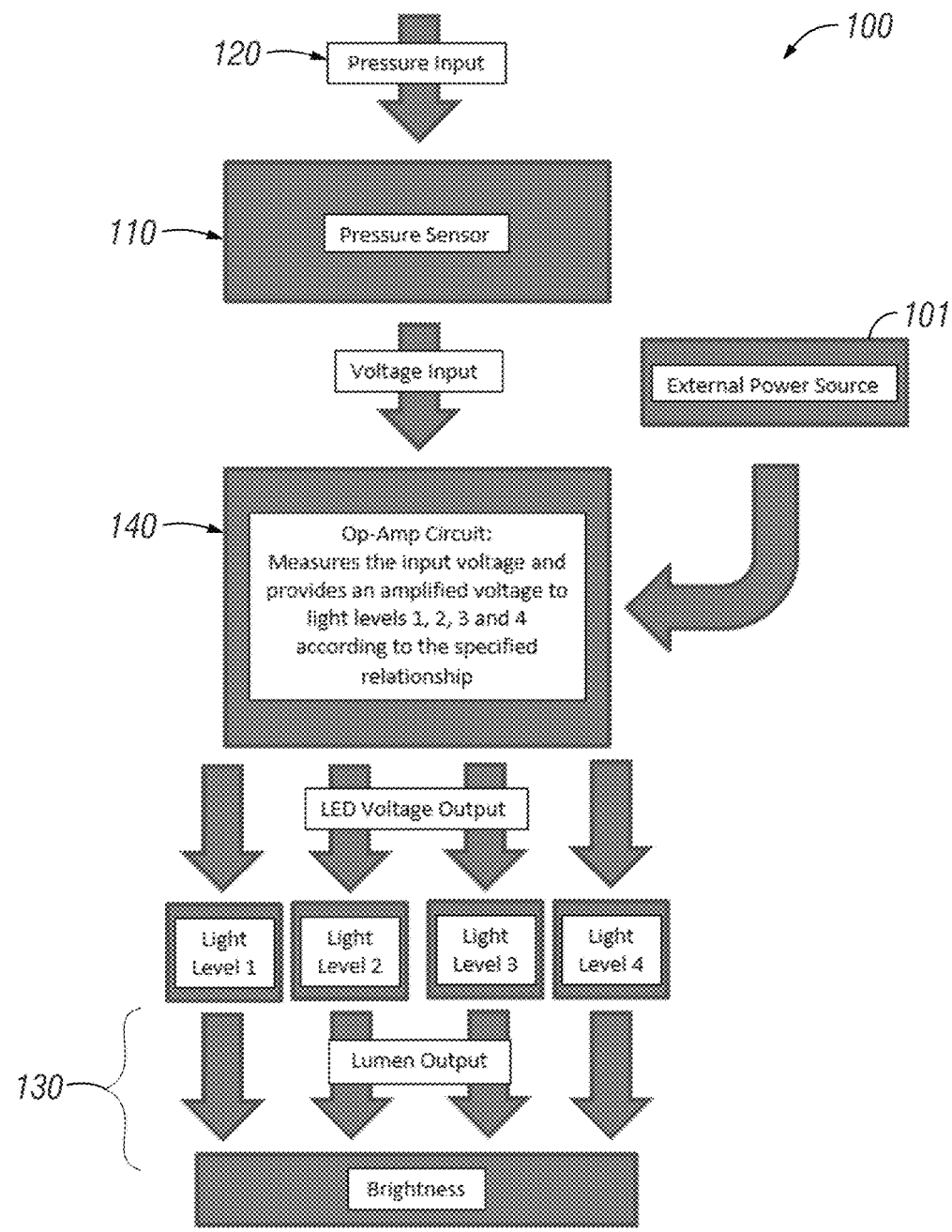
FIG. 2B is a more detailed functional diagram of the system of FIG. 2A.

The light display 130 has four levels of lighting (see FIG. 2B). The first level will give basic brightness (e.g., running lights like 36 in FIG. 1A) and, as the pressure and the input from the op-amp circuit 140 increases, each level will light up and gradually increase the brightness of the light display 130. For the lighting display, a number of different arrangements were considered: 4 single LEDs, LED array, and 4 standard bulbs. The led array was chosen because LEDs are small, easy to fit into the housing, and can change the required intensity by adjusting the number of LEDs in the array. Sample calculations can be seen in FIG. 4B.

1. Evolution of the Design

The overall design had 4 components, namely:
Installation of fluid pressure sensor
Op-Amp Circuit
LED array
Lighting Housing 2. Installation of the Pressure Sensor The pressure applied on the brake pedal 120 (FIGS. 5A-F) is translated to the fluid in the brake lines 125 and master cylinder 124; it was decided to take pressure readings from either the brake lines or the master cylinder. As stated above it was decided to use a fluid pressure sensor. Installing the pressure sensor in the brake lines could lead to issues with product warranty. Therefore, it was decided to install the pressure sensor in the master cylinder.

Figure 6C:
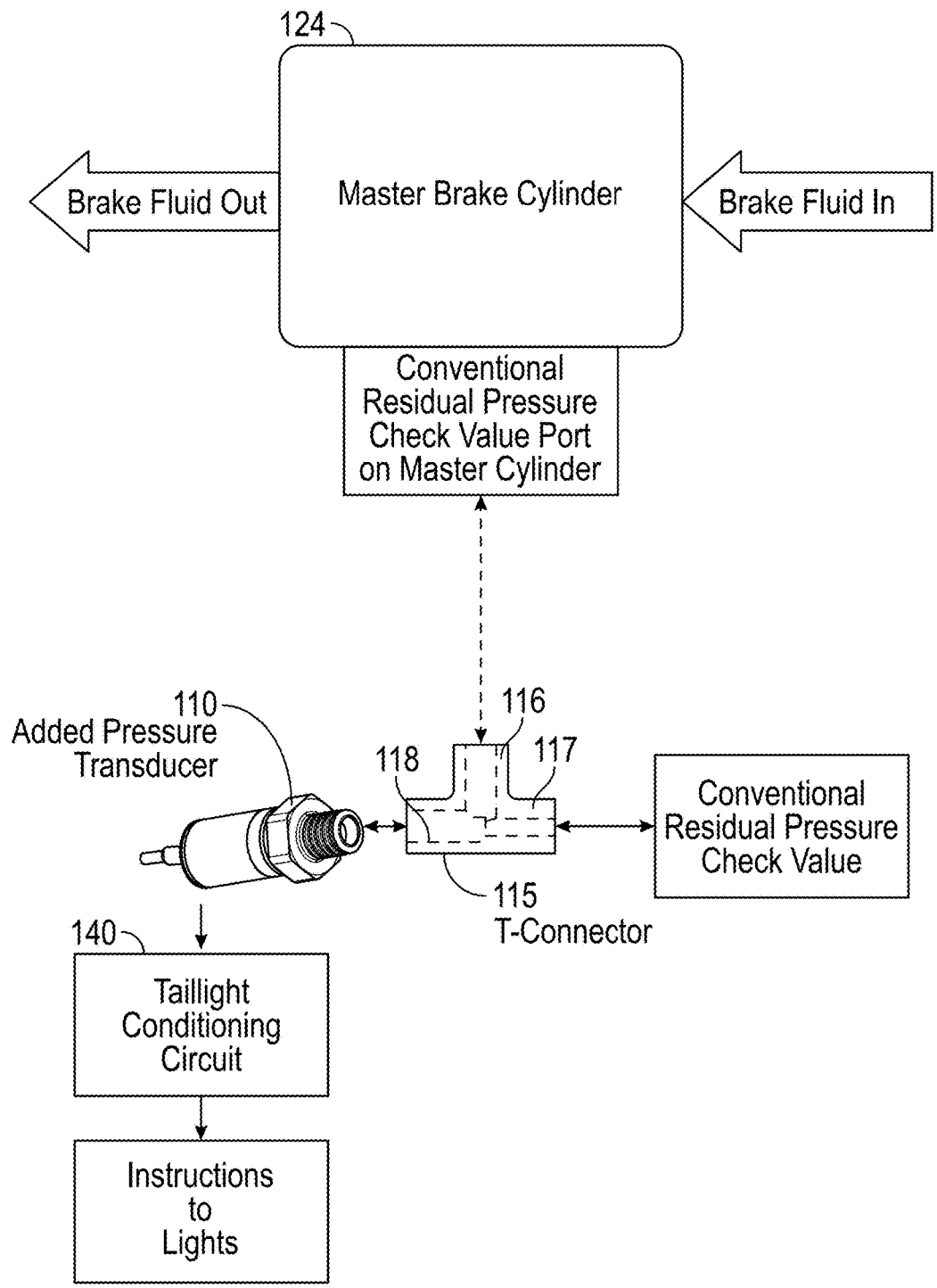
FIG. 6C is an overall schematic of the embodiment of FIG. 2A.
Figure 6D:
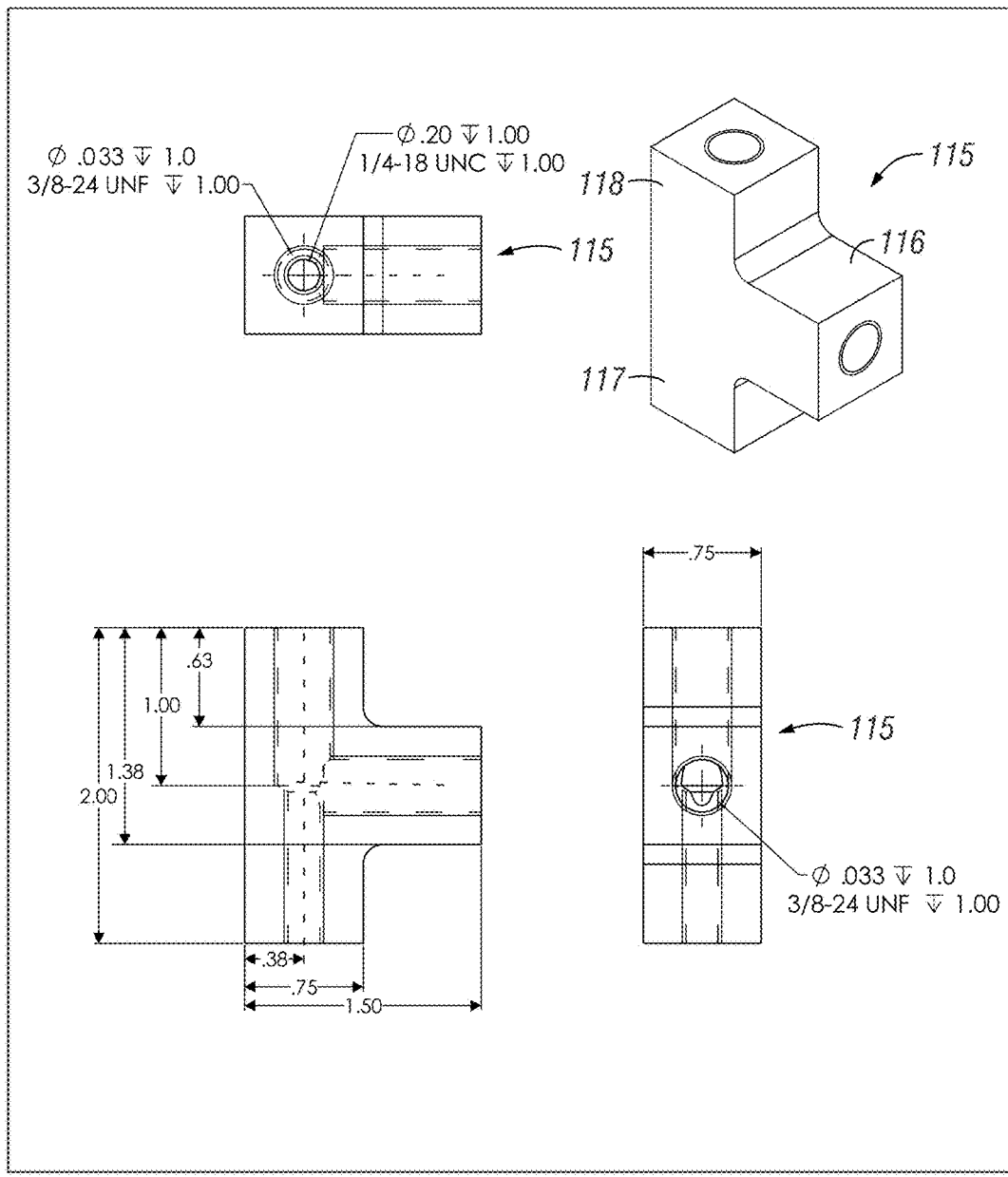
FIG. 6D are perspective and isometric views of a T-connector allowing the pressure sensor of FIG. 6A to be operatively installed relative a master brake cylinder such as in FIGS. 5A-F to sense brake fluid pressure according to the embodiment of FIG. 2A.

To install the pressure sensor 110 on the master cylinder 124 it was considered to place an adaptor or a t-connector 115 (FIGS. 6C and 6D). Making an adaptor for a particular master cylinder isn't a good solution. It would be difficult to make adaptors for every type of master cylinder. A t-connector is universal and it is very easy to install on different types of master cylinders. Upon analyzing the options it was decided to finalize a t-connector for the installation of the pressure sensor onto the master cylinder.

Figure 5A:
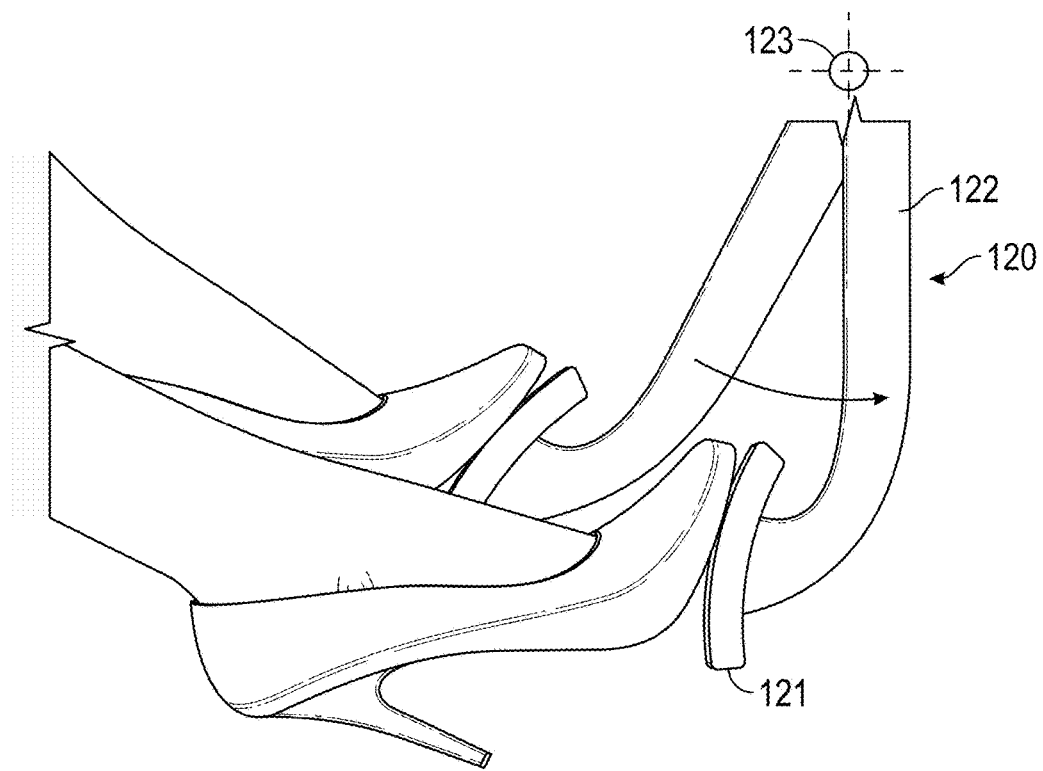
FIG. 5A is a diagram of a typical automobile brake pedal physical movement.
Figure 5B:
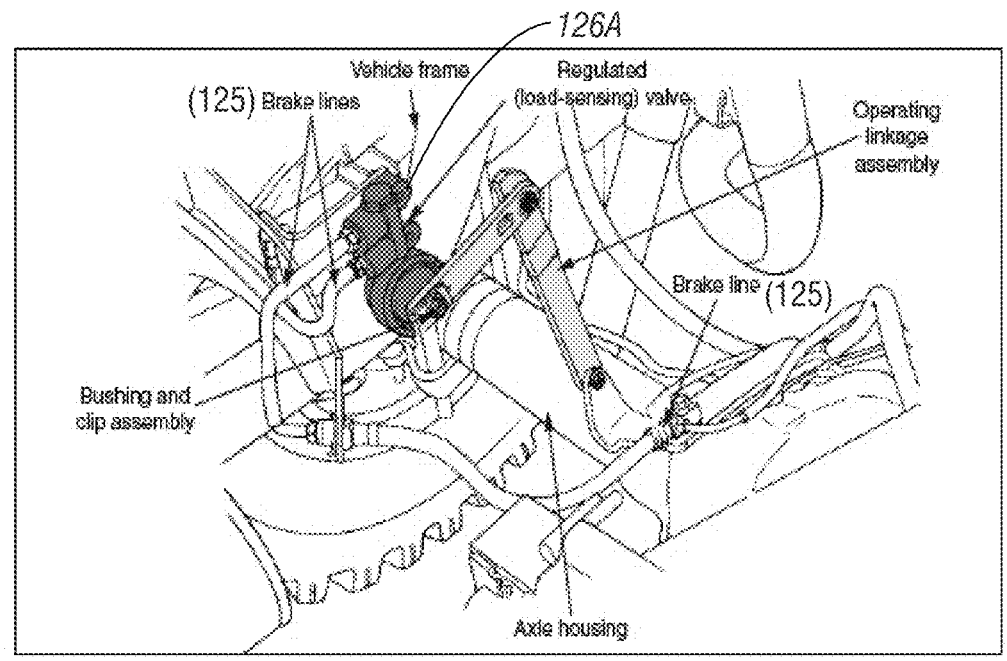
FIG. 5B is an overall view of brake pedal, mechanical linkage, load-sensing proportioning valve and other components of a typical automobile braking system.
Figure 5C:
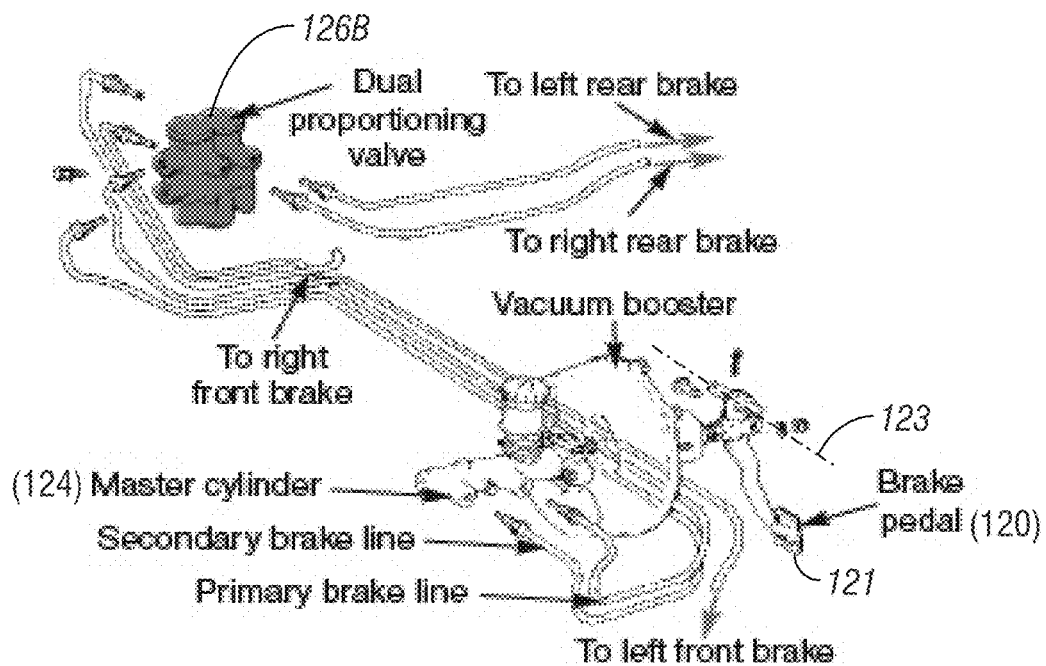
FIG. 5C is an isolated view of the proportioning valve and master cylinder and brake lines associated with a typical automobile braking system.
Figure 5D:
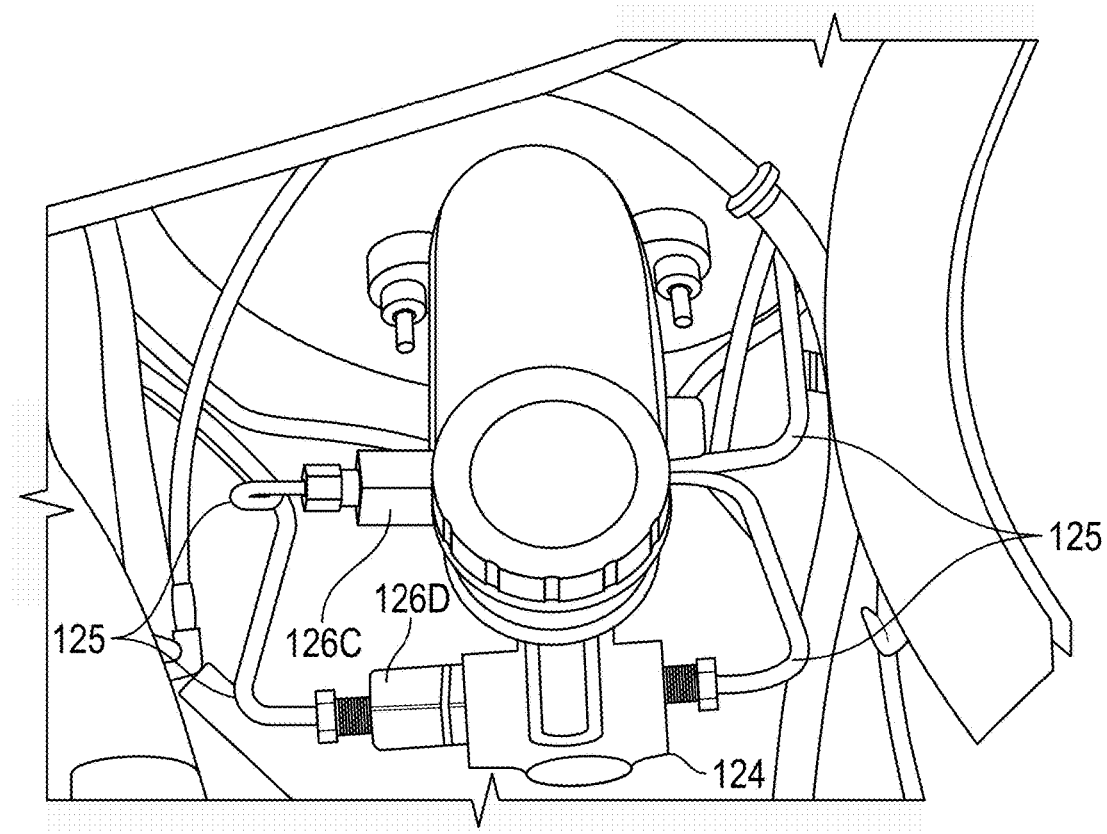
FIG. 5D is an enlarged view of the master cylinder and proportional valves for a typical automotive braking system.
Figure 5E:
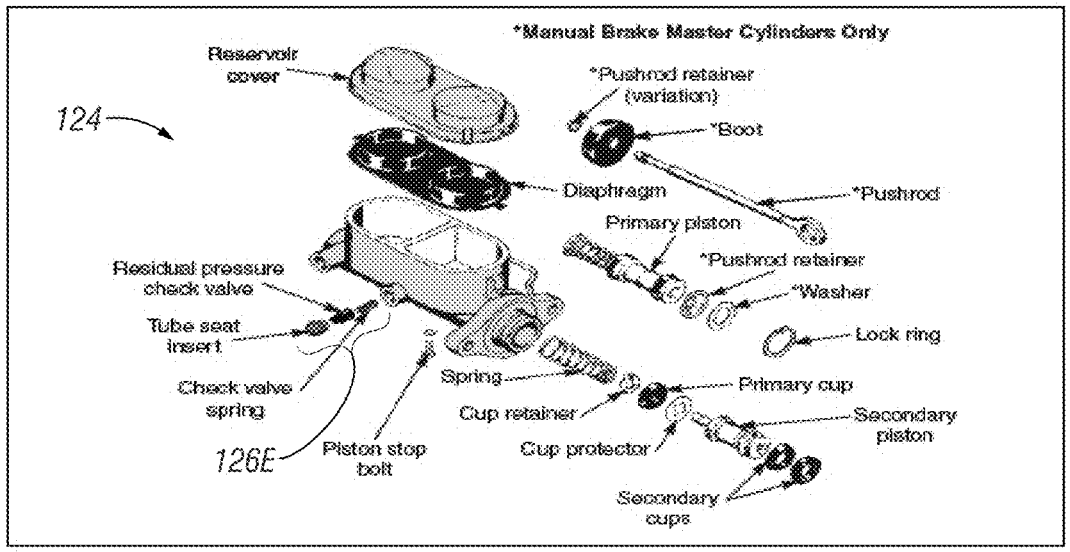
FIG. 5E is an exploded view of the master cylinder and residual pressure check valve of a typical automobile braking system.

As can be appreciated by those skilled in the art, there are a number of places relative a master cylinder that a universal t-connector could be mounted. FIGS. 5B-E illustrate some examples. Of course, the t-connector would have to mate in a complementary way with its mount to master cylinder 124. FIGS. 5B-E show such a t-connector mounting location could be at one of the following:

Regulated (load-sensing) valve (FIG. 5B);
Dual proportioning valve (FIG. 5C);
Side ports for proportioning valves (FIG. 5D);
Residual pressure check valve (FIG. 5E).

In each case, the t-connector would allow addition of the pressure sensor but also re-establishment of any component removed to allow mounting of the t-connection. In the alternative, if there is a port or connection at or near the master cylinder that is unused but in fluid communication with brake fluid at operating pressure, a pressure sensor might be attached directly there, or a t-connector could be used and leg 117 plugged or closed.

In any event, there would typically be at least one practical place for mounting of pressure transducer 110 to measure brake fluid pressure at or near master cylinder 124.

Figure 5F:
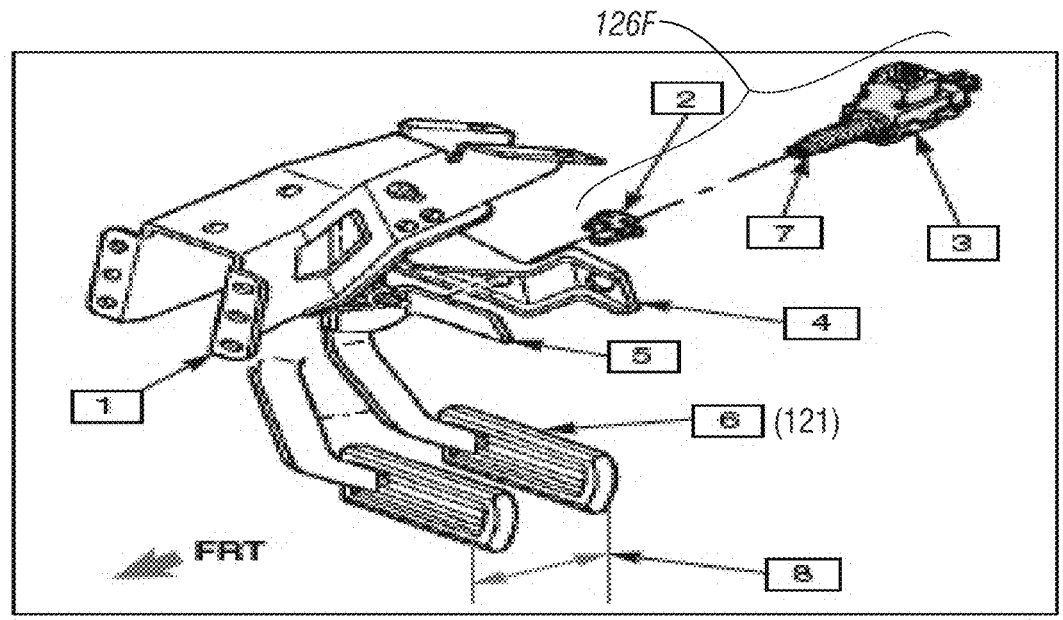
FIG. 5F is an isolated view of brake pedal and stoplight/brake light activation switches for a typical automotive braking system.

FIG. 5F illustrates a typical brake pedal and typical electrical switch that typically turns brake lights on or off. Embodiment 100 would override this. It could simply be disconnected.

It is noted there may be multiple positions where pressure sensor 110 could operatively connect to the brake fluid circuit. See reference nos. 126A, B, C, D, E, and I in FIGS. 5A-5F, to show a few. T-connector 115 could have a male externally threaded or female internally threaded leg 116 for attachment to a complementary brake system connection. Alternatively, a tubular double-ended, externally threaded insert could connect a female internal threaded brake system port and an internal thread female leg 116.

3. Op-Amp Circuit

It was determined that the best solution for the circuit 140 was to use the comparator. Most of the comparators in the market give low current outputs, which was not sufficient for lighting up the LED array. So it was decided to add MOSFETs (see Q1, Q2, Q3, and Q4 in FIG. 3A and MOSFETs 1-4 in FIG. 3B) and power the LED array with the car battery (as the electrical power source 101) (see FIG. 3A). The MOSFETs act as a switch; they will pass the power from the car battery to each level only if the voltage from the comparator (see "Comprtr" 1, 2, 3, and 4 in FIG. 3A and "Comparator1" to Comparator4" in FIG. 3B) activates them.

In this way a normal economical comparator can be used without compromising the amount of power sent to the LED matrix.

During the testing phase there was a noise in the voltage supplied from the regulators to the circuit. To remove that noise two capacitors were added to the regulators, which absorbed the noise. Also, a non-inverting gain was added in the circuit to strengthen the signal from the pressure sensor.

Figure 3A:
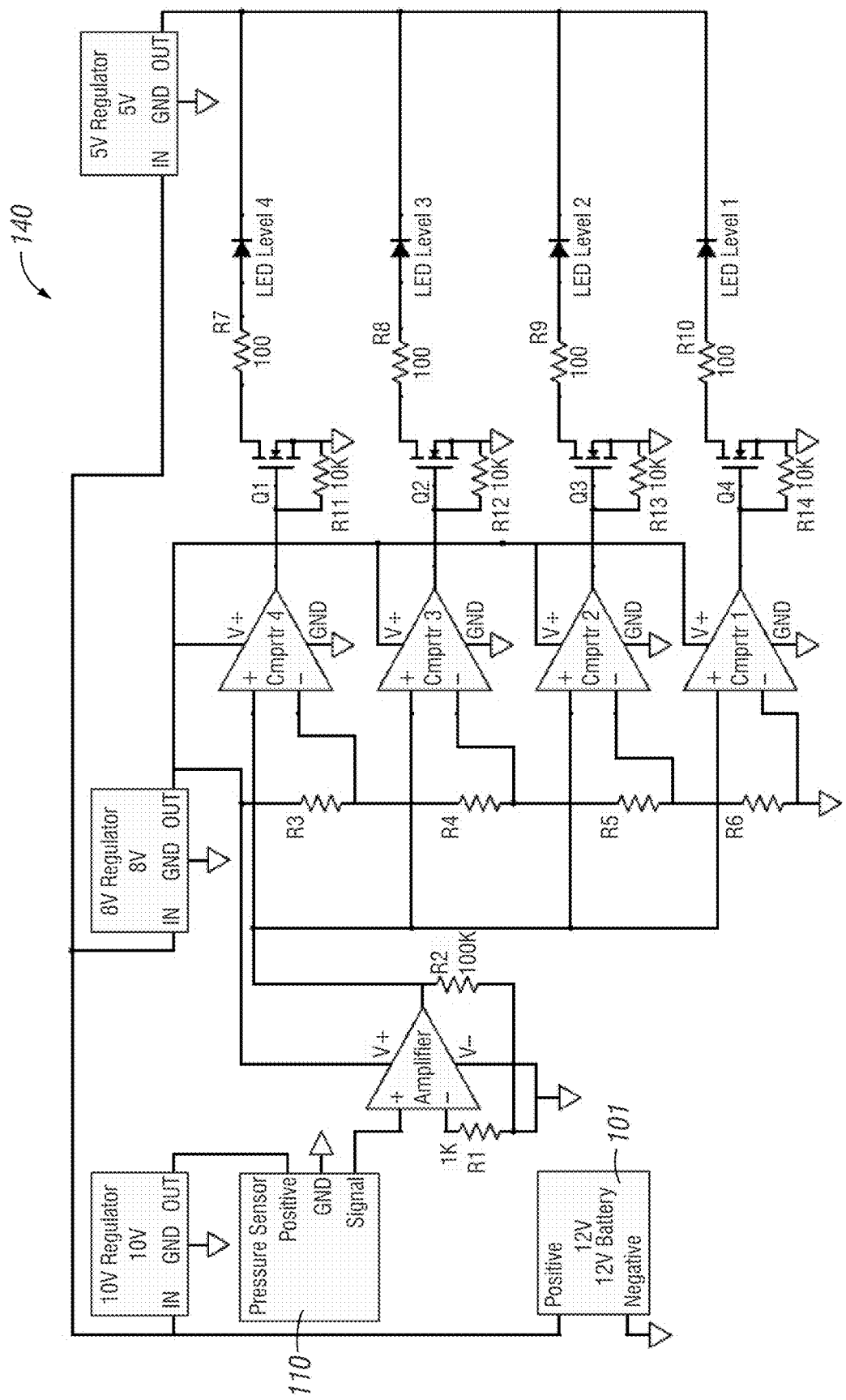
FIG. 3A is an electrical schematic of an electrical circuit that can be used in the system of FIG. 2B.
Figure 3B:
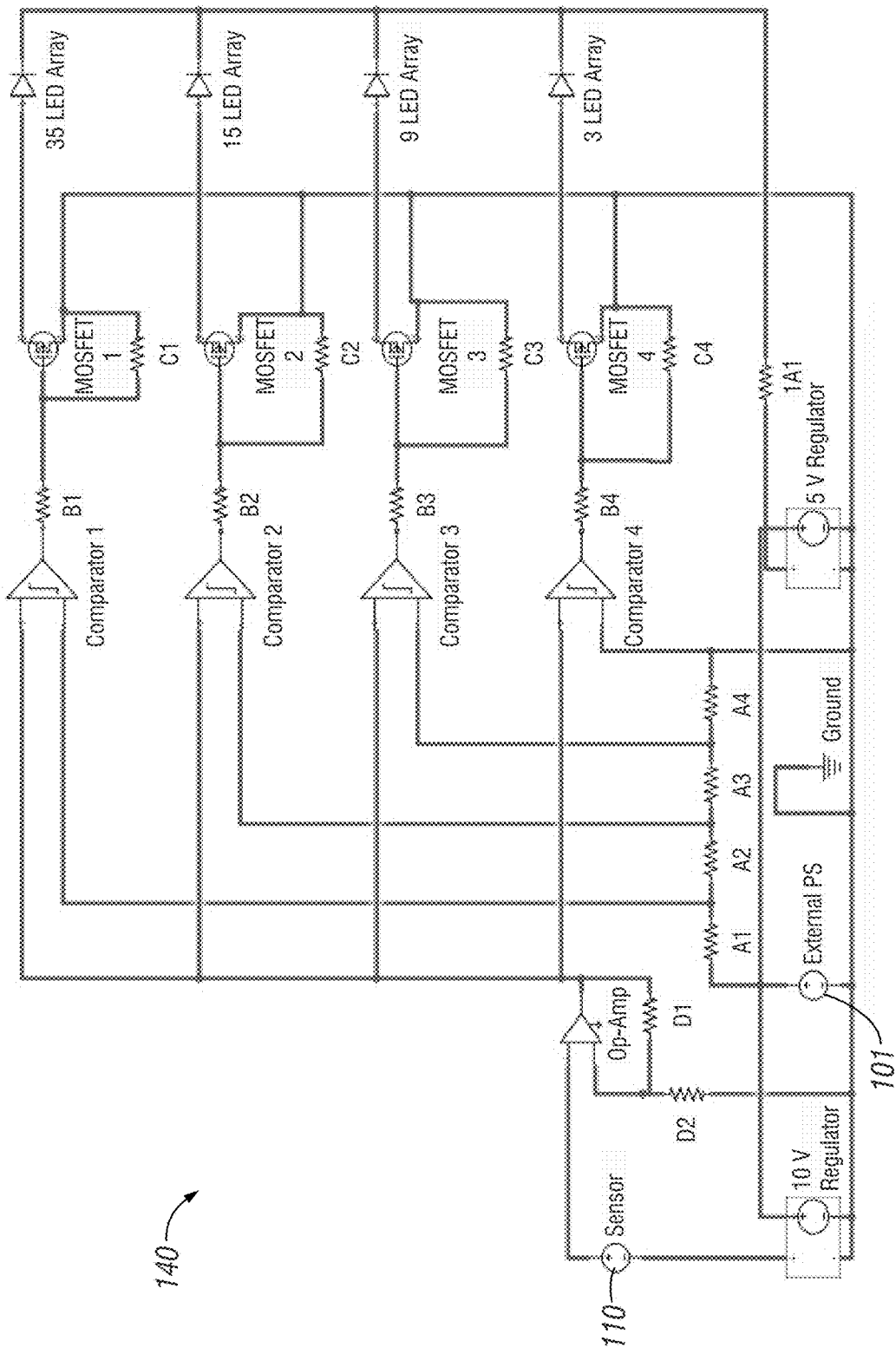
FIG. 3B is an alternative electrical schematic for that of FIG. 3A.

FIGS. 3A and 3B are alternative circuit 140 designs.

Figure 4A:
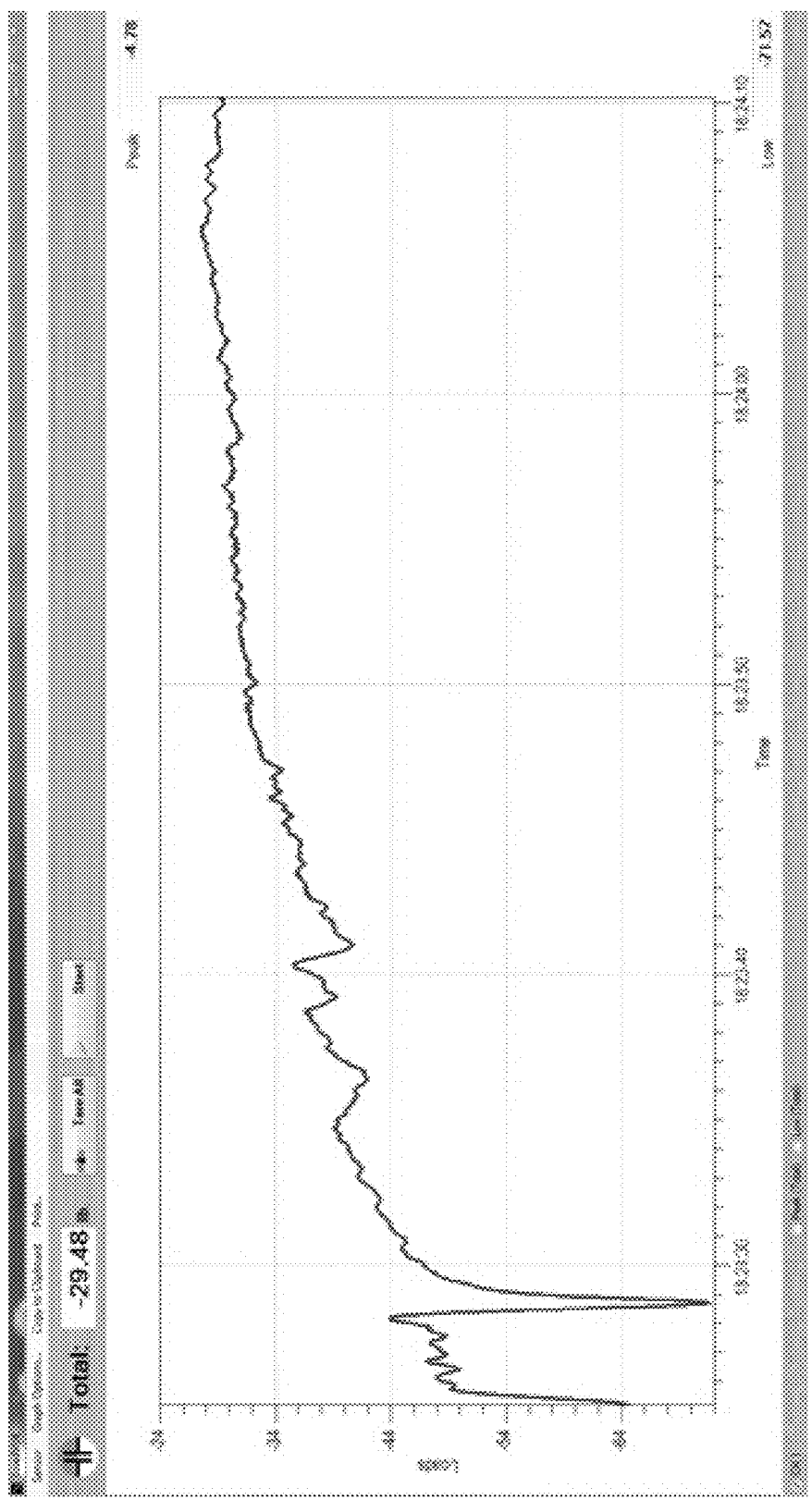
FIG. 4A is a graph showing relationship between sensed braking pressure and time showing how it can vary.

FIG. 4A illustrates one example of how braking pressure can vary over time.

4. LED Array

Upon further research it was found that the average brightness of brake lights in the market is between 300-450 lux. The goals were set as follows:
- First level—75 lux
- Second level—150 lux
- Third level—250 lux
- Fourth level—420 lux To achieve this amount of lux for each level the following lighting arrangement was derived,
- First level—3 LEDs (see FIG. 3B)
- Second level—6 LEDs (see FIG. 3B)
- Third level—15 LEDs (see FIG. 3B)
- Fourth Level—35 LEDs (see FIG. 3B)

In total 59 LEDs were used in the LED matrix.

After creating the array a defect was noticed in the design during testing. The LEDs start blinking after a few seconds. This was due to the noise from the voltage regulators, which was reduced by adding capacitors.

Later it was thought to install a fail-safe condition. If by any chance the pressure sensor 110 doesn't give any readings, the light display would work as the present brake light. So 100-ohm resistors were added to each LED in series. In total 59, 100-ohm resistors were added to the lighting array (see FIG. 3A).

As can be seen in FIGS. 6A-6D, system 100 transduces brake pressure at or about master brake cylinder 124. Added pressure sensor 110 converts the physical pressure measurement to an electrical signal sent to conditioning circuit 140. Circuit 140 gives appropriate driving signals to the appropriate LEDs to effectuate the display of different braking levels or states.

5. Lighting Housing

Figure 7A:
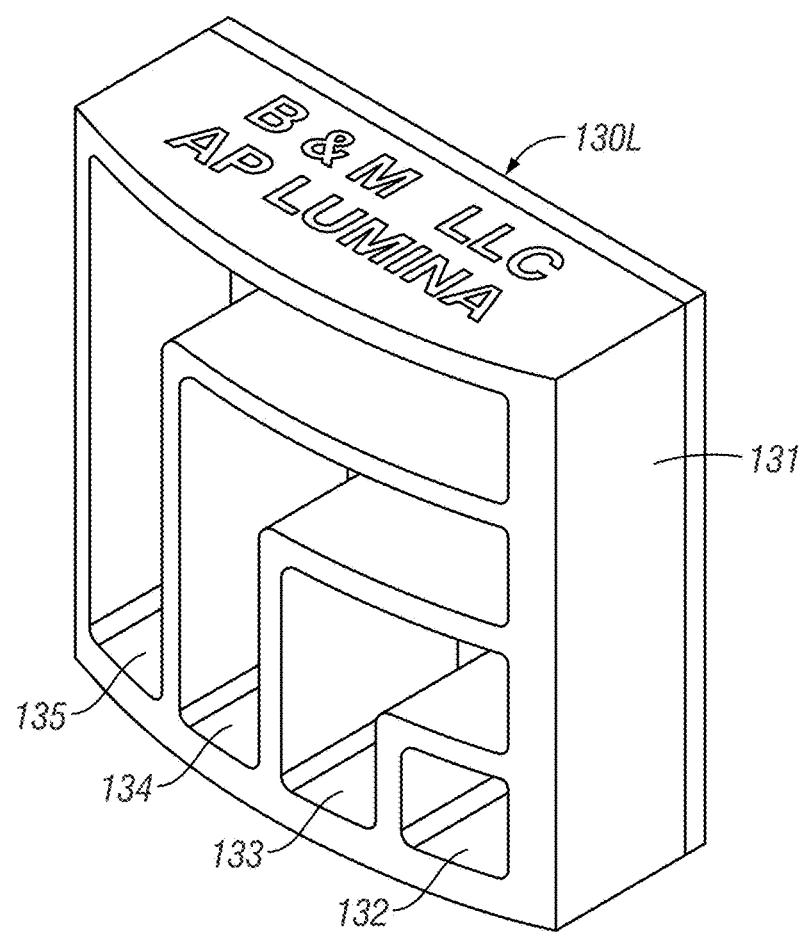
FIG. 7A is a perspective view of one example of a possible housing for one brake light that can be used with the embodiment of FIG. 2A and which includes one aspect according to the invention, namely, partitioned spaces for sub-sets of different light sources.
Figure 7B:
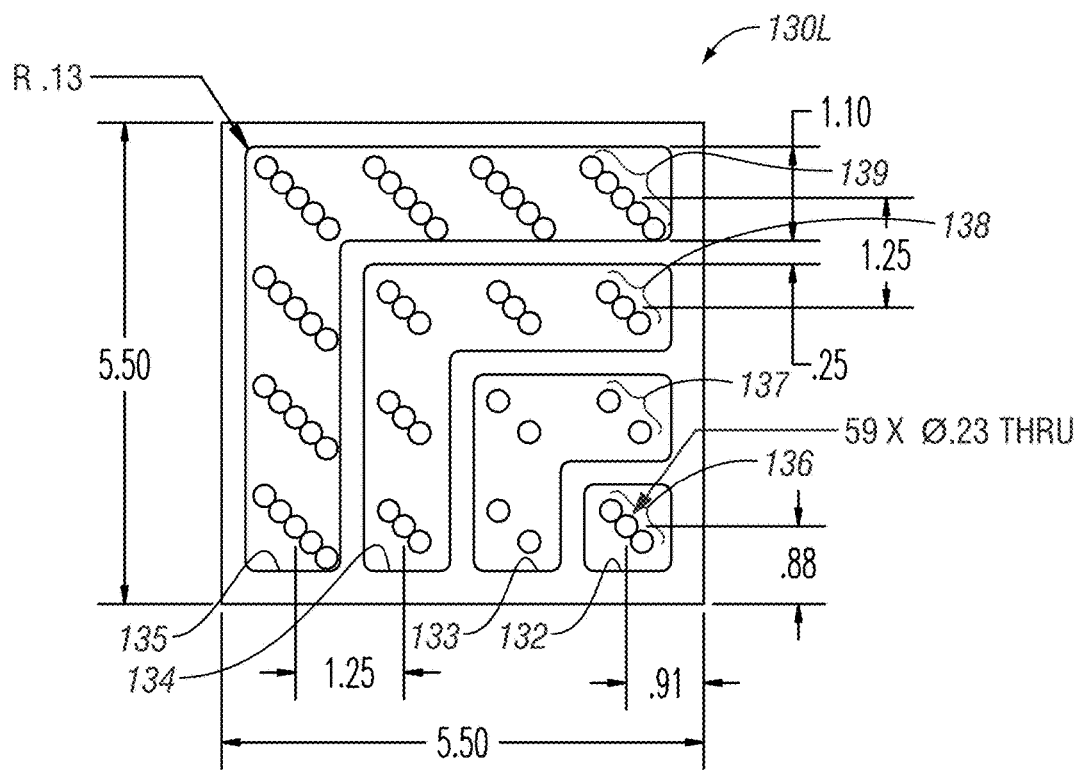
FIG. 7B is a front elevation of the housing of FIG. 7A with one example of sub-sets of LED light sources, each subset in a different partitioned space in the housing.
Figure 7C:
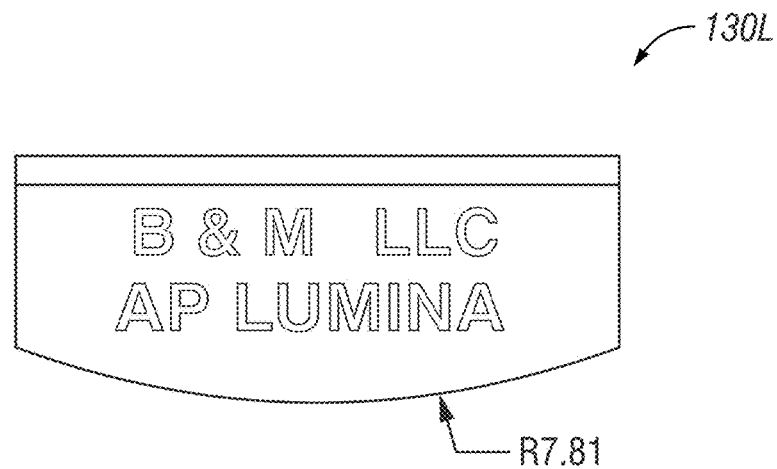
FIG. 7C is a top plan view of the housing of FIG. 7A.
Figure 7D:
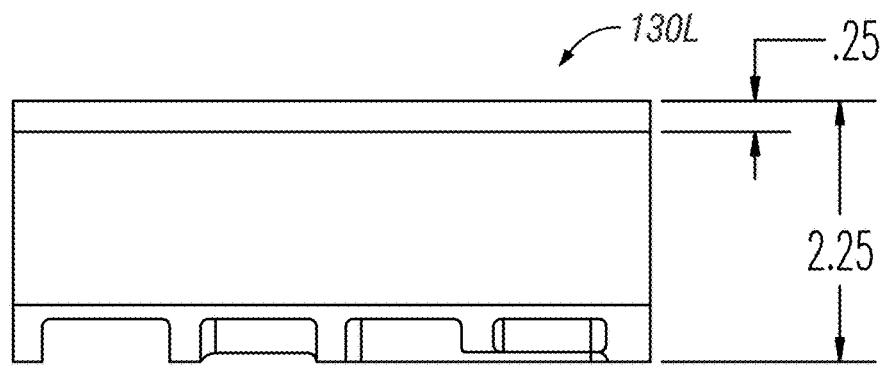
FIG. 7D is a side elevation view of the housing of FIG. 7A.

The lead design has a pressure sensor installed by means of a T-connector on to the master cylinder. This master cylinder gives analog voltage signal output, which is strengthened by a gain of 100 and is used for comparison by the comparator. The comparator outputs different voltage levels to the MOSFETs which in return varies levels of the light display. When a particular MOSFET gets activated, the level of light display receives power from the external battery source and brightens up. A diagonal style LED array (see FIG. 7B) was used for the lighting display (see housing 131), because in this type of array the brightness increases both vertically and horizontally to gain the attention of the drivers behind the vehicle. As shown in FIG. 7A, housing 131 is three dimensional (see also FIGS. 7C and 7D) and includes cavities 132, 133, 134, and 135 configured with a form factor to mimic the square, small running lights 136, the first nested L-shape 137, and the nested L-shapes 138, and 139 (see FIG. 7B). As will be appreciated by those skilled in the art, the number of LEDs contained in each partitioned space can vary, as can the type of light source. But in this embodiment 100, each cluster of LEDs is diagonal. When any sub-set 136, 137, 138, or 139 is activated, some perception of expansion diagonally would be given, but also each subset would, by dispersion, reflection, or otherwise tend to fill or at least appear to viewers as forming a composite output in the shape of the corresponding cavity 132, 133, 134, or 135 (each square or L-shape). FIGS. 7B-7D give one example of possible dimensions of a brake light 130L (a brake light 130R could be made in a mirror image). Others are, of course possible, according to the designer's needs or desires.

6. Detailed Design of Lead Concept

The final design is a three-part system: pressure sensor 110, signal conditioning and processing 140, and LED housing 130. The pressure applied to brake from the driver is sensed via the fluid pressure emitted from the master cylinder 124. The fluid pressure is converted into a voltage using an Omega PX309 sensor (commercially available from Omega Engineering, Inc., see above). The most important customer requirements were to make sure the taillight lights up with applied pressure and be up to DOT specifications.

Next, the signal must be conditioned so the processing segment of the circuit can have a clear and strong signal of appropriate magnitude. Once the signal is conditioned from the sensor 110, the fluid pressure induced voltage is compared to four preset voltages. The four preset voltages are designated for each light array 136, 137, 138, and 139 in the LED housing 130; an LED array will illuminate once the sensor voltage is larger than the designated voltage. Furthermore, as the driver presses harder on the brake 120 the sensor voltage will increase, therefore more LED arrays will illuminate.

There are a total of 4 LED light arrays. The first array 136 is for the running light, so the other three arrays 137, 138, and 139 meet the requirements to develop a three-stage system that varies with applied pressure.

Lastly, the system has a fairly low cost. The circuit and LED's in the housing are extremely cheap and easy to manufacture. The only expensive component of the system is the pressure sensor. The pressure sensor has the possibility to have cost reductions by lowering the psi pressure range.

7. DMFEA Discussion

There are four primary functions of the prototype. The system senses the dynamic brake application, the brakes light up, the light changes in intensity, and finally there is the aesthetic brake housing.

The pressure sensor, located off the brake master cylinder, measures the dynamics braking of the car. The sensor provides a voltage comparison, but could possibly lose its functionality if it is disconnected from the line, exposed to extreme heat, or the wires were frayed. The root cause and most likely to create loss of function in the sensor would be loose wires or objects causing the wire to fray. If there were to be a loss in functionality all the arrays in the taillight would illuminate. Full taillight illumination is a safety feature that was designed and implemented into the prototype.

Having the brakes light up is vital to the system. A series of operational amplifiers, MOSFET, resistors, and voltage regulators create a subsystem that compares preset voltages to the dynamics pressure voltage measurements. A short in the circuit could cause the subsystem to potentially fail. In more detail, the wire insulation in the circuitry could become cut, exposing independent wires to potential contact. To combat this issue, the wires will be soldered to a perforated board and insulated in a protective box.

The third primary function of the system is the change in light intensity. The circuit provides the correct amount of voltage and current to each light array, while the precise mapping of each LED accomplished the change in light intensity. There could be a couple potential errors, but the odds are very slim. The voltage regulator and MOSFET of each array could be potentially burned out. If these components were to burn out, the LED light array would not be able to increase in light intensity as the driver applies more pressure. The MOSFET and voltage regulator will have an increased ampere rating so there cannot be a possibility for component failure.

The aesthetic brake housing is the final primary function of the system. The housing 131 keeps all of the LED's in place and in pattern that intensifies in light with each level. There could be possible physical damage to the housing from car accidents. The housing 131 on the prototype was specifically made for demonstration use only. It is in no condition to be put in a car. The housing design will have to be modified in the future to fit the demands of each model of car. Experimentation with new material and fabrication processes will result in a safe and cost effective housing to assemble in future cars.

8. Implementation of Process or Design

Regarding this design, there are a few implementation issues that are of concern. The first is the placement of the pressure sensor. It could be placed anywhere along the brake lines, depending on where the manufacturer sees fit for their specific manufacturing process. The second issue is in regards to how many circuits will be used. One option would be to have only one circuit power all three taillights on the vehicle. This would cause more difficulties in the installation process of the manufacturing line, due to more wiring and time needed to install it fully. A second option would be to designate a circuit to power each of the three brake lights individually, making for easier initial installation, as well as allowing for easier aftermarket installation as well. Overall this product will be easy to implement into the existing vehicle production process, since it is replacing an existing product. It will require little to no additional steps in the manufacturing process.

A safety protocol was implemented into the circuit design. If the pressure sensor should fail, due to any number of reasons, the brake light will no longer step up and down in brightness, or not work at all, rather it will stay fully lit until said pressure sensor is fixed or replaced.

9. Cost Analysis

For the functionality of the project, the capital costs include the master cylinder, brake fluid, solder wire, threading tap, breadboard, and 12-volt batteries. The circuit components and pressure sensor would be the primary recurring costs through production of this system. See Table 2.

TABLE 2

Parts List for Prototype Design
Parts List for Prototype/Technical Demostrator

| Part Category | Description | Price Unit | Units | Price |
|---|---|---|---|---|
| Housing | | | | |
| | LED's | 0.37 | 100 | $37.00 |
| | Resistors | 0 | 0 | $0.00 |
| | Regulator (10 V) | 0.84 | 1 | $0.84 |
| | Regulator (8 V) | 0.68 | 1 | $0.68 |
| | Regulator (5 V) | 1.6 | 1 | $1.60 |
| | Mosfets | 1.05 | 5 | $5.25 |
| | Op-Amps | 0.57 | 1 | $0.57 |
| | Power Source (Car Battery) | 20.88 | 1 | $20.88 |

TABLE 2-continued

Parts List for Prototype Design
Parts List for Prototype/Technical Demostrator

| Part Category | Description | Price Unit | Units | Price |
|---|---|---|---|---|
| Wiring Harness | | | | |
| | Connectors | 6.95 | 3 | $20.85 |
| | Pressure Sensor (Transducer) | 235 | 1 | $235.00 |
| | Bread Board | 10.59 | 2 | $21.18 |
| Misc. | | | | |
| | Master Cylinder | 64.99 | 1 | $64.99 |
| | Brake Fluid | 3.29 | 1 | $3.29 |
| | Solder Wire | 19.29 | 1 | $19.29 |
| | 7/16-24 tap | 5.7 | 1 | $5.70 |
| | TOTAL COST | | | $437.12 |

10. Conclusion

In conclusion, the prototype model of the brake light system for AP Lumina was completed. The metrics from the project charter were met and exceeded in more than one aspect. When brake pressure is applied the brake light not only levels and varies in intensity but a failsafe was implemented in case of failure of the system. The lumen output falls in the range of the required DOT specs and testing data of pressure/lumen correlation was presented with the prototype as well. DMADVR tools such as the QFD, functional analysis, and a BOM was completed. The entire prototype can be installed into any vehicle with little to no adjustment to the circuit along with the ability to customize any want or need a car manufacturer possesses. A recommendation would be to incorporate a lever or buy an out of the box braking system and engineer a customized bracket for hook up to the master cylinder. However, for simplicity and budget, it would be more than sufficient to maintain course with a simple lever mechanism. It is recommended to move the circuit to a soldered board for official installation of the design. Safety was a major engineering factor for this prototype, so a trigger switch is present to turn on the entire brake light when a pressure reading is not reported in the system. Cost is relatively cheap standing at approximately $20 for the system, but this can be reduced significantly if the brake light is implemented into a mass manufacturing process allowing for subsidized or mass ordering discounts. Overall implementation for the system will be manufacturer specific, but general recommendations can be understood by those skilled in the art.

D. Specific Example 2 (Potentiometer Transduction of Braking and Pulsating Display at Brake Light)

By particular reference to FIGS. 8A-8C, 9A-C, 10A-D, 11A-D, and 12A-C, another exemplary embodiment (generally referred to by reference number 200) incorporating at least some aspects of the invention is illustrated. It also can be configured to display different braking levels or states across a plurality of such states, like that of the generalized example and that of Example 1 above. See FIG. 8A. Running lights 236 (here relatively small red circles) are luminous when brake pedal 220 is not pushed in. Light braking with pedal 230 produces red brackets 237 on opposite sides of running 236. Moderate braking adds larger brackets 238. Heavy/full/emergency braking adds even larger brackets 239.

In this way, increasing levels or states of braking are communicated by producing luminance (in red color) of increasing size and direction (here in multiple directions in each brake light 230L and 230R). It produces a kind of radiating, expanding pattern. It can expand and contract with brake pedal 220 position.

Figure 8A:
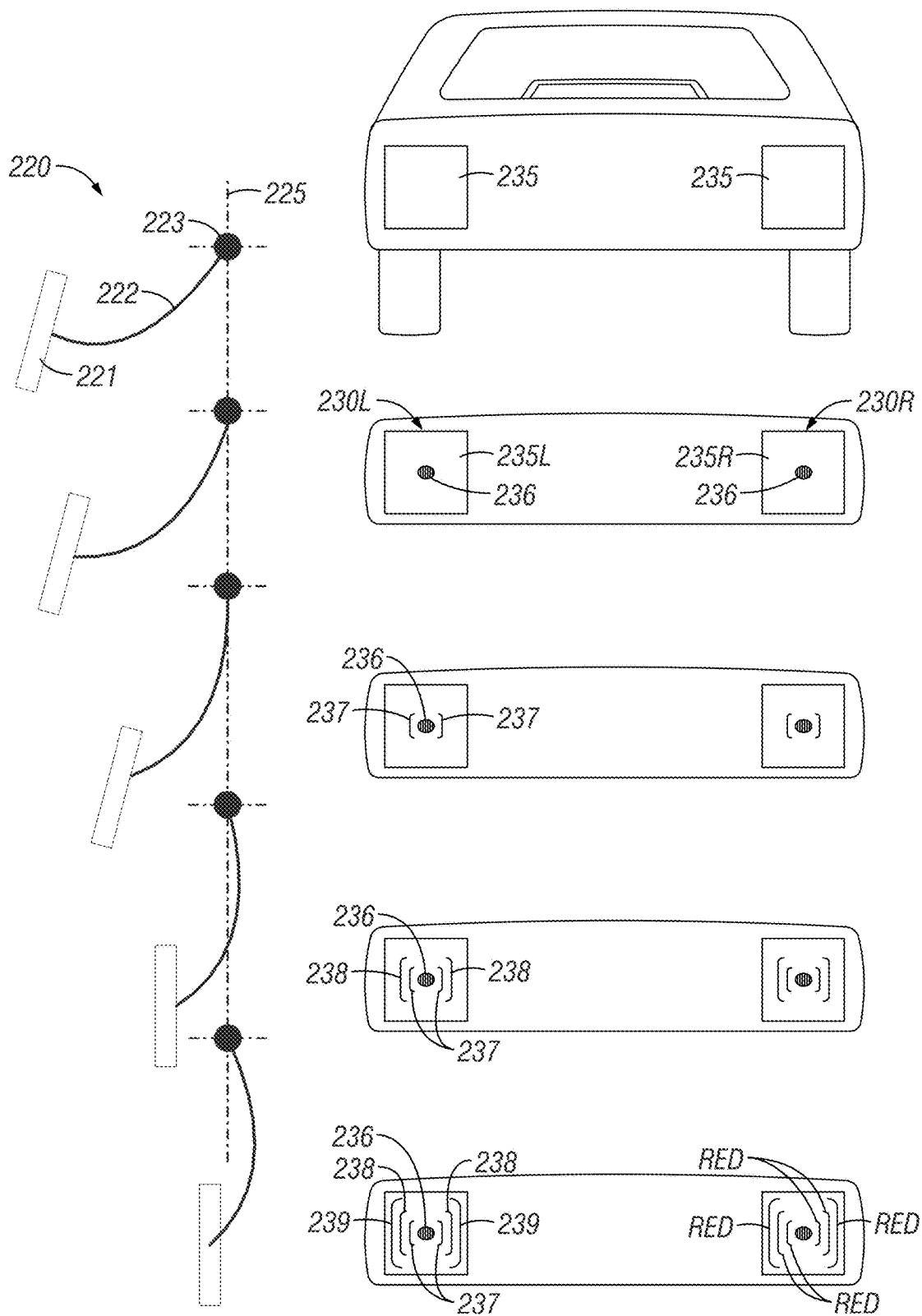
FIG. 8A is similar to FIG. 2A but shows another possible embodiment according to aspects of the present invention, showing a different brake light luminance pattern correlated to different braking levels or states.

Note that if desired, no luminance or lighting can be activated (see top of FIG. 8A). If running lights are not desired or are not turned on, all the viewer would see are unlit brake or rear light lenses 235L and 235R.

Variances or differences from the foregoing embodiments are discussed below.

1. Summary

Traditional brake light systems only allow a driver to observe whether the vehicle ahead is stopping or not, not how hard the vehicle ahead is braking. The task is creating a brake light system prototype that would indicate breaking intensity to a tailing driver. Since a large number of accidents are attributed to be rear-end collisions, allowing the driver a second or two more to properly react would greatly reduce driving injuries and damages. This project had several objectives, the main one being to complete one functional proof-of-concept prototype. Additional objectives included: decreasing a driver's reaction time by 15%, increasing the peripheral cues a driver sees with a unique light arrangement, and finally to create the entire system for under $500.

Several factors affected the ultimate outcome of the project. There are a number of ways a variable electrical signal could be generated. Mechanical issues arose around creating a system that could easily be fabricated and installed into current brake pedals. This was mostly due to the size and intricacy of the design itself. Ultimately a small, simple design was desired.

In this design, a linear potentiometer, moving in relation to the physical movement of the brake pedal, would send a variable voltage signal to an electrical circuit, which in turn produces an electrical signal to an array of LED lights, expanding outward proportionate to the pressure applied to the brake pedal. For demonstration purposes, the linear potentiometer assembly was connected to the side of the brake pedal, requiring the use of a small clevis and ball bearing to adjust position with the arced movement of the brake. There have been studies done regarding the effects of manipulating optical looming cues that can justify the light design. See, e.g., References below.

The final cost of the prototype stood around $350. This was well under the goal of $500. However, this cost is not representative of what the cost of final design would be. The two most expensive components were the LEDS and the linear potentiometer. The rest of the components were electrical parts that can be purchased very cheaply in bulk. Lights are already part of the cost of a brake light system, so that price would have to be compared to the current brake light standard. LEDs are relatively inexpensive regardless. The linear potentiometer cost about $40. However, there is a considerable amount of bargaining room in terms of the pricing for these components. Therefore it should not be difficult to build a final design based on this concept for a very low price.

If a linear potentiometer is used in the final product, the clevis and ball bearing used in the prototype may not be necessary, depending on its position. However, due to the size of the one chosen, this was not possible. In retrospect, it was discovered that the linear potentiometer could be replaced with a rotary potentiometer, basing its rotary movement on the rotation of the brake pedal about its axle. This change would greatly reduce the size and number of moving parts of the system. The rotary potentiometers were also much cheaper.

2. Nomenclature

| a) Notation | |
|---|---|
| I | Current [amps] |
| R | Resistor [ohms] |
| U1 | Comparator |
| V | Voltage [volts] |
| b) Subscripts/Superscripts | |
| A,B,C,D | Comparator Channel |
| cc | Comparator Source |
| f | Feedback |
| in | Input |
| L | Potentiometer |
| out | Output |
| s | Source |

3. Introduction

Every year around the holidays, traffic for many travelers seems to become a nightmare. In 2003 alone, there was an estimated 23% increase in the number of travelers on the roads, an increase which amounts to millions of cars, during the Christmas season alone (Long distance . . . 1). This huge influx of holiday travelers inevitably leads to every traveler's worst nightmare, accidents. As of 2002, an estimated 6 million accidents occur every year in the United States, of these 6 million accidents, 2.5 million were rear end collisions (Auto Accident Statistics 1). This large number of rear end collisions has led to millions of dollars in repair costs for drivers, in addition to the physical harm that crashes can cause. After examining the current market, it was determined that there was an opportunity to reduce the number of rear collisions through the development of an advanced brake light system.

The main objective was to design a working prototype of their advanced braking system. The term advanced refers to the system's ability to vary the light intensity and/or shape as more or less pressure is applied to the brake pedal. A design constraint was current laws in place regarding brake light design and color constraints.

4. Design Evolution

Figure 15:
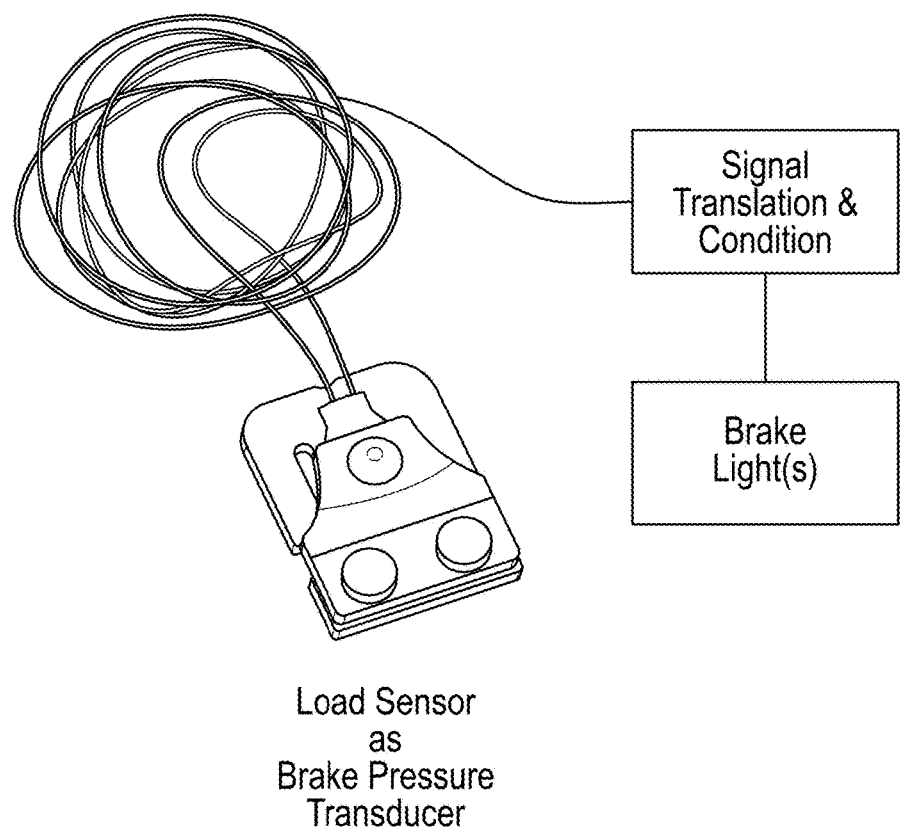
FIG. 15 is a depiction of an optional load sensor by indirect brake pressure sensing.
Figure 16A:
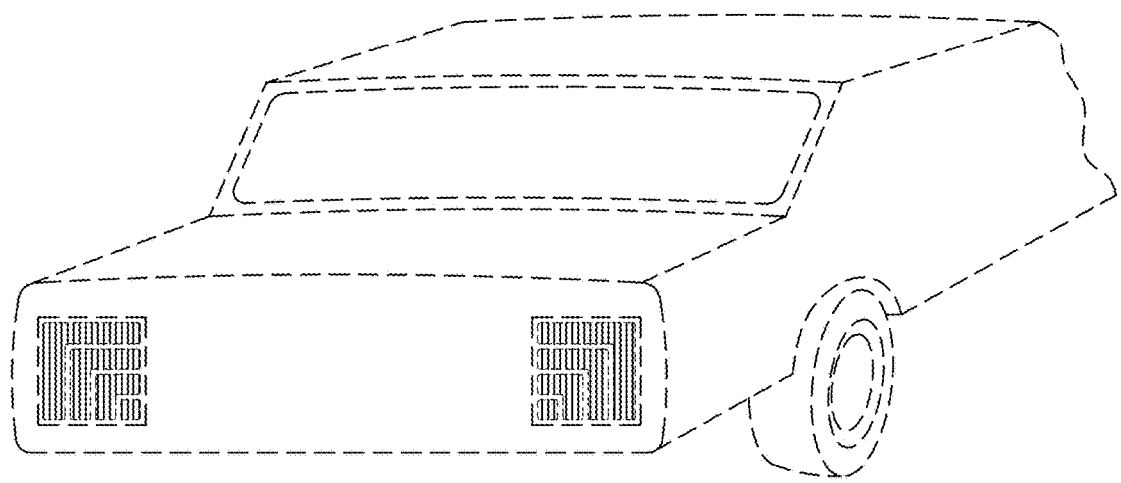
FIG. 16A is a perspective view of a brake light aesthetic design according to another aspect of the invention, showing inverted L-shaped subsections that can sequentially be illuminated. Dashed lines show environment or indefinite boundaries. Areas hatched with vertical lines are intended to show areas of red luminance or light output distribution pattern emanating from the brake light.
Figure 16B:
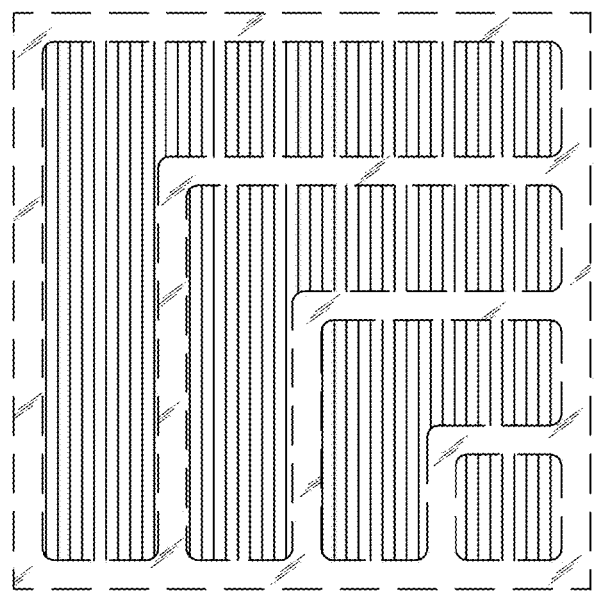
FIG. 16B is an enlarged front view. The opposite sides, top and bottom, and back are normally hidden from view when in use areas hatched with vertical lines are intended to show areas of red luminance or light output distribution pattern.
Figure 16C:
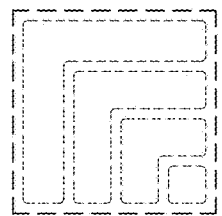
FIGS. 16C-G show the appearance of the brake light in various states of luminance areas hatched with vertical lines are intended to show areas of red luminance or light output distribution pattern.
Figure 16D:
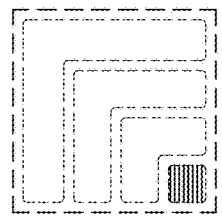
Figure 16E:
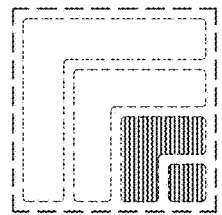
Figure 16F:
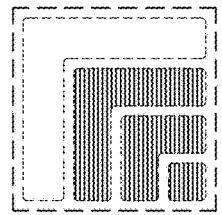
Figure 16G:
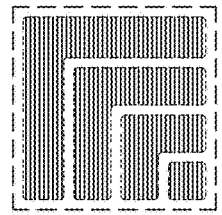
Figure 17A:
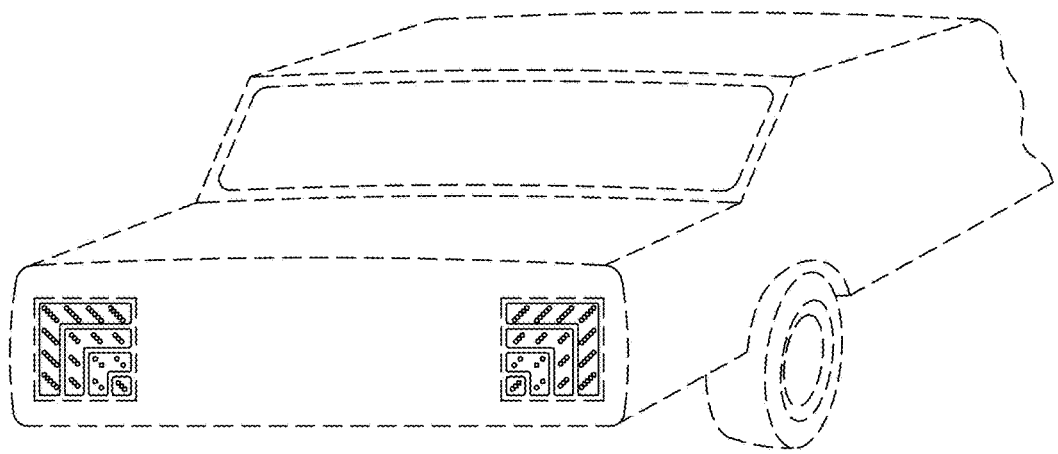
FIG. 17A is a perspective view of a brake light aesthetic design according to another aspect of the invention, showing sub-sets of plural LED light sources arranged in inverted L-shapes that can sequentially be illuminated. Dashed lines show environment or indefinite boundaries.
Figure 17B:
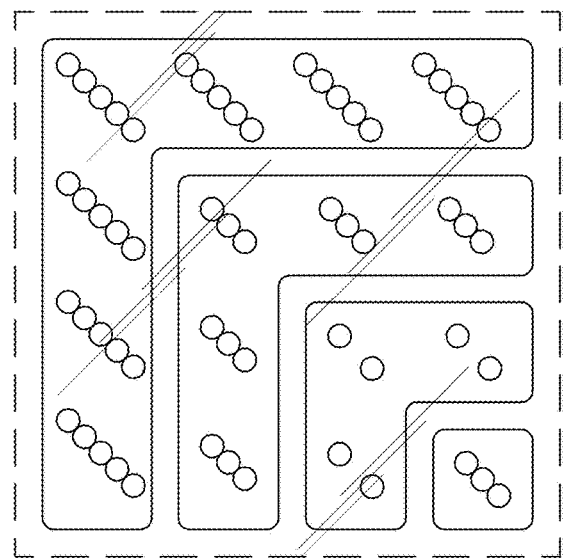
FIG. 17B is a front plan view of FIG. 17B. The opposite sides, top and bottom, and back are normally hidden from view when in use.
Figure 17C:
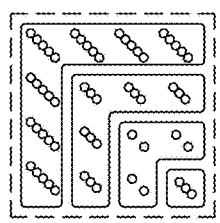
FIGS. 17C-G show the appearance of the LED's in various states of luminance. For clarity, LEDs turned on and would be red (or other color) are shown in solid to indicate the same in contrast to LED's that are off are shown in outline only.
Figure 17D:
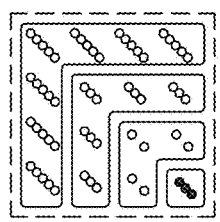
Figure 17E:
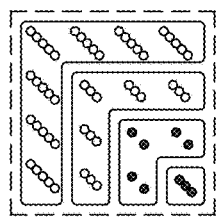
Figure 17F:
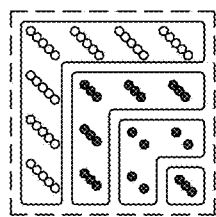
Figure 17G:
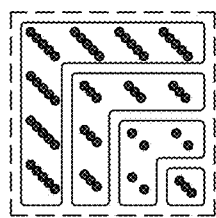
Figure 18A:
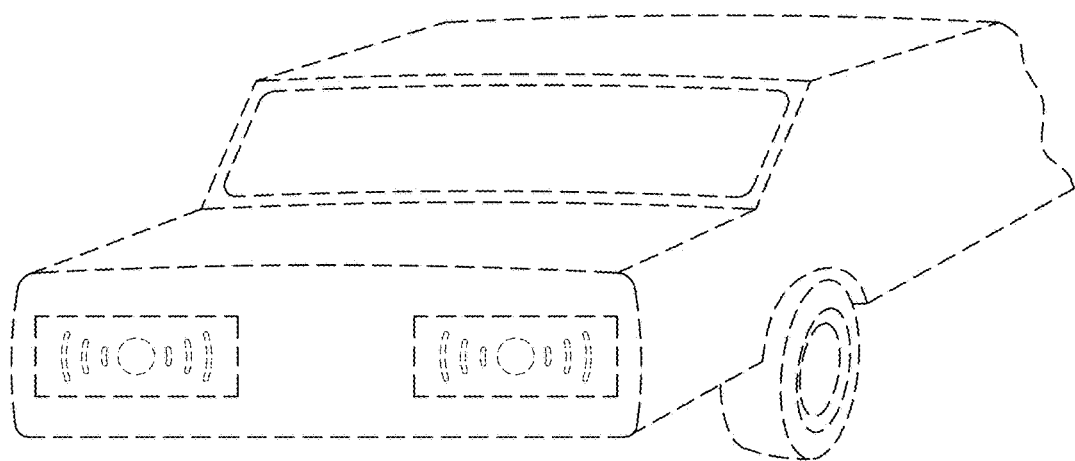
FIG. 18A is a perspective view of a brake light aesthetic design according to another aspect of the invention, showing a center section and then radiating arcs that can sequentially be illuminated on opposite sides of the center section. Dashed lines show environment and indefinite boundaries.
Figure 18B:
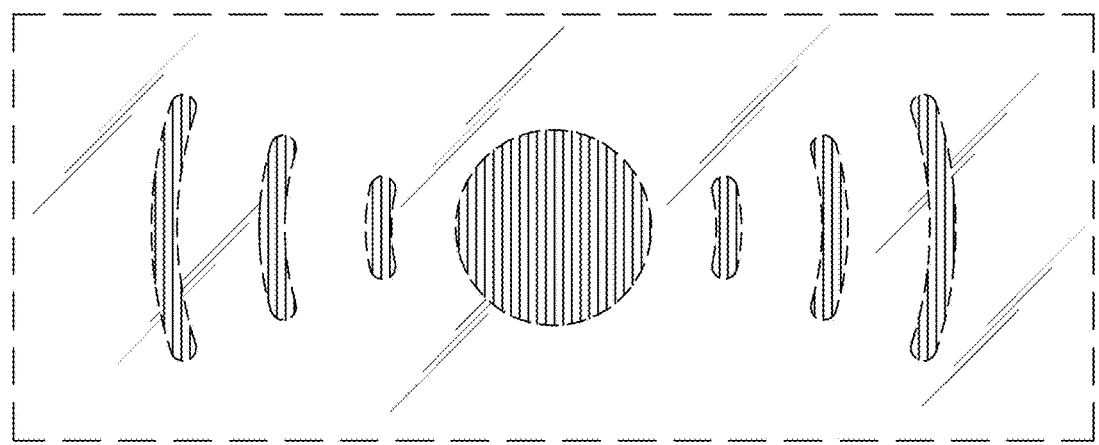
FIG. 18B is a front plan view of FIG. 18B. The opposite sides, top and bottom, and back are normally hidden from view when in use. Red vertical hatching indicates red luminance or light output pattern.
Figure 18C:
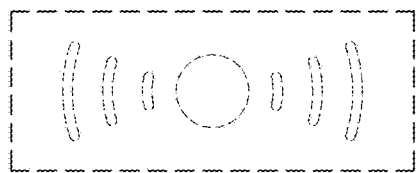
FIGS. 18C-G show the appearance of the brake light in various states of luminance. Red vertical hatching indicates red luminance or light output pattern.
Figure 18D:
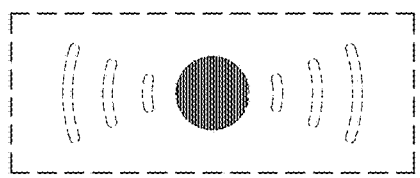
Figure 18E:
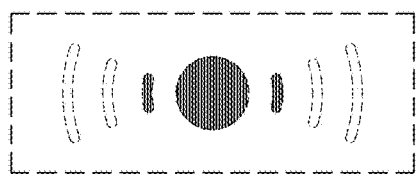
Figure 18F:
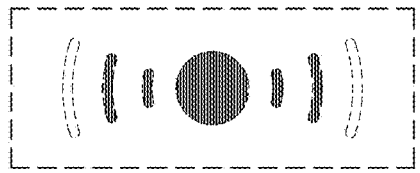
Figure 18G:
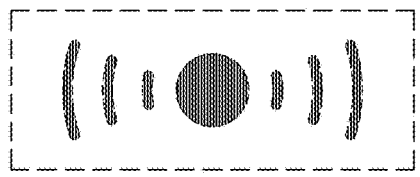
Figure 19A:
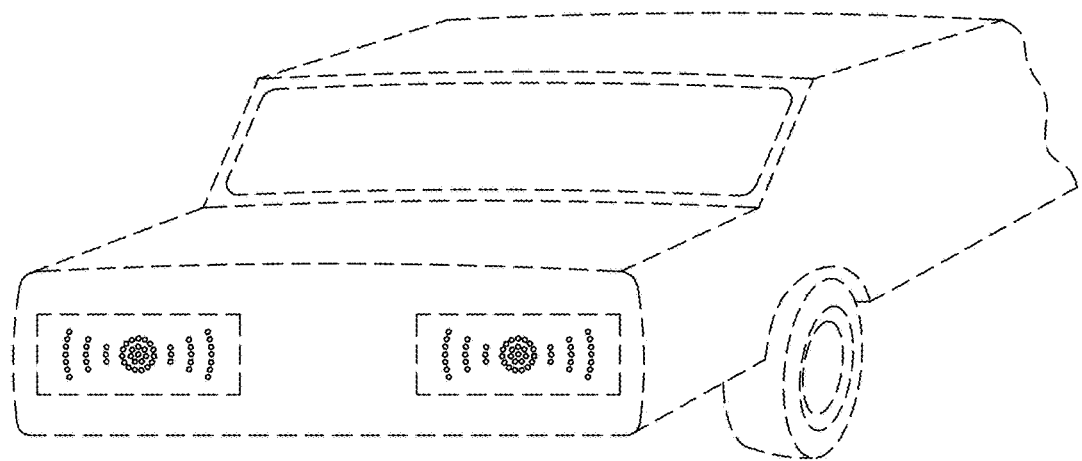
FIG. 19A is a perspective view of a brake light aesthetic design according to another aspect of the invention, showing a center light source or sources and then additional light sources that can create luminance in radiating arcs on opposite sides of the center light source that can sequentially be illuminated. Dashed lines show environment and indefinite boundaries.
Figure 19B:
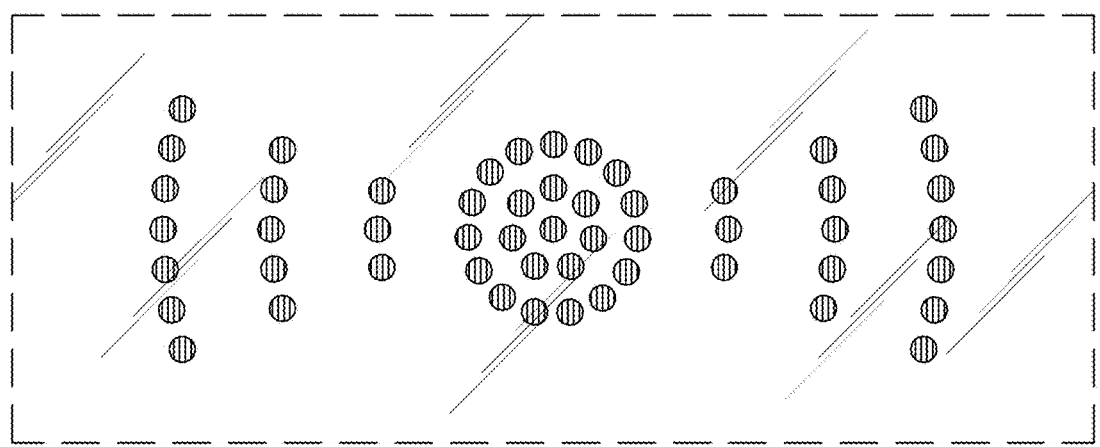
FIG. 19B is an enlarged front view. The opposite sides, top and bottom, and back are normally hidden from view when in use. Red vertical hatching indicates red luminance or light output pattern.
Figure 19C:
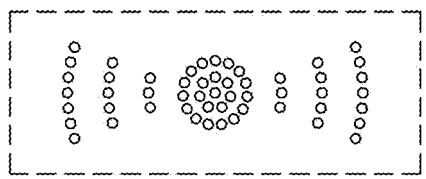
FIGS. 19C-G show the appearance of the brake light in various states of luminance. Red vertical hatching indicates red luminance or light output pattern.
Figure 19D:
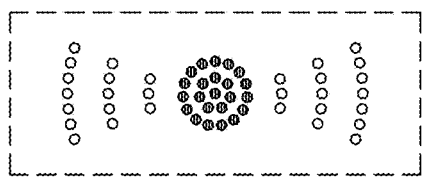
Figure 19E:
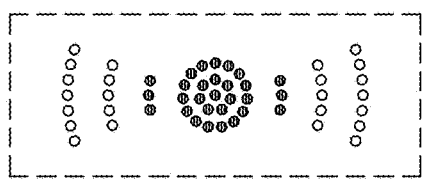
Figure 19F:
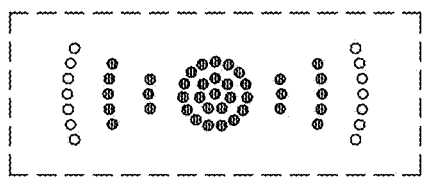
Figure 19G:
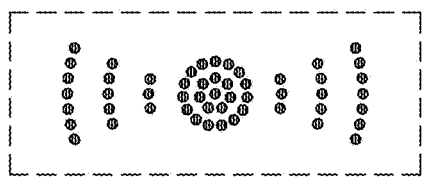

It was determined the best possible way to compete with the current products was to design a system that was both easy to adapt and install as well as extremely cheap to produce. The sensor systems and arrays considered were the load sensor and optical sensor and the vertical rising array and the pulse array, respectively. It was determined that the most effective variations were the load sensor and the pulse array. An example of a load sensor (50 kg) is shown in FIG. 15 and the pulse array is demonstrated in FIGS. 11A-11D.

The load sensor variation involves a 50 kg load sensor that converts the force input from the driver to a voltage signal that is then sent to a converter which changes/amplifies the voltage signal and sends it to the LED array. The Pulse LED array is made up of three sets of curves (237, 238, 239) around a center circle (236), which expands outward as the pressure on the brake is increased. However after running into difficulties in ensuring accuracy of the driver's foot with the load sensor, a switch was made to a different method of sensing the force input. It was determined that the potentiometer method of sensing the signal would be a more effective method than the load sensor. This is due to the difficulty in attaching the mechanical assembly for the load sensor variation to the electrical portion of the system. It was determined that the potentiometer option was easier to connect both electrically as well as mechanically.

5. Design of Lead Concept a) Introduction

Figure 8B:
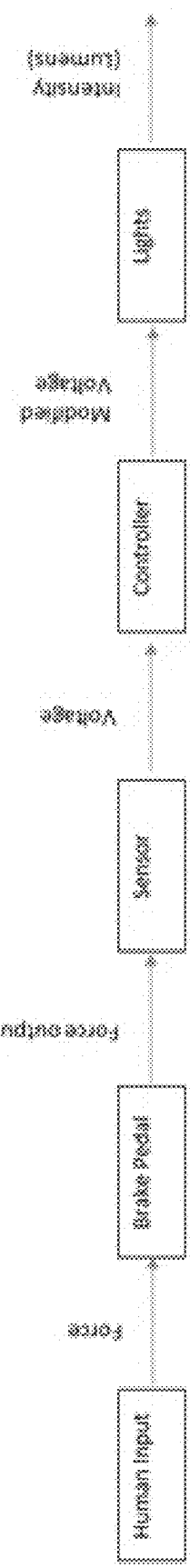
FIG. 8B is a schematic of one example of a control system to create the patterns of FIG. 8A.

In designing the system, it was realized that in order to make the system as bright as possible, it was needed to maximize the number of lumens output by each LED. A functional diagram for the system was evaluated to determine each part that needed to be analyzed. This diagram is shown in FIG. 8B. A schematic of system 200 is shown at FIG. 2C. Like prior examples, the transducer (here potentiometer 210), converts brake pressure (here indirectly by displacement of brake pedal 221) over a range of possible positions (210 to 210') into an electrical signal. The signal is given over to signal translation and conditioning circuit 254, which instructs operation of brake lights 230L, 230R, and optionally center brake light 240.

Each of these categories was then in turn optimized for performance purposes to try and output as many lumens as possible. The following sections outline the designs for each of these function blocks.

b) Mechanical System Design (Brake Pedal to Sensor)

FIGS. 10 A and 10B show an image of a concept design for the mechanical system. A shaft 211 attaches the brake pedal 220 to the linear displacement mechanism 212 of the linear potentiometer 210. Potentiometer can be a model 9615 available commercially from BEI Sensors of Golata, Ca (USA) (spec sheet available at www.beisensors.com) accessed Jul. 12, 2015 on the Internet. As the brake pedal force is applied, the shaft 211 pushes on the linear mechanism 212 of the potentiometer 210, which in turn varies the potentiometer's resistance. It should be noted that while there is an encasement 219 for protective purposes on the prototype's potentiometer (see FIG. 10D), this would not necessarily be the case when moving to production, as the potentiometer's location on the brake pedal would most likely change.

c) Electrical System Design (Sensor to Controller)

Figure 8C:
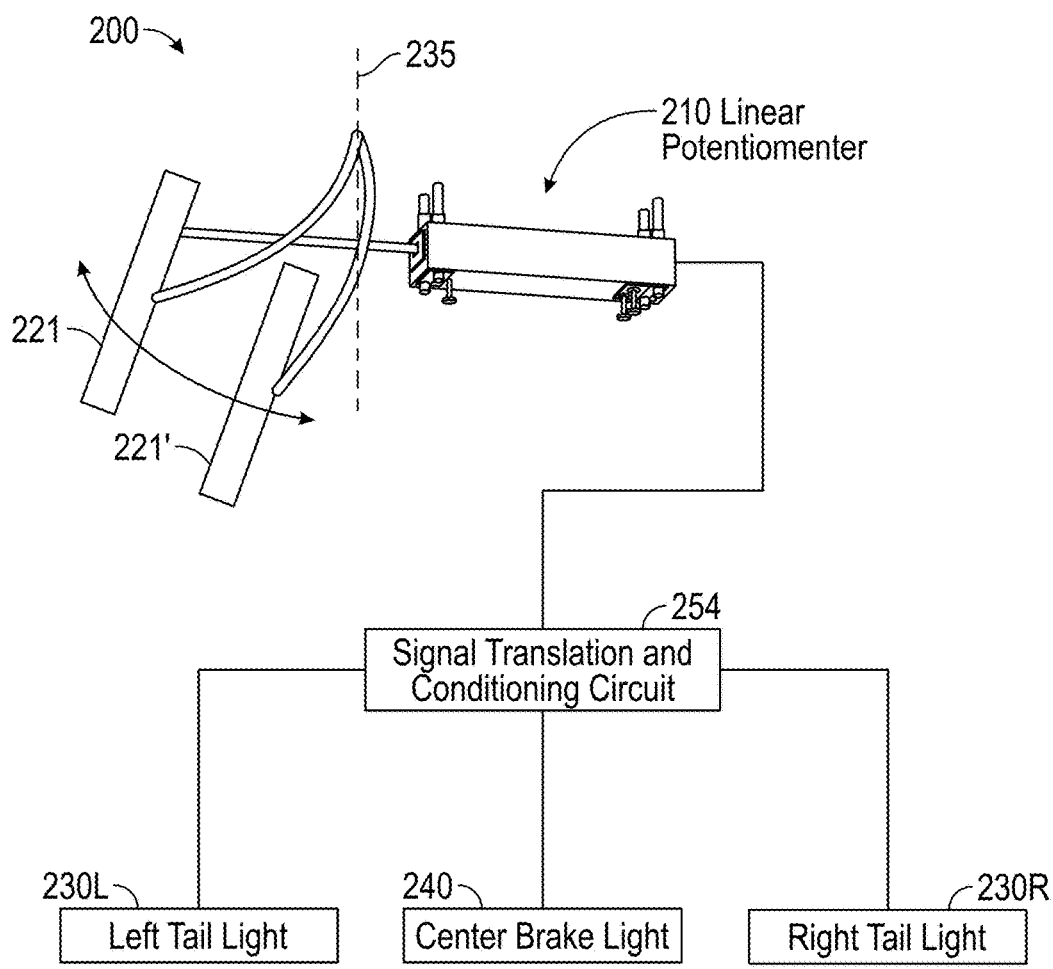
FIG. 8C is an overall schematic of an example of a specific alternative sensing and control system that could be used with any of the embodiments of the invention for sensing level or state of braking.
Figure 10A:
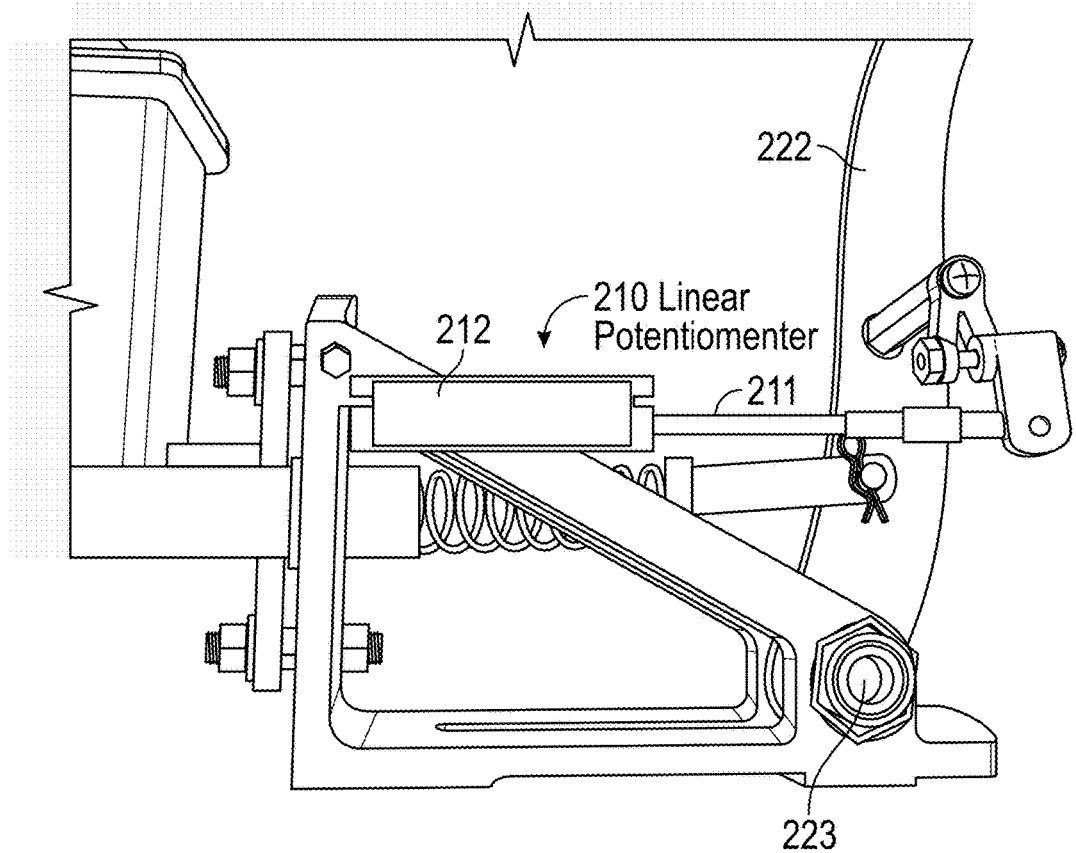
FIG. 10A is an isolated view of a linear potentiometer installed on a brake pedal that can be used with the circuit and system associated with the example of FIGS. 8C and 9A.
Figure 10B:
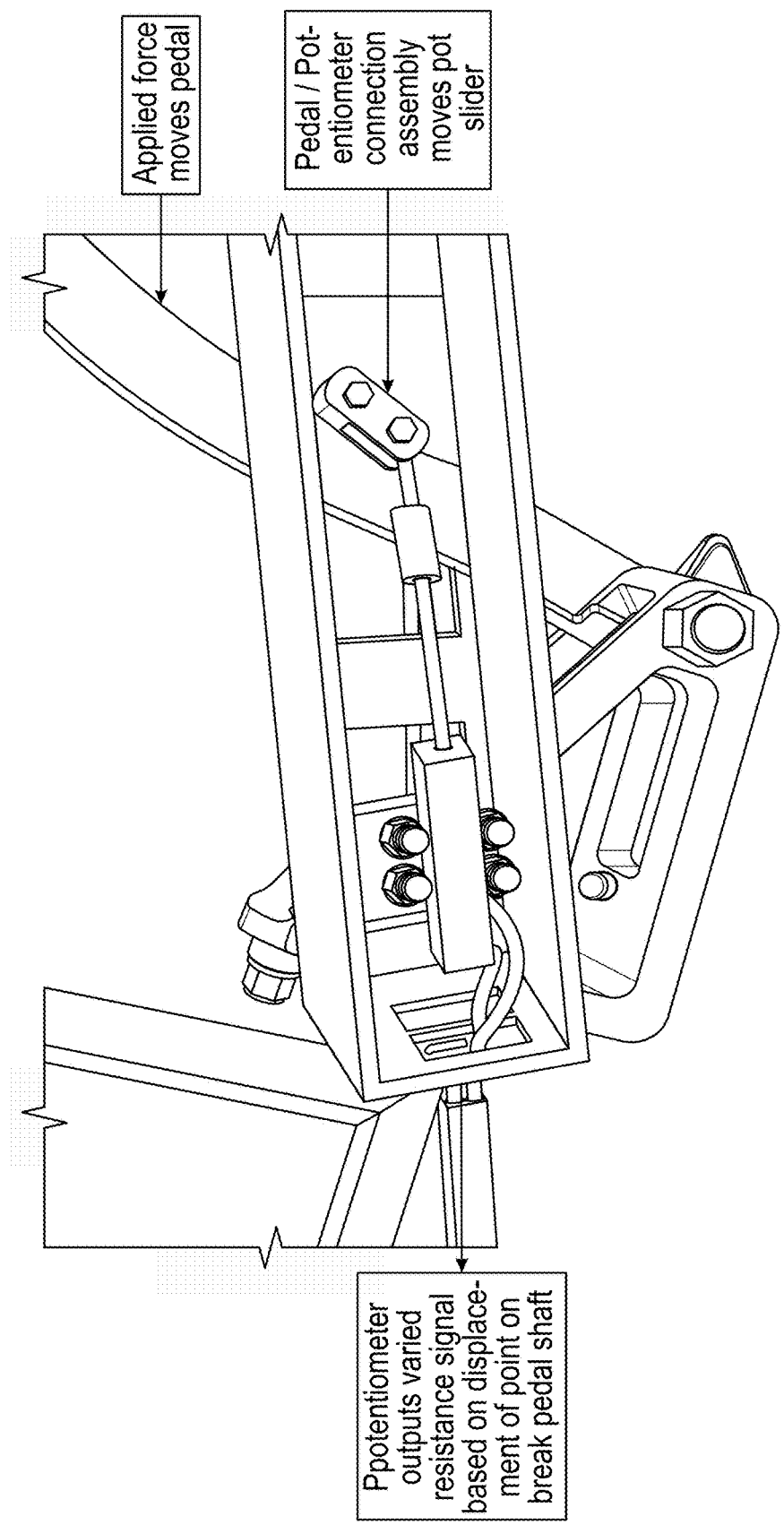
FIG. 10B is another view of the linear potentiometer of FIG. 10A.
Figure 10C:
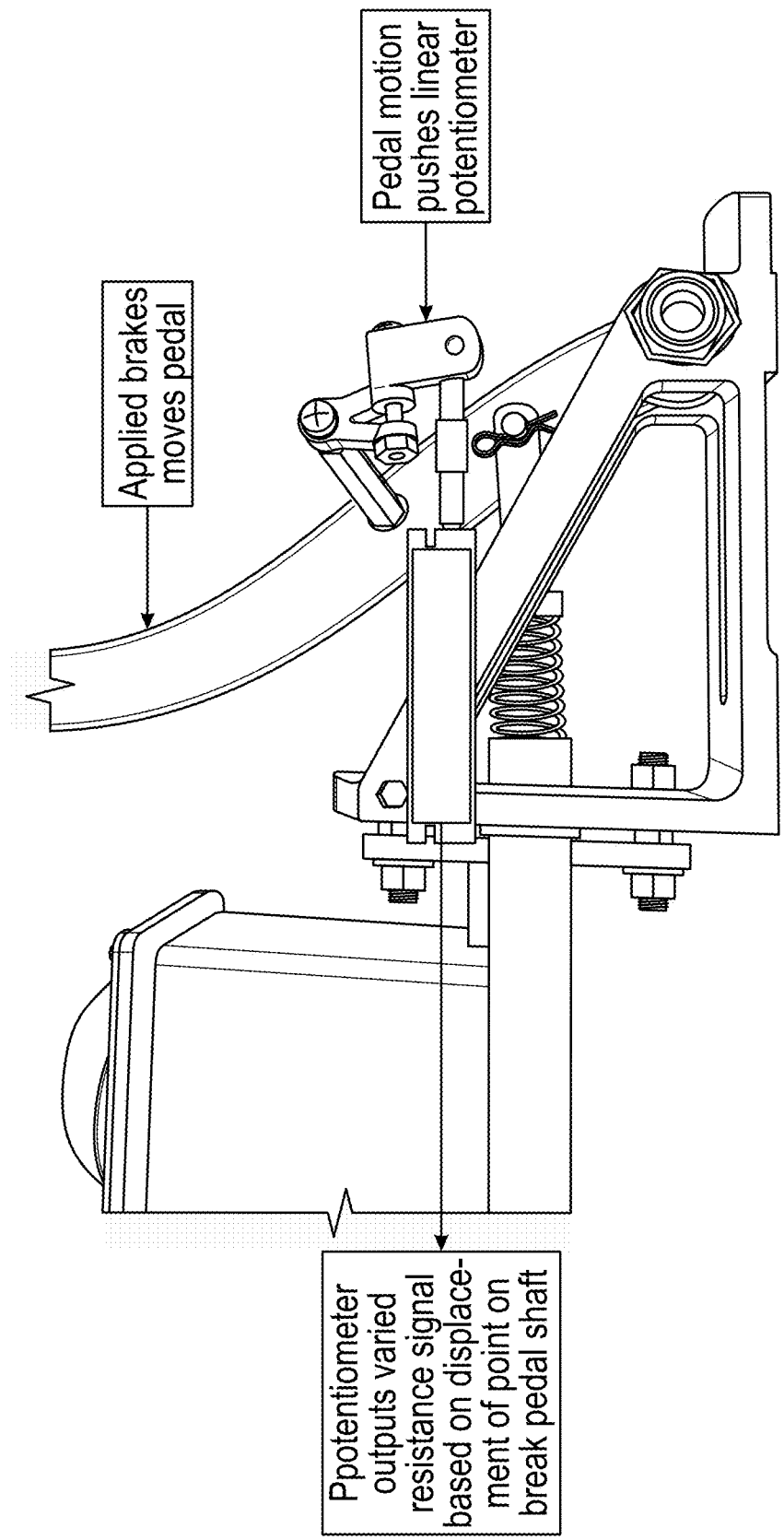
FIG. 10C is another view of the linear potentiometer of FIG. 10A.
Figure 10D:
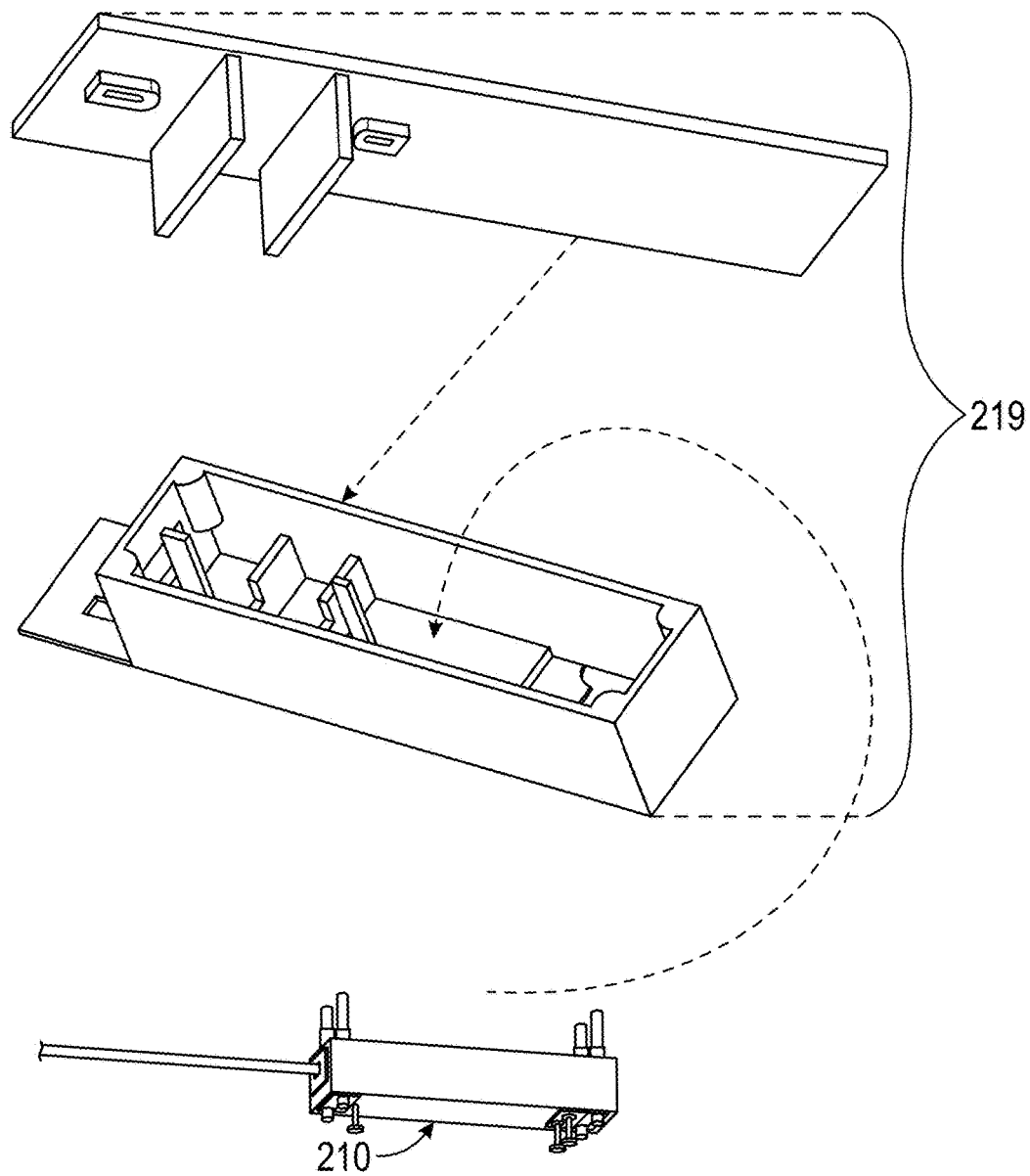
FIG. 10D is an exploded view showing an optional housing to encase and protect a linear potentiometer such as in FIGS. 10A-10C.
Figure 11A:
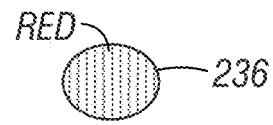
FIG. 11A is an isolated view of luminance created in one taillight in the example of FIG. 8A in a first state or level of braking, namely light braking.
Figure 11B:
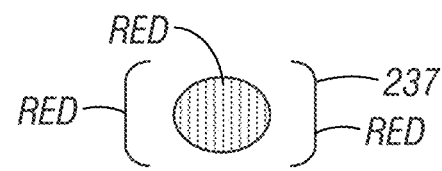
FIG. 11B is like FIG. 11A but shows luminance when the state or level of braking is increased to a second and greater level or state, namely moderate braking.
Figure 11C:
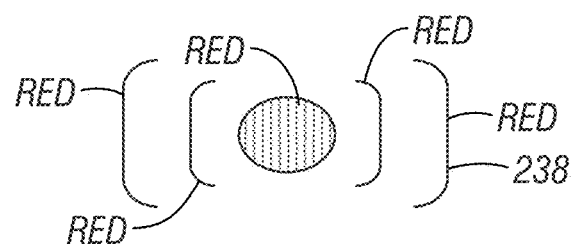
FIG. 11C shows luminance when increased to a third and greater level or state, namely heavy braking.
Figure 11D:
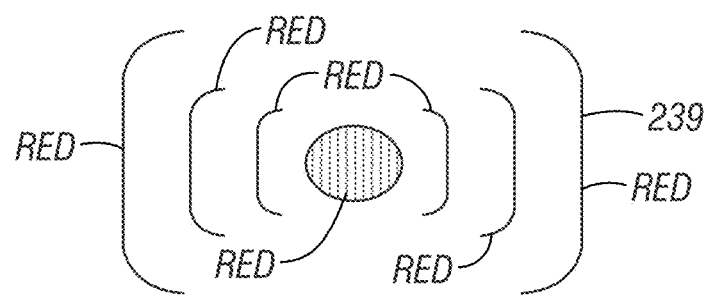
FIG. 11D shows luminance when increased to a fourth and greater level or state, namely full or emergency braking.

In designing the electrical portion of the system, it was attempted to go for a more simplistic approach and attempt to create the circuit using as few pieces as possible. The potentiometer used in the system is shown in FIGS. 8C and 10D.

The potentiometer was then used as a voltage divider to obtain a manually adjustable output voltage based on the position of the slider (wiper) from a fixed input voltage applied across the two ends of the potentiometer. The voltage across the potentiometer ($V_L$) can be calculated by the following formula (Potentiometer 1):

$$V_L = \frac{R_2}{R_1 + R_2} \cdot V_s \quad (1.1)$$

Where Vs is the source voltage, and:

$$R_2 = 10 \text{ Kohms} - R_1 \quad (1.2)$$

Figure 9A:
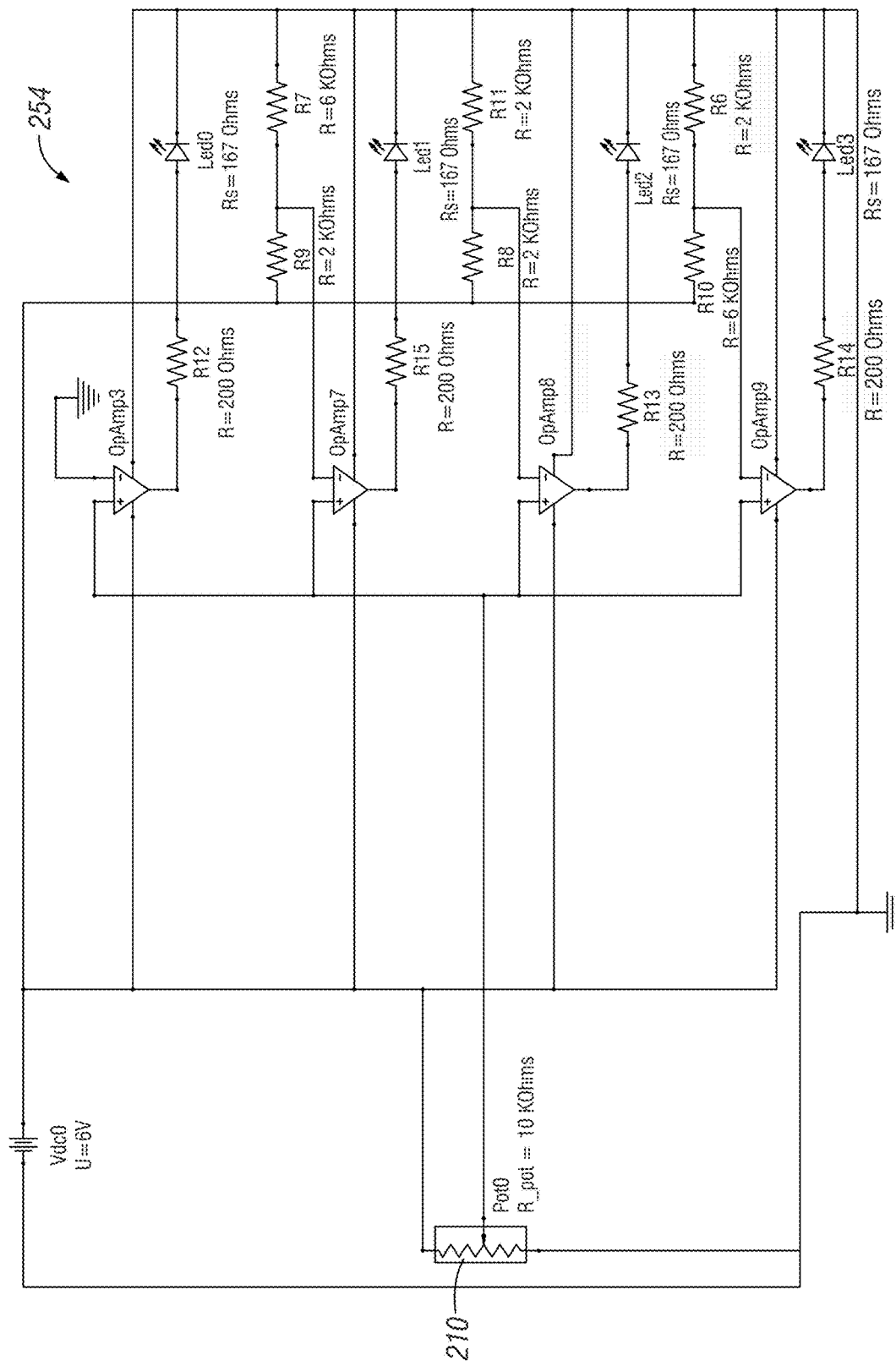
FIG. 9A is an electrical schematic of a circuit that could be used in the example of FIG. 8C.

In figuring out a way to vary which lights were turned on at which time, several different methods were tried, but it was decided to use an op-amp comparator circuit to perform this function. The operational amplifier was used as a sort of signal trigger device. By using different networks of resistors and voltage dividers connected to each input of the op-amp, the circuit can be divided into four rows of circuit, tied to the first input for each channel. As the variable voltage from the potentiometer passes each of these input voltages, the comparator reads a "high" signal, and because it has a pull up resistor connected to the source, sends out an output voltage signal to each of the LED tiers. This circuit is represented in or at FIG. 9B. A more detailed implementation is shown at FIG. 9A.

Figure 9B:
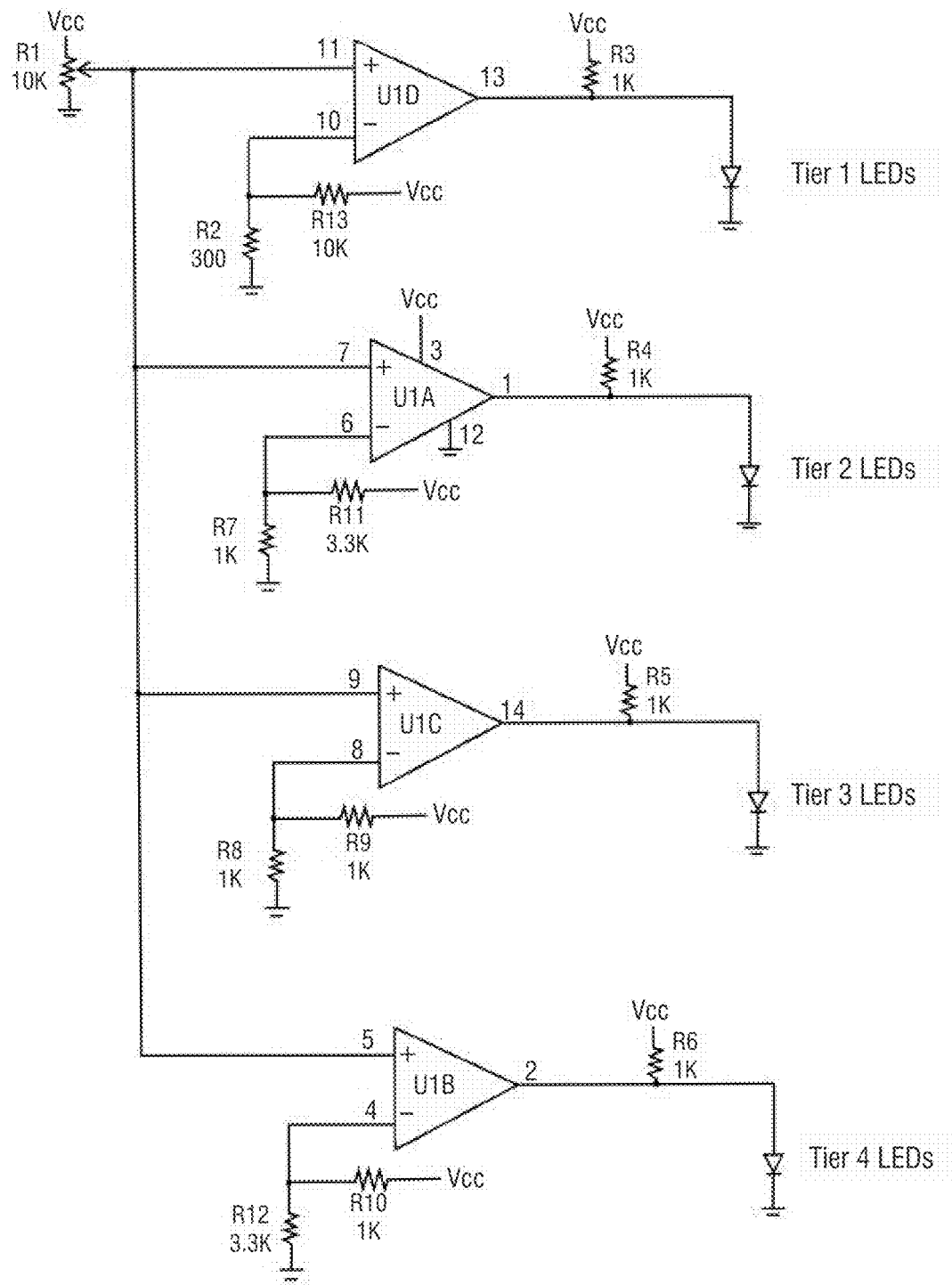
FIG. 9B is an isolated portion of the schematic of FIG. 9A.

In this diagram of FIG. 9B, R1 is the potentiometer, while U1A, U1B, U1C and U1D represent each of the different channels of the comparator chip. An LM139J chip from Texas Instruments was used as the comparator as it combines 4 comparators in one, which reduces the amount of parts in the circuit.

Figure 9C:
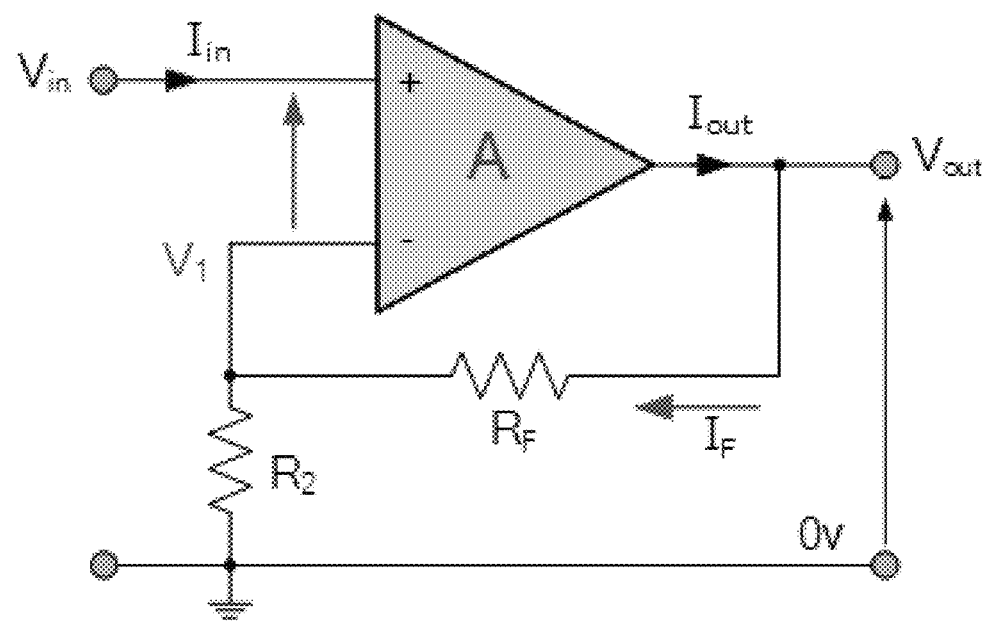
FIG. 9C is a further isolated portion of the schematic of FIG. 9B.

To produce the required output voltage for the LED's, the type of circuit used in this instance is what is known as a non-inverting operational amplifier. In a non-inverting op-amp configuration, the input voltage signal, ($V_{in}$) is applied directly to the non-inverting (+) input terminal. This means that the output gain of the amplifier becomes "Positive" in value in contrast to an "Inverting Amplifier" circuit. The result of this is that the output signal is the same polarity as the input signal. Feedback control of a non-inverting Operational Amplifier is achieved by applying a small part of the output voltage signal back to the inverting (−) input terminal via a voltage divider network, again producing negative feedback. This circuit is represented in FIG. 9C.

Then using the formula to calculate the output voltage of a potential divider network, it can be the output voltage for the op-amp circuit be calculated as follows:

$$V_1 = \frac{R_2}{R_2 + R_F} \times V_{out} \quad (1.3)$$

By varying the values of $R_2$, and $R_f$, the circuit could amplify the voltage from the outputs of the op amp to match the required voltage for the LED's (≈3.2 Volts).

d) LED Array Design

The design for the LED array arose from a study done by the University of Toronto (Canada). In this study, it was determined that a pattern expanding outward was more effective at grabbing a person's attention. With that in mind, a pattern that would mimic this trick to grab driver's attention (see bibliography below at Zhonghai 2) was created. The design that was developed was thus named the "Pulse" array, due to not only its curved, pulse-like design, but also the fact that the array "pulses" outward, employing the University of Toronto's study into expanding light patterns. The pattern is represented in FIG. 12C.

Figure 12A:
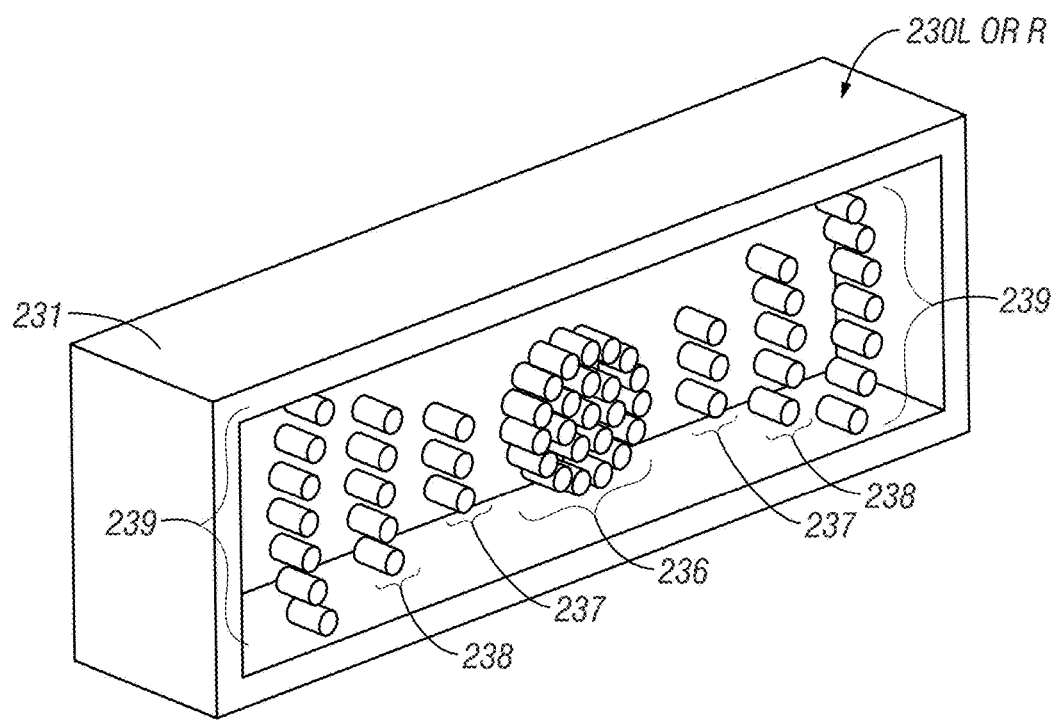
FIG. 12A is a diagrammatic view of one example of an LED-based housing and plural LED sources in an arrangement to effectuate the luminance of FIGS. 11A-11D.
Figure 12B:
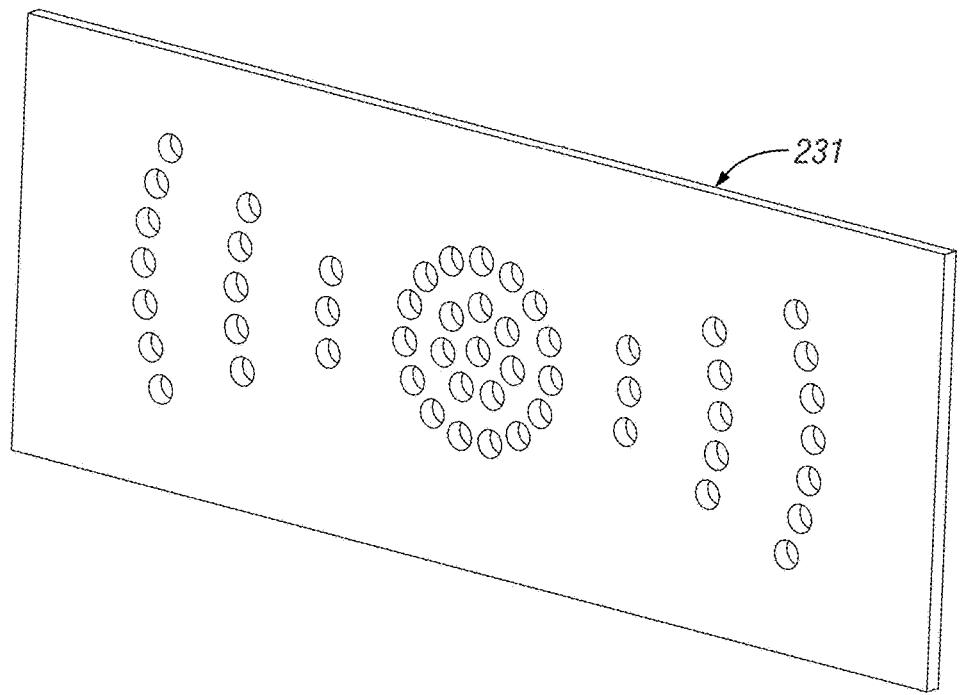
FIG. 12B is a diagrammatic view of a plate to hold plural LEDs in position in the housing of FIG. 12A.
Figure 12C:
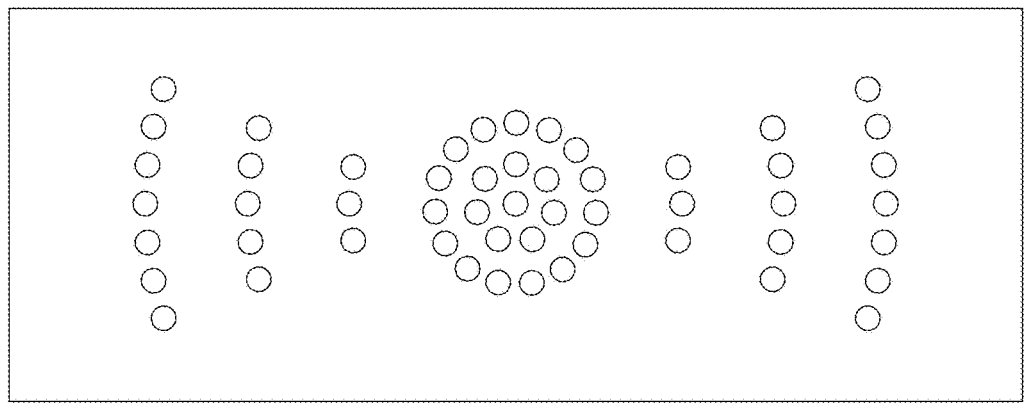
FIG. 12C is a front elevation of FIG. 12B.

FIGS. 12A-12C show a frame or plate 231 (or other mount) would be manufactured with apertures or mounting locations for individual LEDs. Frame or plate 231 can be inserted into a housing 232 to form brake light 230L or 230R (they can basically be identical). A first cluster or set of LEDs 236 can function as either running lights or a first level or tier braking luminance when illuminated. Two sets 237 of LEDs, each in mirror-image arcs can be a next highest tier when illuminated. Two sets 238, each mirror image arcs, can be the next tier, and then two sets 239. In this example, each succeeding arc is longer then the next by using more LEDs.

The array design was then made into a fixture using a 3D printer to apply a thickness. One advantage of the design is that all of the holes are press fit holes for the LED's, thus making it easier to swap them out if they need repaired. It should be noted that in connecting the LED's to the electrical circuit, the wires to ground were all tied together, and the tiers signal wires were all each tied to each other, to reduce the amount of wires required in the circuit.

6. Final Prototype Design

The final prototype design illustrated in FIGS. 8-12.

Using the comparator discussed in the electrical system section, the varied resistances causes the bank of LEDs to light up proportionally based on how hard the brake pedal is being pushed. For a small amount of pressure, only the central lights activate. For a larger braking force, an additional set of LED lights activate, and so forth.

This design achieved most of its goals. The price of the system was relatively low. The linear potentiometer was very easy and simple to install on this brake pedal. In terms of fabrication, the assembly only required the need to drill a few holes and shave off pieces of standard size bolts. The growing arrangement of the lights increases its visual impact on a driver, which can be seen in FIGS. 8A and 11A-D.

a) Final Prototype Performance

Finally, a DFMEA was performed on the initial design to determine the different failures that could occur. From this, the two highest modes of failure had to do with the pot and how it was connected to the brake assembly. By looking into other locations rather than the one used in the prototype, it was determined that frequency of occurrence for this issue could be negated. Additionally, by moving to a higher quality pot that lasted for more lifecycles, risk for damage to the pot was lowered as well.

The design was able to theoretically complete the goals for peripheral cues and increased reaction time due to the data collected in the functional model. The model produces a maximum output of 265 lumens at a much more intense wavelength, where as a typical brake light outputs 200 lumens across a variety of wavelengths, which is far less intense (Light Output . . . 1). The lumen output was calculated by calculating the amount of LED's on per tier and multiplying that by the amount of lumens per LED.

Thus, it was inferred that the system's brake light would be a brighter brake light than traditional lights. This should, in turn, increase both peripheral cues as well as reaction time, since the light is easier to see.

7. Implementation of Process or Design

Since the design was meant to fit in already existing brake pedal assemblies, a goal was to keep the overall size of whatever generated the signal to the electrical circuit relatively small. This greatly limited the number of parts available to achieve the angled motion of the linear potentiometer, limiting searches to websites for RC helicopters and airplanes. As suggested earlier, if the linear potentiometer is substituted with a rotary potentiometer, then the need for those smaller moving parts could be avoided.

The main concerns in regards to the specs of the potentiometer were the max number of cycles and the temperature range. A long cycle lifetime means the part won't have to be replaced, and having a temperature range that reaches—40 degrees F. means the brake lights will still work in cold weather. Since the main concern here is the failure of the potentiometer, it may be possible to design a failsafe that still allows for traditional use of the brake lights if the potentiometer stops working.

Minimal fabrication was needed to complete this prototype so there is not as much of a need for additional equipment when moving towards full scale production. One option is a 3D printer. This not only could create the LED array fixture, but also for an encasement if desired for the potentiometer in that particular variation.

REFERENCES

[1] "Auto Accident Statistics." *Auto Accident Resource*. N. P., 2010. Web. 17 Dec. 2014.
[2] "Light Output of a Car's Brake Lights." *CandlePowerForums RSS*. CandlePowerForums, July 2001. Web. 18 Dec. 2014.
[3] Li, Zhonghai. *An Empirical Investigation of the Effect of Manipulating Optical Looming Cues on Braking Behaviour in a Simulated Automobile Driving Task*. Toronto, Canada: U of Toronto (Canada), 2006. Web. 17 Nov. 2014.
[4] "Long-Distance Trips Taken During the Christmas/New Year Holiday Period (all Modes)|Bureau of Transportation Statistics." *Figure* 4. *Long-Distance Trips Taken During the Christmas/New Year Holiday Period (all Modes)|Bureau of Transportation Statistics*. United States Department of Transportation, 2003. Web. 17 Dec. 2014.
[5] "Potentiometer to Change Voltage?" *Electrical Engineering Stack Exchange*. Electrical Engineering Stack Exchange, 21 Dec. 2011. Web. 17 Dec. 2014.

8. Lumen Output System Model

The Tables 3 and 4 below show results of testing of system 200 with LEDs commercially available from SuperBrightLEDs of St. Louis, Mo. (USA) under product number RL5-W6030 with the following characteristics:

Type: 5 mm white (T-1¾ tube diameter)
Brightness: 1.2 lm
Lens: clear
Lumen max: 1.2 Lumen
Total power consumption: 0.102 watt
Millicandela: 6000 mcd
View angle: 30 degrees
Color temperature: 5900 K (cool white)
Color: (red lens would be placed over the LEDs).
See https://www.superbrightleds.com/moreinfo/component-leds/5 mm-white-led-30-degree-viewing-angle-6000-mcd/257/

TABLE 3

| Voltage in (V) | Pedal cylinder travel distance (in) | Pot Distance traveled (in) | % of total available travel distance | Pot Resistance 1 (KOhm) | Pot Resistance 2 (KOhm) | Vuar (V) | Comparator Supply Voltage (V) | Comp 1 Voltage (V) | Comp 2 Voltage (V) | Comp 3 Voltage (V) |
|---|---|---|---|---|---|---|---|---|---|---|
| 6 | 0 | 0 | 0 | 10 | 0 | 0 | 6 | 0 | 1.5 | 3 |
| 6 | 0.1 | 0.1 | 0.05 | 9.5 | 0.5 | 0.3 | 6 | 0 | 1.5 | 3 |
| 6 | 0.2 | 0.2 | al | 9 | 1 | 0.6 | 6 | 0 | 1.5 | 3 |
| 6 | 0.3 | 0.3 | 0.15 | 8.5 | 1.5 | 0.9 | 6 | 0 | 1.5 | 3 |
| 6 | 0.4 | 0.4 | 0.2 | 8 | 2 | 1.2 | 6 | 0 | 1.5 | 3 |
| 6 | 0.5 | 0.5 | 0.25 | 7.5 | 2.5 | 1.5 | 6 | 0 | 1.5 | 3 |
| 6 | 0.6 | 0.6 | 0.3 | 7 | 3 | 1.8 | 6 | 0 | 1.5 | 3 |
| 6 | 0.7 | 0.7 | 0.35 | 6.5 | 3.5 | 2.1 | 6 | 0 | 1.5 | 3 |
| 6 | 0.8 | 0.8 | 0.4 | 6 | 4 | 2.4 | 6 | 0 | 1.5 | 3 |
| 6 | 0.9 | 0.9 | 0.45 | 5.5 | 4.5 | 2.7 | 6 | 0 | 1.5 | 3 |

TABLE 3-continued

| 6 | 1 | 1 | 0.5 | 5 | 5 | 3 | 6 | 0 | 1.5 | 3 |
| 6 | 1.1 | 1.1 | 0.55 | 4.5 | 5.5 | 3.3 | 6 | 0 | 1.5 | 3 |
| 6 | 1.2 | 1.2 | 0.6 | 4 | 6 | 3.6 | 6 | 0 | 1.5 | 3 |
| 6 | 1.3 | 1.3 | 0.65 | 3.5 | 6.5 | 3.9 | 6 | 0 | 1.5 | 3 |
| 6 | 1.4 | 1.4 | 0.7 | 3 | 7 | 4.2 | 6 | 0 | 1.5 | 3 |
| 6 | 1.5 | 1.5 | 0.75 | 2.5 | 7.5 | 4.5 | 6 | 0 | 1.5 | 3 |
| 6 | 1.6 | 1.6 | 02 | 2 | 8 | 4.8 | 6 | 0 | 1.5 | 3 |
| 6 | 1.7 | 1.7 | 0.85 | 1.5 | 8.5 | 5.1 | 6 | 0 | 1.5 | 3 |
| 6 | 1.8 | 1.8 | 0.9 | 1 | 9 | 5.4 | 6 | 0 | 1.5 | 3 |
| 6 | 1.9 | 1.9 | 0.95 | 0.5 | 9.5 | 5.7 | 6 | 0 | 1.5 | 3 |
| 6 | 2 | 2 | 1 | 0 | 10 | 6 | 6 | 0 | 1.5 | 3 |

| Comp 4 Voltage (V) | Comp 1 Output Voltage (V) | Comp 2 Output Voltage (V) | Comp 3 Output Voltage (V) | Comp 4 Output Voltage (V) | Current limiting resistor (Ohm) | LED Tier 1 resistance (Ohm) | LED Tier 2 resistance (Ohm) | LED Tier 3 resistance (Ohm) | LED Tier 4 resistance (Ohm) |
| --- | --- | --- | --- | --- | --- | --- | --- | --- | --- |
| 4.5 | 0 | 0 | 0 | 0 | 200 | 167 | 167 | 167 | 167 |
| 4.5 | 6 | 0 | 0 | 0 | 200 | 167 | 167 | 167 | 167 |
| 4.5 | 6 | 0 | 0 | 0 | 200 | 167 | 167 | 167 | 167 |
| 4.5 | 6 | 0 | 0 | 0 | 200 | 167 | 167 | 167 | 167 |
| 4.5 | 6 | 0 | 0 | 0 | 200 | 167 | 167 | 167 | 167 |
| 4.5 | 6 | 0 | 0 | 0 | 200 | 167 | 167 | 167 | 167 |
| 4.5 | 6 | 6 | 0 | 0 | 200 | 167 | 167 | 167 | 167 |
| 4.5 | 6 | 6 | 0 | 0 | 200 | 167 | 167 | 167 | 167 |
| 4.5 | 6 | 6 | 0 | 0 | 200 | 167 | 167 | 167 | 167 |
| 4.5 | 6 | 6 | 0 | 0 | 200 | 167 | 167 | 167 | 167 |
| 4.5 | 6 | 6 | 0 | 0 | 200 | 167 | 167 | 167 | 167 |
| 4.5 | 6 | 6 | 6 | 0 | 200 | 167 | 167 | 167 | 167 |
| 4.5 | 6 | 6 | 6 | 0 | 200 | 167 | 167 | 167 | 167 |
| 4.5 | 6 | 6 | 6 | 0 | 200 | 167 | 167 | 167 | 167 |
| 4.5 | 6 | 6 | 6 | 0 | 200 | 167 | 167 | 167 | 167 |
| 4.5 | 6 | 6 | 6 | 0 | 200 | 167 | 167 | 167 | 167 |
| 4.5 | 6 | 6 | 6 | 6 | 200 | 167 | 167 | 167 | 167 |
| 4.5 | 6 | 6 | 6 | 6 | 200 | 167 | 167 | 167 | 167 |
| 4.5 | 6 | 6 | 6 | 6 | 200 | 167 | 167 | 167 | 167 |
| 4.5 | 6 | 6 | 6 | 6 | 200 | 167 | 167 | 167 | 167 |
| 4.5 | 6 | 6 | 6 | 6 | 200 | 167 | 167 | 167 | 167 |

TABLE 4

| LED Tier 1 Voltage (V) | LED Tier 2 Voltage (V) | LED Tier 3 Voltage (V) | LED Tier 4 Voltage (V) | LED Tier 1 Current (mA) | LED Tier 2 Current (mA) | LED Tier 3 Current (mA) | LED Tier 4 Current (mA) | LED Tier 1 Lumen ouput per LED (L) | LED Tier 2 Lumen ouput per LED (L) | LED Tier 3 Lumen ouput per LED (L) |
| --- | --- | --- | --- | --- | --- | --- | --- | --- | --- | --- |
| 0 | 0 | 0 | 0 | 0 | 0 | 0 | 0 | 0 | 0 | 0 |
| 2.730245 | 0 | 0 | 0 | 0.01635 | 0 | 0 | 0 | 5 | 0 | 0 |
| 2.730245 | 0 | 0 | 0 | 0.01635 | 0 | 0 | 0 | 5 | 0 | 0 |
| 2.730245 | 0 | 0 | 0 | 0.01635 | 0 | 0 | 0 | 5 | 0 | 0 |
| 2.730245 | 0 | 0 | 0 | 0.01635 | 0 | 0 | 0 | 5 | 0 | 0 |
| 2.730245 | 0 | 0 | 0 | 0.01635 | 0 | 0 | 0 | 5 | 0 | 0 |
| 2.730245 | 2.730245 | 0 | 0 | 0.01635 | 0.01635 | 0 | 0 | 5 | 5 | 0 |
| 2.730245 | 2.730245 | 0 | 0 | 0.01635 | 0.01635 | 0 | 0 | 5 | 5 | 0 |
| 2.730245 | 2.730245 | 0 | 0 | 0.01635 | 0.01635 | 0 | 0 | 5 | 5 | 0 |
| 2.730245 | 2.730245 | 0 | 0 | 0.01635 | 0.01635 | 0 | 0 | 5 | 5 | 0 |
| 2.730245 | 2.730245 | 0 | 0 | 0.01635 | 0.01635 | 0 | 0 | 5 | 5 | 0 |
| 2.730245 | 2.730245 | 2.730245 | 0 | 0.01635 | 0.01635 | 0.01635 | 0 | 5 | 5 | 5 |
| 2.730245 | 2.730245 | 2.730245 | 0 | 0.01635 | 0.01635 | 0.01635 | 0 | 5 | 5 | 5 |
| 2.730245 | 2.730245 | 2.730245 | 0 | 0.01635 | 0.01635 | 0.01635 | 0 | 5 | 5 | 5 |
| 2.730245 | 2.730245 | 2.730245 | 0 | 0.01635 | 0.01635 | 0.01635 | 0 | 5 | 5 | 5 |
| 2.730245 | 2.730245 | 2.730245 | 0 | 0.01635 | 0.01635 | 0.01635 | 0 | 5 | 5 | 5 |
| 2.730245 | 2.730245 | 2.730245 | 2.730245 | 0.01635 | 0.01635 | 0.01635 | 0.01635 | 5 | 5 | 5 |
| 2.730245 | 2.730245 | 2.730245 | 2.730245 | 0.01635 | 0.01635 | 0.01635 | 0.01635 | 5 | 5 | 5 |
| 2.730245 | 2.730245 | 2.730245 | 2.730245 | 0.01635 | 0.01635 | 0.01635 | 0.01635 | 5 | 5 | 5 |
| 2.730245 | 2.730245 | 2.730245 | 2.730245 | 0.01635 | 0.01635 | 0.01635 | 0.01635 | 5 | 5 | 5 |
| 2.730245 | 2.730245 | 2.730245 | 2.730245 | 0.01635 | 0.01635 | 0.01635 | 0.01635 | 5 | 5 | 5 |

| LED Tier 4 Lumen ouput per LED (L) | Number of lights Tier 1 | Number of lights Tier 2 | Number of lights Tier 3 | Number of lights Tier 4 | Total Lumen output Tier 1 (L) | Total Lumen output Tier 1 (L) | Total Lumen output Tier 1 (L) | Total Lumen output Tier 1 (L) | Total System Lumen output (L) |
| --- | --- | --- | --- | --- | --- | --- | --- | --- | --- |
| 0 | 25 | 8 | 12 | 8 | 0 | 0 | 0 | 0 | 0 |
| 0 | 25 | 8 | 12 | 8 | 125 | 0 | 0 | 0 | 125 |

TABLE 4-continued

| | | | | | | | | | |
|---|---|---|---|---|---|---|---|---|---|
| 0 | 25 | 8 | 12 | 8 | 125 | 0 | 0 | 0 | 125 |
| 0 | 25 | 8 | 12 | 8 | 125 | 0 | 0 | 0 | 125 |
| 0 | 25 | 8 | 12 | 8 | 125 | 0 | 0 | 0 | 125 |
| 0 | 25 | 8 | 12 | 8 | 125 | 0 | 0 | 0 | 125 |
| 0 | 25 | 8 | 12 | 8 | 125 | 40 | 0 | 0 | 165 |
| 0 | 25 | 8 | 12 | 8 | 125 | 40 | 0 | 0 | 165 |
| 0 | 25 | 8 | 12 | 8 | 125 | 40 | 0 | 0 | 165 |
| 0 | 25 | 8 | 12 | 8 | 125 | 40 | 0 | 0 | 165 |
| 0 | 25 | 8 | 12 | 8 | 125 | 40 | 0 | 0 | 165 |
| 0 | 25 | 8 | 12 | 8 | 125 | 40 | 60 | 0 | 225 |
| 0 | 25 | 8 | 12 | 8 | 125 | 40 | 60 | 0 | 225 |
| 0 | 25 | 8 | 12 | 8 | 125 | 40 | 60 | 0 | 225 |
| 0 | 25 | 8 | 12 | 8 | 125 | 40 | 60 | 0 | 225 |
| 5 | 25 | 8 | 12 | 8 | 125 | 40 | 60 | 40 | 265 |
| 5 | 25 | 8 | 12 | 8 | 125 | 40 | 60 | 40 | 265 |
| 5 | 25 | 8 | 12 | 8 | 125 | 40 | 60 | 40 | 265 |
| 5 | 25 | 8 | 12 | 8 | 125 | 40 | 60 | 40 | 265 |
| 5 | 25 | 8 | 12 | 8 | 125 | 40 | 60 | 40 | 265 |

FIGS. 12A-C show some examples of possible form factors for the brake light housing, LEDs or other light sources in the housing, and the available light output patterns that it allows. Variations obvious to those skilled in the art are possible according to the designer's desire and needs.

E. Options and Alternatives

It is to be understood that the foregoing exemplary embodiments are but a few examples of the forms and configurations, as well as operation, the invention can take. Variations obvious to those skilled in the art will be included within the invention, and the embodiments discussed above are not intended to and do not limit the scope of the invention, which is defined by the appended claims.

Figure 13:
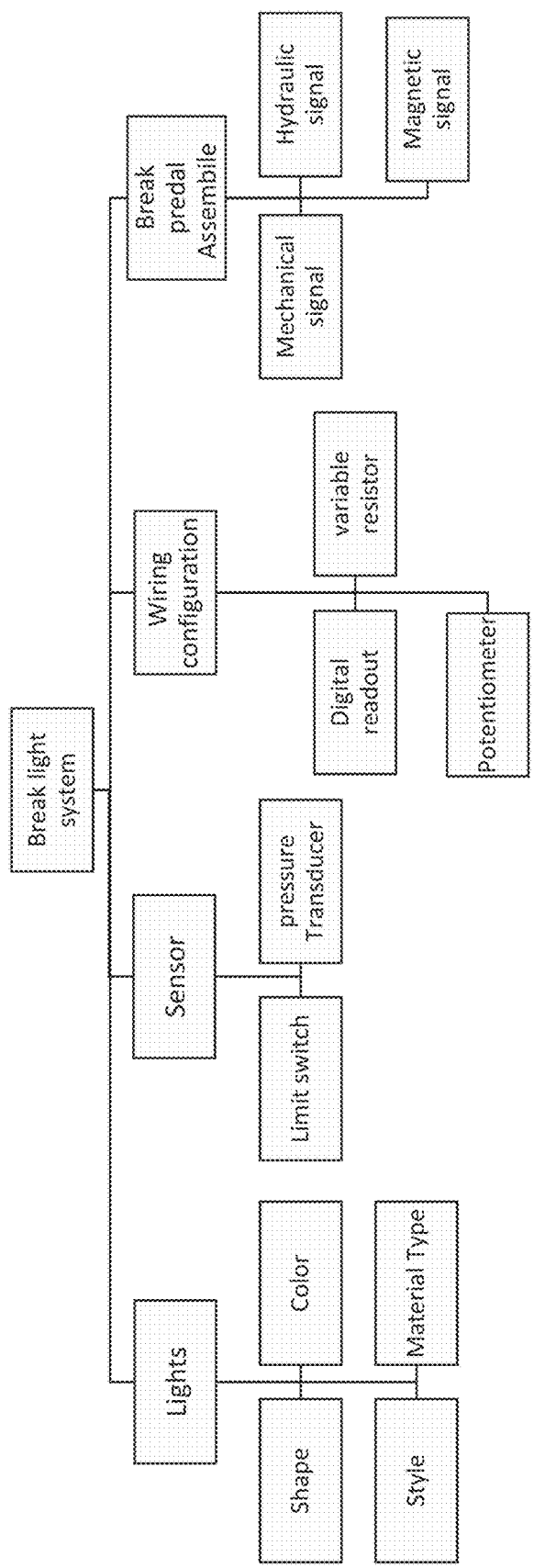
FIG. 13 is a relational diagram of possible options and alternatives for further exemplary embodiments according to one or more aspects of the invention.

For example, some variations and options have been mentioned above. Different form factors, light sources, light effects, placement on a vehicle, and the like are possible. FIG. 13 illustrates some of the design choices that might be considered.

Figure 14A:
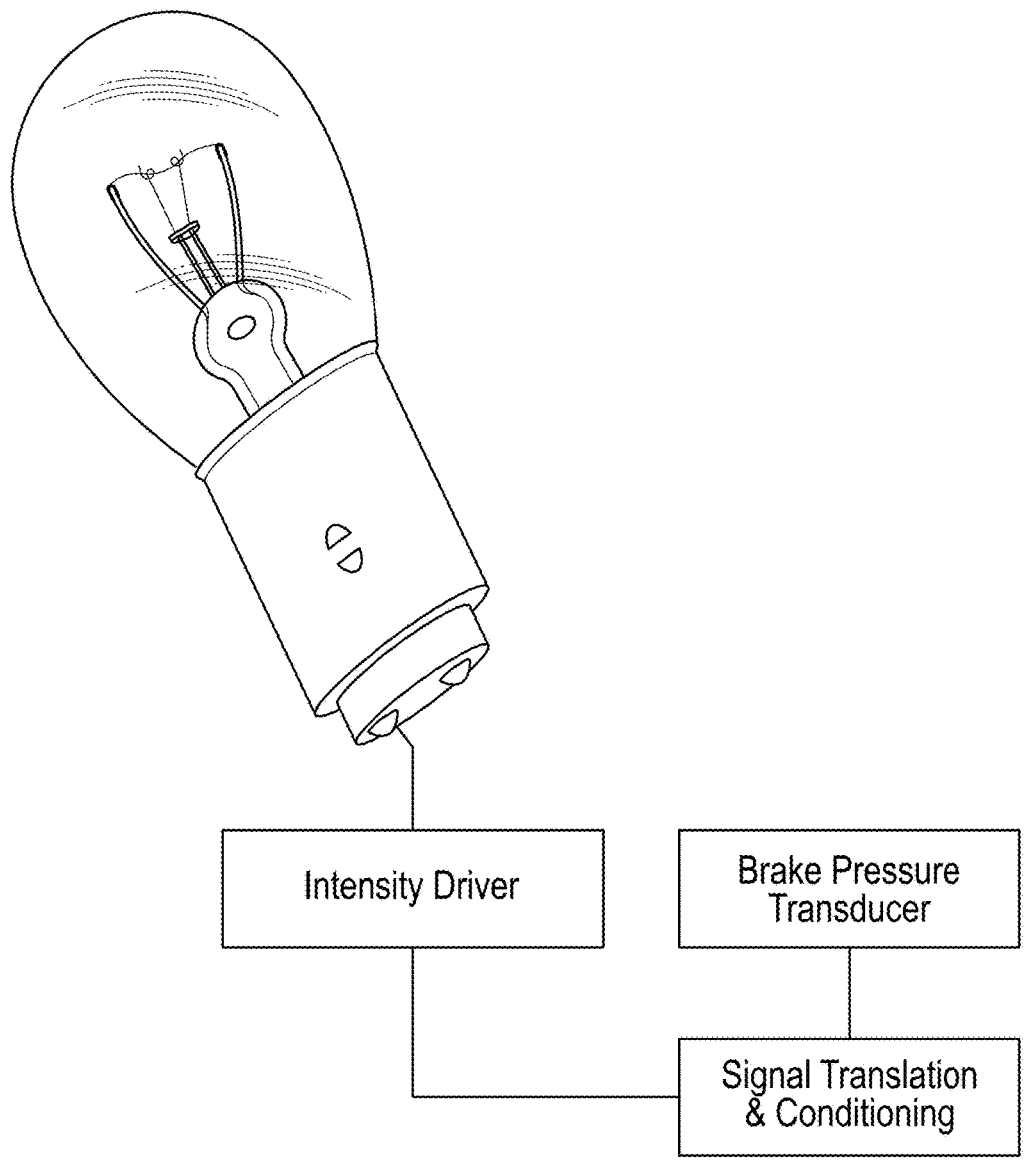
FIG. 14A is a depiction of an alternative light source.

FIG. 14A illustrates a type of alternative light source different than LEDs. As discussed above, a single (or multiple) incandescent source(s) could be instructed by a control circuitry to display an expanding and contracting intensity with brake pressure.

Figure 14B:
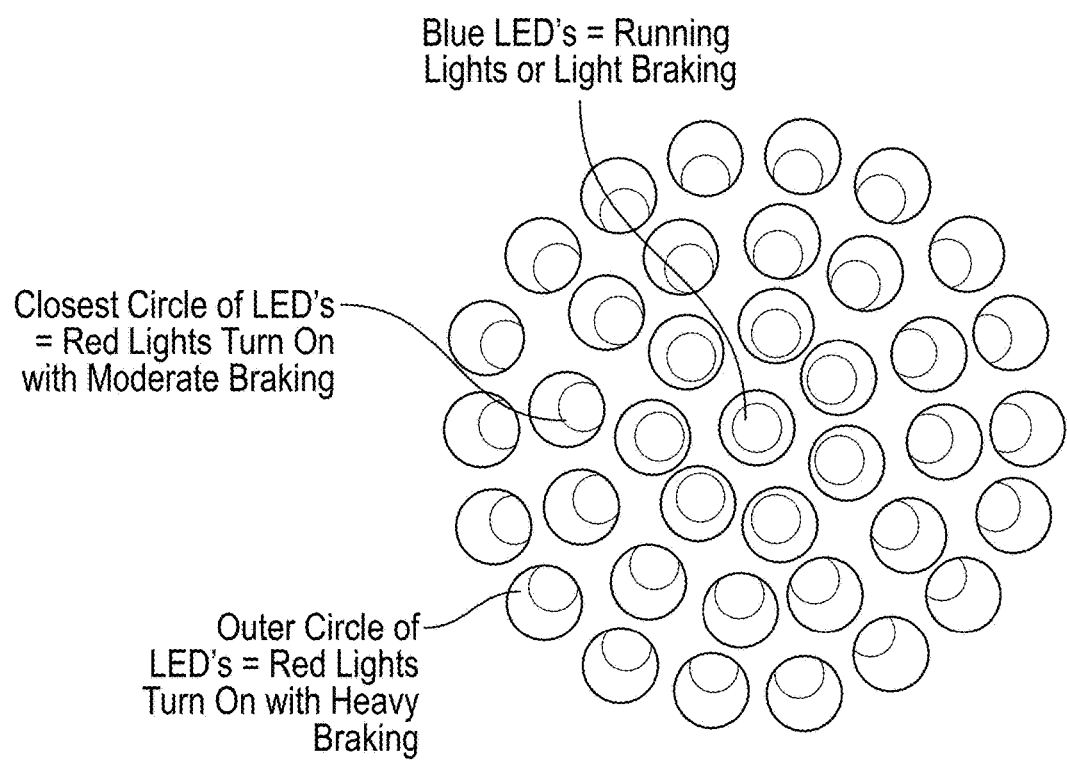
FIG. 14B is a depiction of an alternative plurality of light sources and different pattern.

FIG. 14B illustrates the placement of the light source(s) and the patterns used might vary. Here a center cluster of LEDs or other light sources, when activated, could illuminate as running lights or light braking pressure indicators. They could be red or could be a different color (e.g. blue for running lights or for light braking). A first circle of lights around the center cluster could additionally activate and illuminate on sensing of moderate braking. They could be red in output or a different color (blue, green, or other). An outer circle of lights could activate and illuminate on heavy braking (red, blue, green, or other color).

FIG. 15 illustrates that alternative forms of transducing braking pressure are possible in combination with aspects of the invention. In this example, a load sensor, such as described earlier, could be the indirect brake pressure transducer (the amount of driver foot force on the brake pedal). The electrical output signal could be translated and used to power one or more brake lights to display expanding or contracting luminance proportional to level of braking sensed.

Another option is to add features to the display at the brake lights. For example, they could be flashed (instead of steady state illumination), when reaching heavy braking state to further accentuate or draw attention to the same.

As previously mentioned, specific brake light pattern and designs developed have aesthetic features. Therefore, aspects of the invention include such designs as follows.

FIGS. 16A-G illustrate a brake light for a vehicle with generated luminance output as shown and described.

FIGS. 17A-G illustrate a brake light for a vehicle with generated luminance output as shown and described.

FIGS. 18A-G illustrate a brake light for a vehicle with generated luminance output as shown and described.

FIGS. 19A-G illustrate a brake light for a vehicle with generated luminance output as shown and described.

What is claimed is:

1. A vehicle braking system comprising:
   a. a sensor configured to sense a braking state or level of braking from a plurality of possible braking states or levels;
   b. a processing circuit operatively connected to the sensor;
   c. at least one brake light operatively connected to the processing circuit, said at least one brake light divided into sub-sets, each sub-set being independently controllable;
   d. wherein the sensed braking state or level of braking is electrically communicated to the processing circuit which evaluates the sensed braking state or level of braking and automatically actuates a visual state or level of brake light operation corresponding to the sensed braking state or level of braking, the visual state or level of brake light operation presents a visual expansion and contraction of at least one brake light luminance in size, intensity, or a combination of both with increasing and decreasing sensed state or level of braking respectively;
   wherein the sensor allows either direct or indirect sensing of the magnitude of pressure being applied to the braking system; and
   wherein direct sensing comprises measuring the magnitude of pressure of brake fluid in the vehicle's brake system.

2. The vehicle braking system of claim 1 wherein the sub-sets are physically arranged in the brake light such that each subsequently illuminated sub-set expands the illumination horizontally, vertically, diagonally, or a combination of the foregoing.

3. The vehicle braking system of claim 2 wherein at least several of the sub-sets are adjacent, nested inverted L-shapes.

4. The vehicle braking system of claim 2 wherein indirect sensing comprises measuring physical displacement of the brake pedal of the vehicles braking system.

5. The vehicle braking system of claim 1 wherein the sensor provides an electrically transduced signal correlated to at least plural states or levels of braking of the vehicle and the signal is communicated to the conditioning circuit or processor which instructs and generates a correlated operation of the brake lights to increase or decrease the luminance in correlation to sensed pressure.

6. The vehicle braking system of claim 1 wherein the brake light comprises a plurality of sections each corresponding to a sensed state or level of braking.

7. The vehicle braking system of claim 6 wherein each section creates luminance when activated, and sections are sequentially activated with increasing sensed levels or states of braking and sequentially deactivated with decreasing sensed levels or states of braking to create the visual expansion and contraction of luminance, wherein the sections are adjacent and having an increasing number of light sources in at least one direction from a first section to a last section.

8. The vehicle braking system of claim 7 wherein the luminance is correlated to one or more of:
  a. type of light source in the brake light;
  b. number of light sources in the brake light;
  c. color, output intensity, and output distribution pattern of the light source.

9. The vehicle braking system of claim 1 in combination with a vehicle wherein there are one of:
  a. a single brake light;
  b. left and right brake lights;
  c. a center brake light;
  d. left and right and center brake lights.

10. The vehicle braking system of claim 1 wherein the processing circuit includes one of:
  a. a fail-safe mode which activates the brake lights continuously on loss of signal from the sensor;
  b. a flashing mode when highest braking level or state is sensed.

11. A method of braking lighting comprising:
  a. measuring fluid pressure of the brake fluid of a vehicle's braking system;
  b. changing at least one vehicle brake light display in correlation to measured fluid pressure of the brake fluid;
  wherein the at least one vehicle brake lights includes a plurality of light sections; and
  wherein the step of changing the brake light display comprises illuminating additional sections of the plurality of light sections of the display in correspondence with increasing fluid pressure and decreasing the number of illuminated sections of the plurality of light sections of the display in correspondence with decreasing fluid pressure.

12. The method of claim 11 wherein the plurality of light sections are physically arranged in the brake light such that each subsequently illuminated section of the plurality of light sections expands the illumination horizontally, vertically, diagonally, or a combination of the foregoing.

13. The method of claim 12 wherein the increasing and decreasing of brightness follows increasing and decreasing fluid pressure in approximately real time.

14. The method of claim 12 wherein the increases and decreases in brightness occur at preset thresholds of fluid pressure.

15. The method of claim 14 wherein the increases and decreases in brightness are generated by expanding and contracting area of luminance.

16. The method of claim 15 wherein the expanding and contracting of area is one or more of:
  a. along a first axis;
  b. along a second axis;
  c. along a third axis.

17. The method of claim 16 wherein:
  a. the first axis is generally horizontal;
  b. the second axis is generally vertical;
  c. the third axis is diagonal.

* * * * *